US012776823B2

(12) United States Patent
Cirik et al.

(10) Patent No.: US 12,776,823 B2
(45) Date of Patent: Oct. 27, 2026

(54) DYNAMIC TRANSMISSION RECEPTION POINT GROUP INDICATION

(71) Applicant: Ofinno, LLC, Reston, VA (US)

(72) Inventors: Ali Cagatay Cirik, Chantilly, VA (US); Esmael Hejazi Dinan, McLean, VA (US); Youngwoo Kwak, Woodbury, NY (US); Yunjung Yi, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 178 days.

(21) Appl. No.: 18/768,137

(22) Filed: Jul. 10, 2024

(65) Prior Publication Data

US 2024/0365328 A1 Oct. 31, 2024

Related U.S. Application Data

(63) Continuation of application No. 17/873,241, filed on Jul. 26, 2022, now Pat. No. 12,041,633, which is a (Continued)

(51) Int. Cl.
*H04W 72/04* (2023.01)
*H04B 7/06* (2006.01)
(Continued)

(52) U.S. Cl.
CPC ....... *H04B 7/06968* (2023.05); *H04L 5/0048* (2013.01); *H04W 48/08* (2013.01); *H04W 72/23* (2023.01)

(58) Field of Classification Search
None
See application file for complete search history.

(56) References Cited

U.S. PATENT DOCUMENTS 10,660,053 B2 5/2020 Joseph et al.
11,223,461 B2 1/2022 Manolakos et al.
(Continued)

FOREIGN PATENT DOCUMENTS

EP 4131842 A1 * 2/2023 ......... H04B 7/06968
WO 2020/090119 A1 5/2020

OTHER PUBLICATIONS

3GPP TS 38.211 V15.4.0 (Dec. 2018); Technical Specification; 3rd Generation Partnership Project; Technical Specification Group Radio Access Network; NR; Physical channels and modulation; (Release 15).

(Continued)

*Primary Examiner* — Maharishi V Khirodhar
(74) *Attorney, Agent, or Firm* — Xin Gao; Kavon Nasabzadeh; Jacob L. Mangan

(57) ABSTRACT

A base station transmits one or more radio resource control (RRC) messages comprising transmission configuration indicator (TCI) states for a cell. Each TCI state of the TCI states comprises an indication of a respective physical cell index (PCI). The base station transmits an activation command indicating, for a control resource set (coreset), a first TCI state of the TCI states. The first TCI state comprises a first indication of a first PCI. The base station transmits, via the coreset, a downlink control information (DCI) scheduling a physical downlink shared channel (PDSCH). In response to the first TCI state of the coreset comprising the first indication of the first PCI, the base station transmits the PDSCH based on a second TCI state comprising the first indication of the first PCI.

20 Claims, 30 Drawing Sheets

Related U.S. Application Data continuation of application No. 16/851,666, filed on Apr. 17, 2020, now Pat. No. 11,425,706.

(60) Provisional application No. 62/841,777, filed on May 1, 2019.

(51) Int. Cl.

| | |
|---|---|
| ***H04L 5/00*** | (2006.01) |
| ***H04W 48/08*** | (2009.01) |
| ***H04W 72/23*** | (2023.01) |
| ***H04W 76/00*** | (2018.01) |
| ***H04W 88/08*** | (2009.01) |

(56) References Cited

U.S. PATENT DOCUMENTS

| | | | | |
|---|---|---|---|---|
| 2018/0091212 | A1 | 3/2018 | Lee et al. | |
| 2018/0198575 | A1 | 7/2018 | Sheng et al. | |
| 2019/0238208 | A1 | 8/2019 | Tang et al. | |
| 2019/0373450 | A1* | 12/2019 | Zhou .................. | H04B 7/06952 |
| 2020/0007296 | A1 | 1/2020 | Papasakellariou | |
| 2020/0045709 | A1 | 2/2020 | Seo et al. | |
| 2020/0145062 | A1 | 5/2020 | Jung et al. | |
| 2020/0336928 | A1 | 10/2020 | Seo et al. | |
| 2020/0351055 | A1* | 11/2020 | Manolakos ............ | H04B 7/088 |
| 2021/0045141 | A1* | 2/2021 | Lee ....................... | H04L 5/0023 |
| 2021/0385832 | A1 | 12/2021 | Zhang et al. | |

OTHER PUBLICATIONS

3GPP TS 38.212 V15.4.0 (Dec. 2018); Technical Specification; 3rd Generation Partnership Project; Technical Specification Group Radio Access Network; NR; Multiplexing and channel coding; (Release 15).

3GPP TS 38.213 V15.4.0 (Dec. 2018); Technical Specification; 3rd Generation Partnership Project; Technical Specification Group Radio Access Network; NR;Physical layer procedures for control (Release 15).

3GPP TS 38.214 V15.4.0 (Dec. 2018); Technical Specification; 3rd Generation Partnership Project; Technical Specification Group Radio Access Network; NR; Physical layer procedures for data; (Release 15).

3GPP TS 38.215 V15.4.0 (Dec. 2018); Technical Specification; 3rd Generation Partnership Project; Technical Specification Group Radio Access Network; NR; Physical layer measurements; (Release 15).

3GPP TS 38.321 V15.4.0 (Dec. 2018); Technical Specification; 3rd Generation Partnership Project; Technical Specification Group Radio Access Network; NR; Medium Access Control (MAC) protocol specification; (Release 15).

3GPP TS 38.331 V15.4.0 (Dec. 2018); Technical Specification; 3rd Generation Partnership Project; Technical Specification Group Radio Access Network; NR; Radio Resource Control (RRC) protocol specification; (Release 15).

R1-1903970; 3GPP TSG RAN WG1 Meeting #96bis; Xi'an, China, Apr. 8-12, 2019; Agenda Item: 7.2.8.2; Source: Huawei, HiSilicon; Title: Enhancements on Multi-TRP/panel transmission; Document for: Discussion and Decision.

R1-1904013; 3GPP TSG RAN WG1 #96bis; Xi'an, China, Apr. 8-12, 2019; Source: ZTE; Title: Enhancements on Multi-TRP and Multi-panel Transmission; Agenda item: 7.2.8.2; Document for: Discussion and Decision.

R1-1904036; 3GPP TSG RAN WG1 Meeting #96bis; Xi'an, China, Apr. 8-12, 2019; Source: OPPO; Title: Enhancements on multi-TRP and multi-panel transmission; Agenda Item: 7.2.8.2; Document for: Discussion and Decision.

R1-1904096; 3GPP TSG RAN WG1 #96bis; Xi'an, China, Apr. 8-12, 2019; Source: vivo; Title: Further Discussion on Multi-TRP Transmission; Agenda Item: 7.2.8.2; Document for: Discussion and Decision.

R1-1904190; 3GPP TSG RAN WG1 #96bis; Xi'an, China, Apr. 8-12, 2019; Source: Panasonic; Title: On multi-TRP enhancements for NR MIMO in Rel. 16; Agenda Item: 7.2.8.2; Document for: Discussion.

R1-1904208; 3GPP TSG RAN WG1 Meeting #96bis; Xi'an, China, Apr. 8-12, 2019; Agenda item: 7.2.8.2; Source: LG Electronics; Title: Enhancements on multi-TRP/panel transmission; Document for: Discussion and Decision.

R1-1904240; 3GPP TSG RAN WG1 Meeting #96-bis; Xi'an, China, Apr. 8-12, 2019; Agenda Item: 7.2.8.2; Source: Sony; Title: Considerations on Multi-TRP/Panel Transmission; Document for: Discussion and Decision.

R1-1904313; 3GPP TSG RAN WG1 Meeting #96bis; Xi'an, China, Apr. 8-12, 2019; Source: Intel Corporation; Title: On multi-TRP/multi-panel transmission; Agenda item: 7.2.8.2; Document for: Discussion and Decision.

R1-1904449; 3GPP TSG RAN WG1 Meeting #96bis; Xi'an, China, Apr. 8-12, 2019; Agenda item: 7.2.8.2; Source: Samsung; Title: Enhancements on Multi-TRP/Panel Transmission; Document for: Discussion and Decision.

R1-1904475; 3GPP TSG-RAN1 Meeting # 96bis; Xi'an, China, Apr. 8-12, 2019; Agenda Item: 7.2.8.2; Source: MediaTek Inc.; Title: Enhancements on multi-TRP/panel transmission; Document for: Discussion.

R1-1904561; 3GPP TSG RAN WG1 #96bis; Xi'an, China, Apr. 8-12, 2019; Source: CATT; Title: Consideration on multi-TRP/panel transmission; Agenda Item: 7.2.8.2; Document for: Discussion and Decision.

R1-1904572; 3GPP TSG RAN WG1 #96bis; Xi'an, China, Apr. 8-12, 2019; Agenda Item: 7.2.8.2; Source: Lenovo, Motorola Mobility; Title: Discussion of multi-TRP/panel transmission; Document for: Discussion.

R1-1904597; 3GPP TSG RAN WG1 Meeting #96bis; Xi'an, China, Apr. 8-12, 2019; Source: Fujitsu; Title: Enhancements on multi-TRP transmission; Agenda Item: 7.2.8.2; Document for: Discussion and Decision.

R1-1904663; 3GPP TSG RAN WG1 #96bis; Xi'an, China, Apr. 8-12, 2019; Agenda item: 7.2.8.2; Source: NEC; Title: Discussion on multi-TRP operation; Document for: Discussion and Decision.

R1-1904735; 3GPP TSG RAN WG1 #96bis; Xi'an, China, Apr. 8-12, 2019; Agenda item: 7.2.8.2; Source: CMCC; Title: Discussion on multi-TRP/panel transmission; Document for: Discussion and Decision.

R1-1904750; 3GPP TSG RAN WG1 Meeting RAN1#96-bis; Xi'an, China, Apr. 8-12, 2019; Source: Ericsson; Title: On multi-TRP and multi-panel; Agenda Item: 7.2.8.2; Document for: Discussion and Decision.

R1-1904784; 3GPP TSG RAN WG1 Meeting #96; Xi'an, China, Apr. 8-Apr. 12, 2019; Agenda Item: 7.2.8.2; Source: Spreadtrum Communications; Title: Discussion on Multi-TRP transmission; Document for: Discussion and Decision.

R1-1904860; 3GPP TSG RAN WG1 #96b; Xi'an, China, Apr. 8-12, 2019; Source: InterDigital Inc.; Title: Link-level Evaluation of Multi-TRP Schemes; Agenda item: 7.2.8.2; Document for: Discussion and Decision.

R1-1904879; 3GPP TSG RAN WG1 Meeting #96bis; Xi'an, China, Apr. 8-12, 2019; Source: Sharp; Title: Discussion on multi-TRP/panel techniques for URLLC; Agenda Item: 7.2.8.2; Document for: Discussion and Decision.

R1-1904914; 3GPP TSG RAN WG1 #96bis; Xi'an, China, Apr. 8-12, 2019; Agenda item: 7.2.8.2; Source: China Telecom; Title: Discussion on Multi-TRP/Panel Transmission enhancements; Document for: Discussion.

R1-1904966; 3GPP TSG RAN WG1 #96bis; Xi'an, China, Apr. 8-12, 2019; Source: NTT Docomo, Inc; Title: Enhancements on multi-TRP/panel transmission; Agenda Item: 7.2.8.2; Document for: Discussion and Decision.

R1-1904982; 3GPP TSG RAN WG1 #96bis; Xi'an, China, Apr. 8-12, 2019; Agenda Item: 7.2.8.2; Source: Apple; Title: Considerations on PDCCH design for NCJT; Document for: Discussion/Decision.

(56) References Cited

OTHER PUBLICATIONS

R1-1905026; 3GPP TSG-RAN WG1 Meeting #96b; Apr. 8-12, 2019; Xi'an, China; Agenda item: 7.2.8.2; Source: Qualcomm Incorporated; Title: Multi-TRP Enhancements; Document for: Discussion/ Decision.
R1-1905056; 3GPP TSG RAN WG1 Meeting #96bis; Xi'an, China, Apr. 8-12, 2019; Source: KDDI; Title: Enhancements on Multi-TRP/panel transmission; Agenda Item: 7.2.8.2; Document for: Discussion/ Decision.
R1-1905057; 3GPP TSG-RAN WG1 Meeting #96-Bis; Xi'an, China, Apr. 8-12, 2019; Source: Asia Pacific Telecom; Title: Enhancements on Multi-TRP/Panel Transmission; Agenda item: 7.2.8.2; Document for: Discussion and Decision.
R1-1905064; 3GPP TSG RAN WG1 #96bis Meeting; Xi'an, China, Apr. 8-Apr. 12, 2019; Agenda item: 7.2.8.2; Source: Nokia, Nokia Shanghai Bell; Title: Enhancements on Multi-TRP/Panel Transmission; Document for: Discussion and Decision.
R1-1905153; 3GPP TSG RAN WG1 #96bis; Xi'an, China, Apr. 8-12, 2019; Agenda Item: 7.2.8.2; Source: ASUSTeK; Title: Enhancements on multiple TRP or panel transmission; Document for: Discussion and Decision.
R1-1903046; 3GPP TSG RAN WG1 #96; Athens, Greece, Feb. 25-Mar. 1, 2019; Agenda Item: 7.2.8.2; Source: ASUSTeK; Title: Enhancements on multiple TRP or panel transmission; Document for: Discussion and Decision.

* cited by examiner

User Plane Protocol Stack

Control Plane Protocol Stack

Single TRP

DYNAMIC TRANSMISSION RECEPTION POINT GROUP INDICATION

CROSS-REFERENCE TO RELATED APPLICATIONS

This application is a continuation of U.S. patent application Ser. No. 17/873,241, filed Jul. 26, 2022, which is a continuation of U.S. patent application Ser. No. 16/851,666, filed Apr. 17, 2020, which claims the benefit of U.S. Provisional Application No. 62/841,777, filed May 1, 2019, all of which are hereby incorporated by reference in their entireties.

DETAILED DESCRIPTION OF EMBODIMENTS

Figure 1:
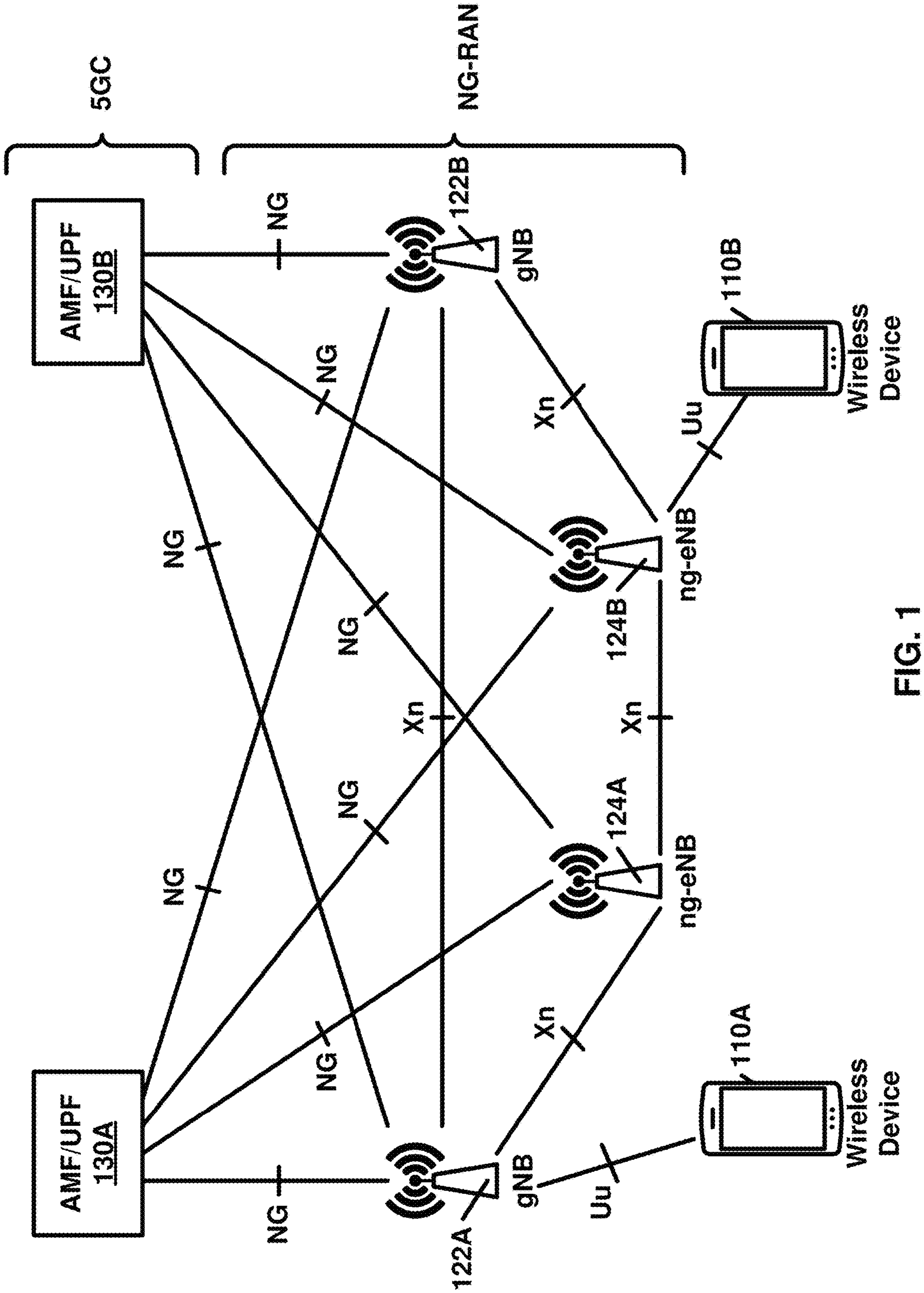
FIG. 1 is a diagram of an example RAN architecture as per an aspect of an embodiment of the present disclosure.

Example embodiments of the present disclosure enable operation of activation and/or deactivation of one or more transmission configuration groups. Embodiments of the technology disclosed herein may be employed in the technical field of multicarrier communication systems. More particularly, the embodiments of the technology disclosed herein may relate to multicarrier communication systems.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying BWP Bandwidth Part
CA Carrier Aggregation
CBG Code Block Group
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CS-RNTI Configured Scheduling-Radio Network Temporary Identifier
CSI Channel State Information
CSI-RS Channel State Information-Reference Signal
CORESET Control REsource SET
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DMRS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MCS-C-RNTI Modulation and Coding Scheme-Cell-Radio Network Temporary Identity
MeNB Master evolved Node B
MIB Master Information Block
MME Mobility Management Entity
MN Master Node
NACK Negative Acknowledgement
NAS Non-Access Stratum
NDI New Data Indicator
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
P-RNTI Paging-Temporary Radio Network Temporary Identifier
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
Qos Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RNTI Radio Network Temporary Identity
RRC Radio Resource Control
RS Reference Signal
RSRP Reference Signal Received Power
RV Redundancy Version
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SLIV Start and Length Indicator Value
SMF Session Management Function
SN Secondary Node
SpCell Special Cell
SRB Signaling Radio Bearer
SRS Sounding Reference Signal
SS Synchronization Signal
SSS Secondary Synchronization Signal
SUL Supplementary Uplink STAG secondary Timing Advance Group
TA Timing Advance
TAG Timing Advance Group
TAI Tracking Area Identifier
TAT Time Alignment Timer
TB Transport Block
TCI Transmission Configuration Indication
TC-RNTI Temporary Cell-Radio Network Temporary Identifier
TDD Time Division Duplex
TDMA Time Division Multiple Access
TPC Transmit Power Control
TRP Transmission and Reception Point
TTI Transmission Time Interval
UCI Uplink Control Information
UE User Equipment
UL Uplink
UL-SCH Uplink Shared CHannel
UPF User Plane Function
UPGW User Plane Gateway
URLLC Ultra Reliable Low Latency Communication
VHDL VHSIC Hardware Description Language
Xn-C Xn-Control plane
Xn-U Xn-User plane
ZP CSI-RS Zero power CSI-RS Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g., 120A, 120B) providing New Radio (NR) user plane and control plane protocol terminations towards a first wireless device (e.g., 110A). In an example, a RAN node may be a next generation evolved Node B (ng-eNB) (e.g., 124A, 124B), providing Evolved UMTS Terrestrial Radio Access (E-UTRA) user plane and control plane protocol terminations towards a second wireless device (e.g., 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g., 122A and/or 122B), ng-eNB (e.g., 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g., 130A or 130B). A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g., packet filtering, gating, Uplink (UL)/Downlink (DL) rate enforcement, uplink traffic verification (e.g., Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between 3rd Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
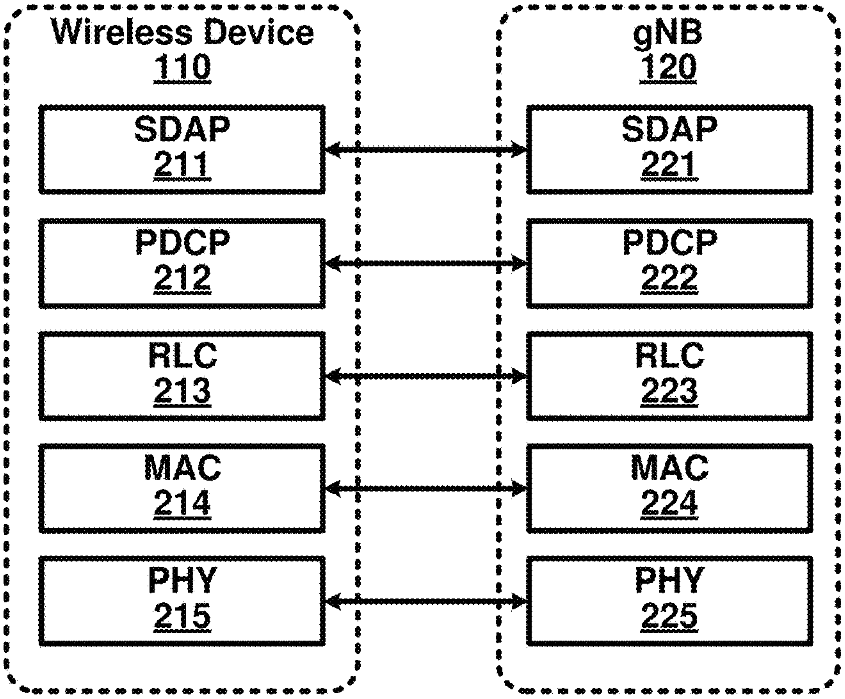
FIG. 2A is a diagram of an example user plane protocol stack as per an aspect of an embodiment of the present disclosure.

FIG. 2A is an example user plane protocol stack, where Service Data Adaptation Protocol (SDAP) (e.g., 211 and 221), Packet Data Convergence Protocol (PDCP) (e.g., 212 and 222), Radio Link Control (RLC) (e.g., 213 and 223) and Media Access Control (MAC) (e.g., 214 and 224) sublayers and Physical (PHY) (e.g., 215 and 225) layer may be terminated in wireless device (e.g., 110) and gNB (e.g., 120) on the network side. In an example, a PHY layer provides transport services to higher layers (e.g., MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g., one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g., in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
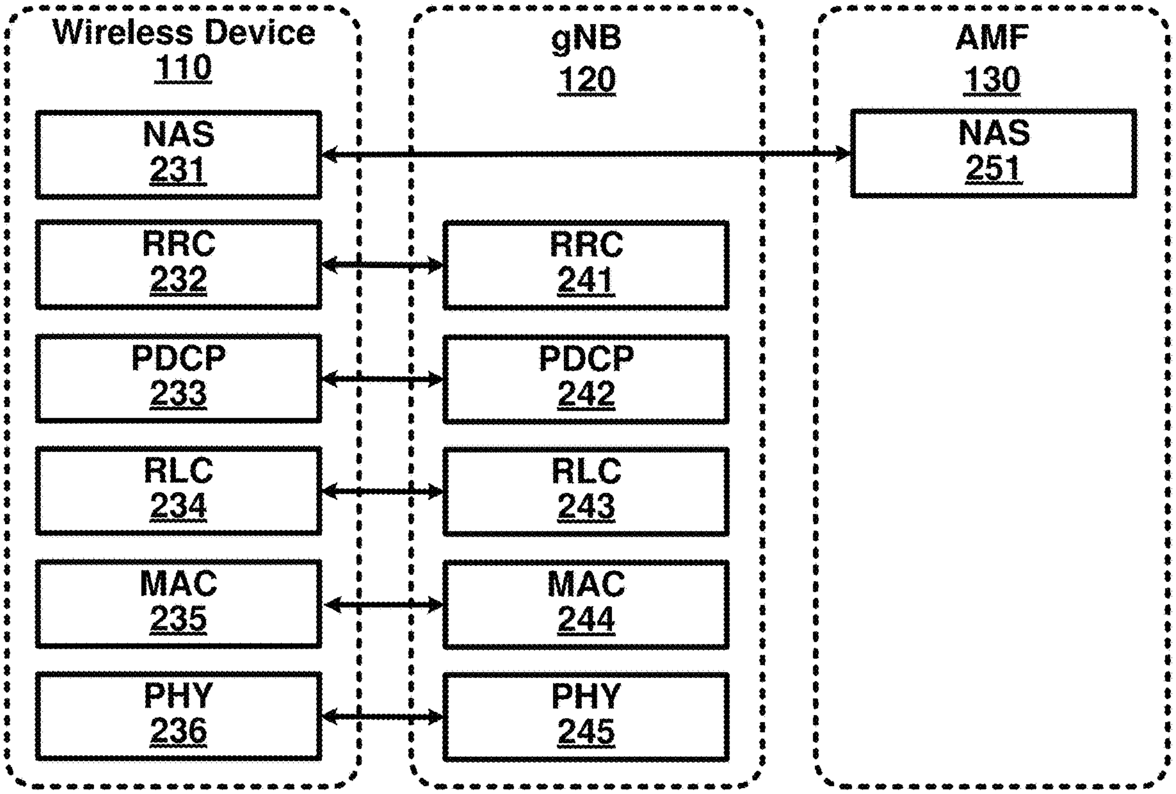
FIG. 2B is a diagram of an example control plane protocol stack as per an aspect of an embodiment of the present disclosure.

FIG. 2B is an example control plane protocol stack where PDCP (e.g., 233 and 242), RLC (e.g., 234 and 243) and MAC (e.g., 235 and 244) sublayers and PHY (e.g., 236 and 245) layer may be terminated in wireless device (e.g., 110) and gNB (e.g., 120) on a network side and perform service and functions described above. In an example, RRC (e.g., 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g., 231 and 251) may be terminated in the wireless device and AMF (e.g., 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
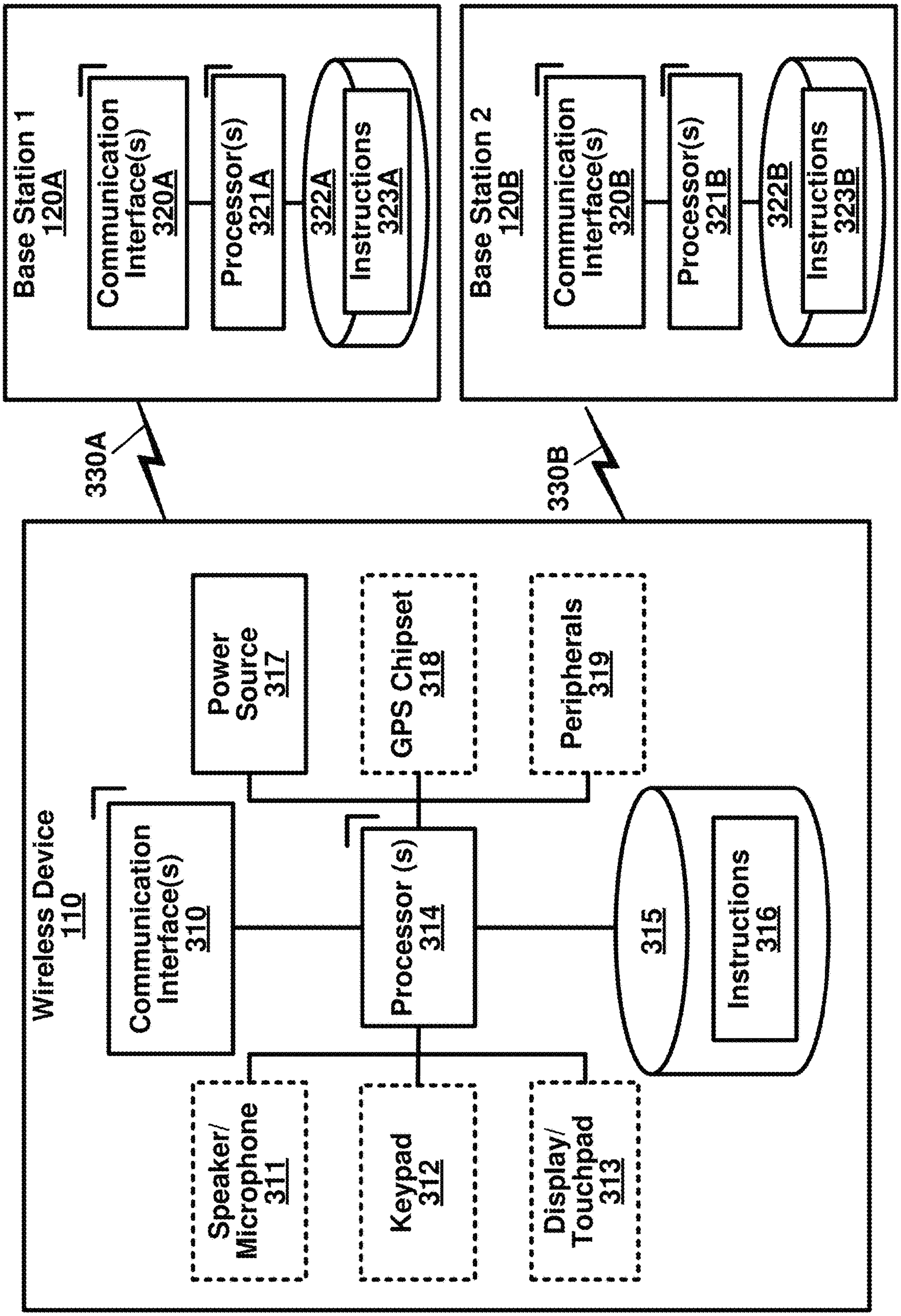
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g., a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g., Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g., RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g., AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g., NG-RAN) may keep a 5GC-NG-RAN connection (both C/U-planes) for the wireless device; and/or store a UE AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g., due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g., to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g., RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g., a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g., AMF, UPF, SMF, etc.) may comprise one or more communication interfaces, one or more processors, and memory storing instructions.

A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

Figure 4A:
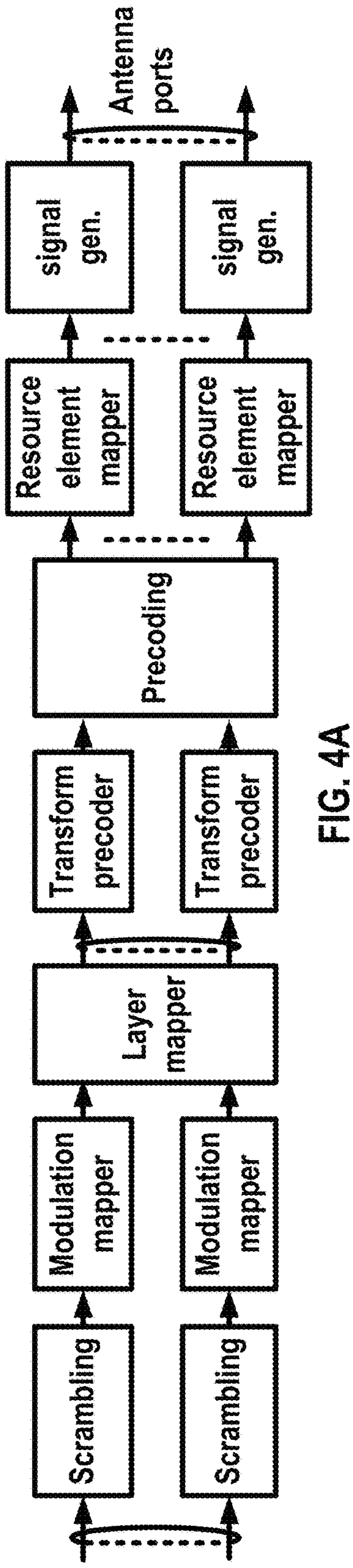
FIG. 4A, FIG. 4B, FIG. 4C and FIG. 4D are example diagrams for uplink and downlink signal transmission as per an aspect of an embodiment of the present disclosure.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

Figure 4B:
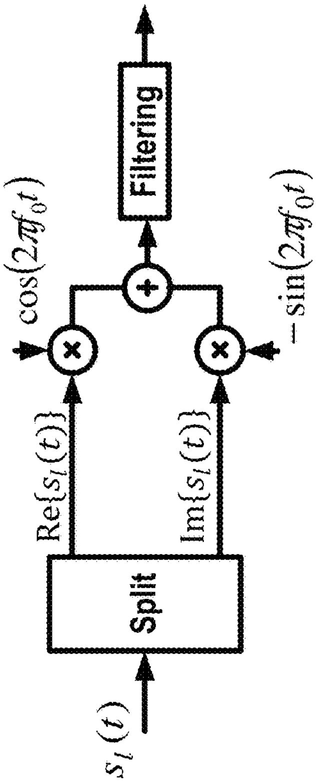

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

Figure 4D:
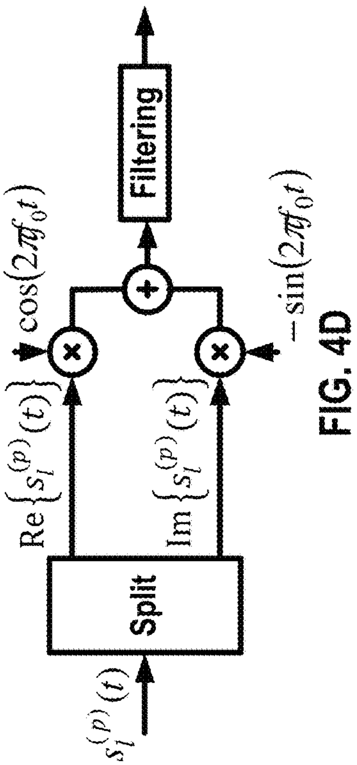
Figure 4C:
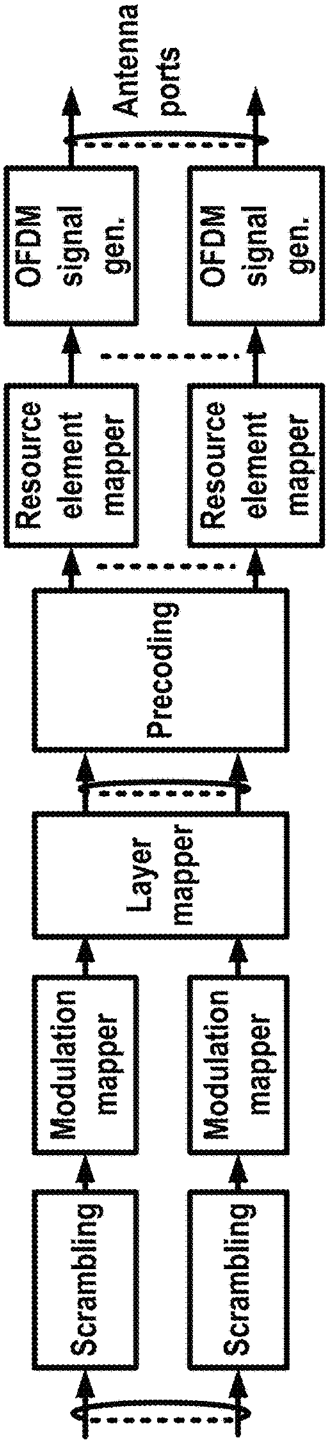

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
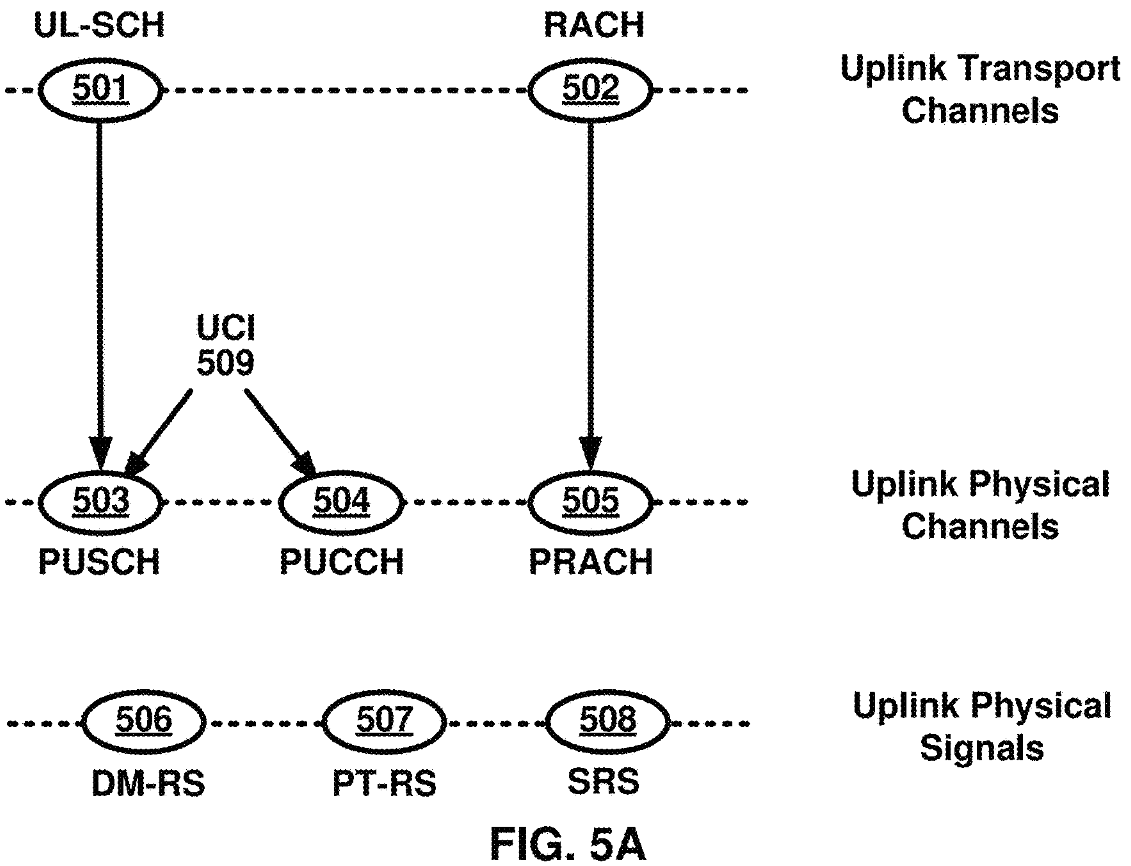
FIG. 5A is a diagram of an example uplink channel mapping and example uplink physical signals as per an aspect of an embodiment of the present disclosure.
Figure 5B:
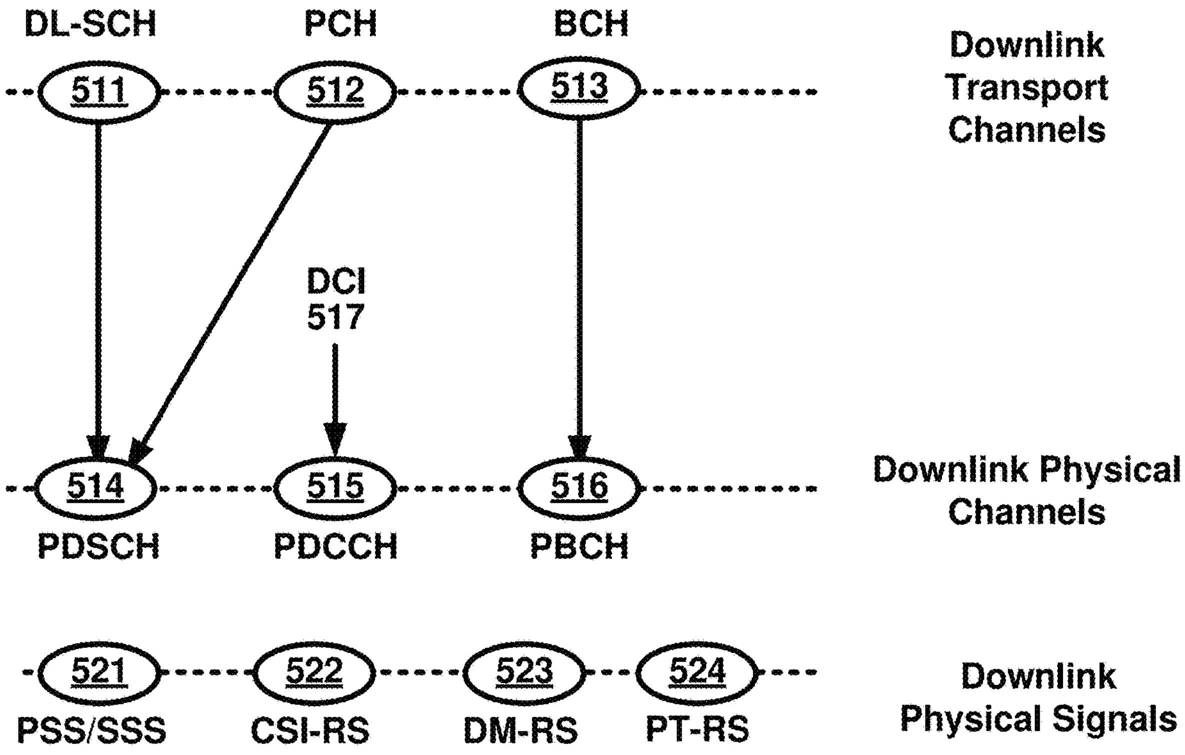
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517.

For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation RS (DMRS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DMRS 523, and/or PT-RS 524.

In an example, a UE may transmit one or more uplink DMRSs 506 to a base station for channel estimation, for example, for coherent demodulation of one or more uplink physical channels (e.g., PUSCH 503 and/or PUCCH 504). For example, a UE may transmit a base station at least one uplink DMRS 506 with PUSCH 503 and/or PUCCH 504, wherein the at least one uplink DMRS 506 may be spanning a same frequency range as a corresponding physical channel. In an example, a base station may configure a UE with one or more uplink DMRS configurations. At least one DMRS configuration may support a front-loaded DMRS pattern. A front-loaded DMRS may be mapped over one or more OFDM symbols (e.g., 1 or 2 adjacent OFDM symbols). One or more additional uplink DMRS may be configured to transmit at one or more symbols of a PUSCH and/or PUCCH. A base station may semi-statistically configure a UE with a maximum number of front-loaded DMRS symbols for PUSCH and/or PUCCH. For example, a UE may schedule a single-symbol DMRS and/or double symbol DMRS based on a maximum number of front-loaded DMRS symbols, wherein a base station may configure the UE with one or more additional uplink DMRS for PUSCH and/or PUCCH. A new radio network may support, e.g., at least for CP-OFDM, a common DMRS structure for DL and UL, wherein a DMRS location, DMRS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DMRS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DMRS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and Control REsource SET (CORESET) when the downlink CSI-RS 522 and CORESET are spatially quasi co-located and resource elements associated with the downlink CSI-RS 522 are the outside of Physical Resource Block (PRB)s configured for CORESET. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DMRSs 523 to a base station for channel estimation, for example, for coherent demodulation of one or more downlink physical channels (e.g., PDSCH 514). For example, a radio network may support one or more variable and/or configurable DMRS patterns for data demodulation. At least one downlink DMRS configuration may support a front-loaded DMRS pattern. A front-loaded DMRS may be mapped over one or more OFDM symbols (e.g., 1 or 2 adjacent OFDM symbols). A base station may semi-statistically configure a UE with a maximum number of front-loaded DMRS symbols for PDSCH 514. For example, a DMRS configuration may support one or more DMRS ports. For example, for single user-MIMO, a DMRS configuration may support at least 8 orthogonal downlink DMRS ports. For example, for multiuser-MIMO, a DMRS configuration may support 12 orthogonal downlink DMRS ports. A radio network may support, e.g., at least for CP-OFDM, a common DMRS structure for DL and UL, wherein a DMRS location, DMRS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DMRS ports in a scheduled resource. For example, downlink PT-RS 524 may be confined in the scheduled time/frequency duration for a UE.

Figure 6:
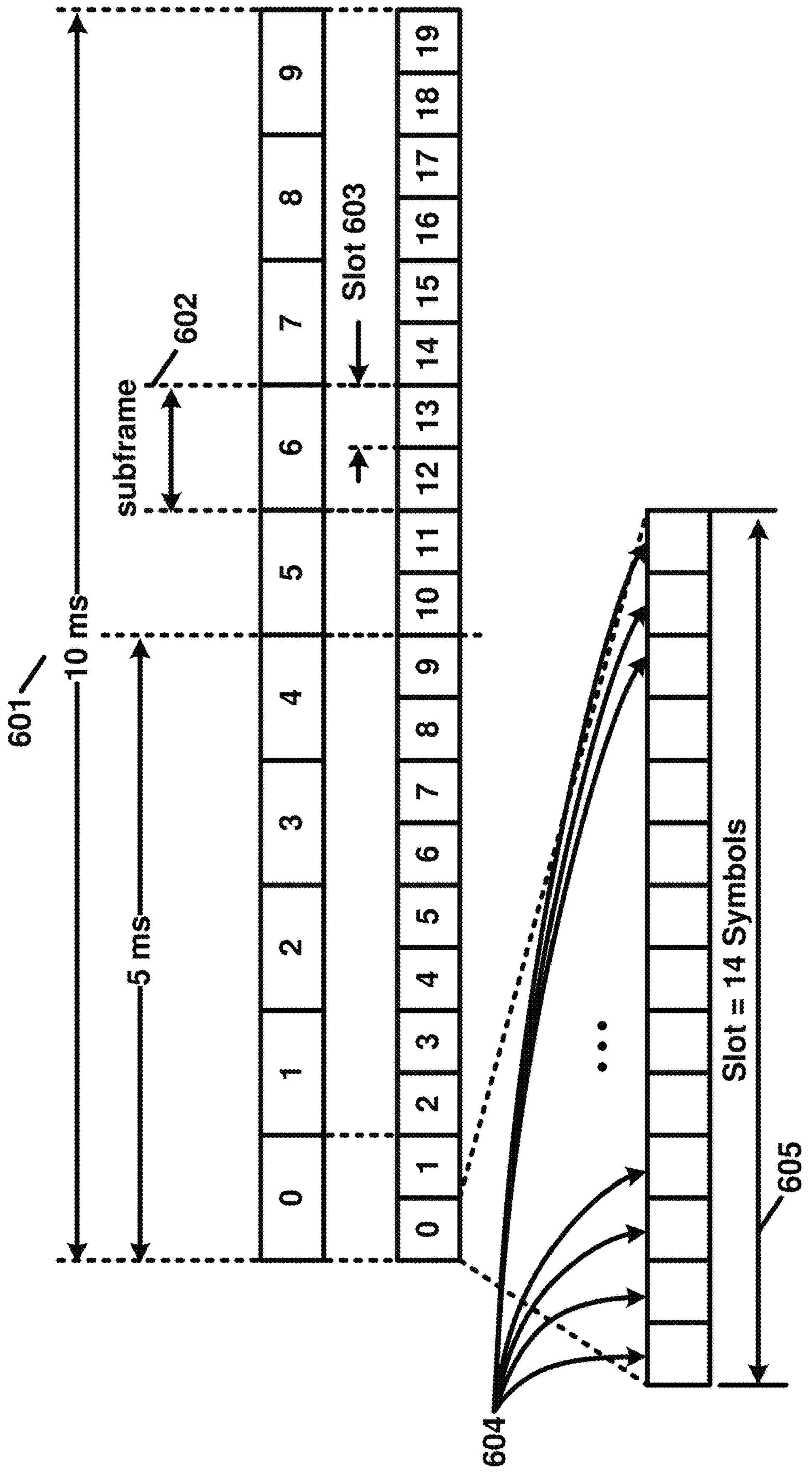
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
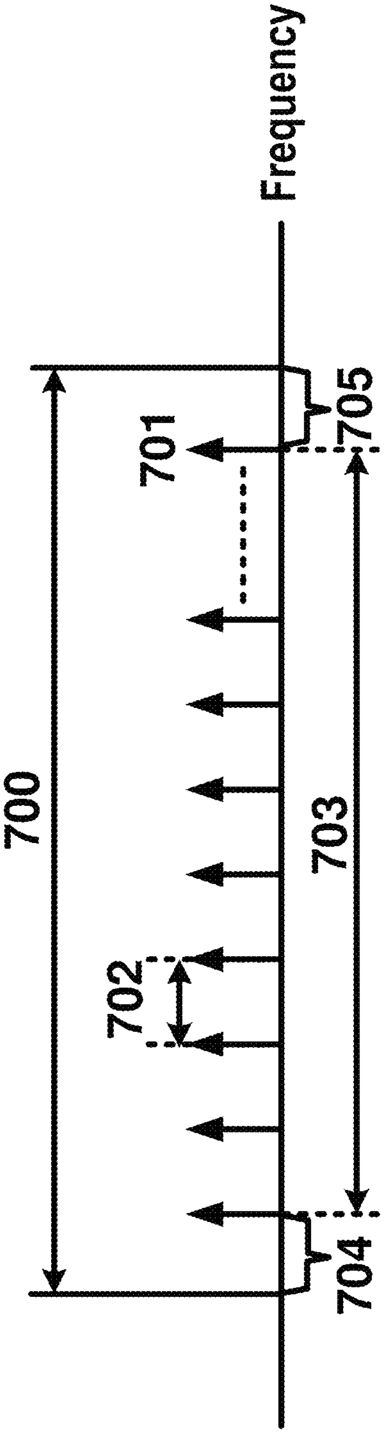
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
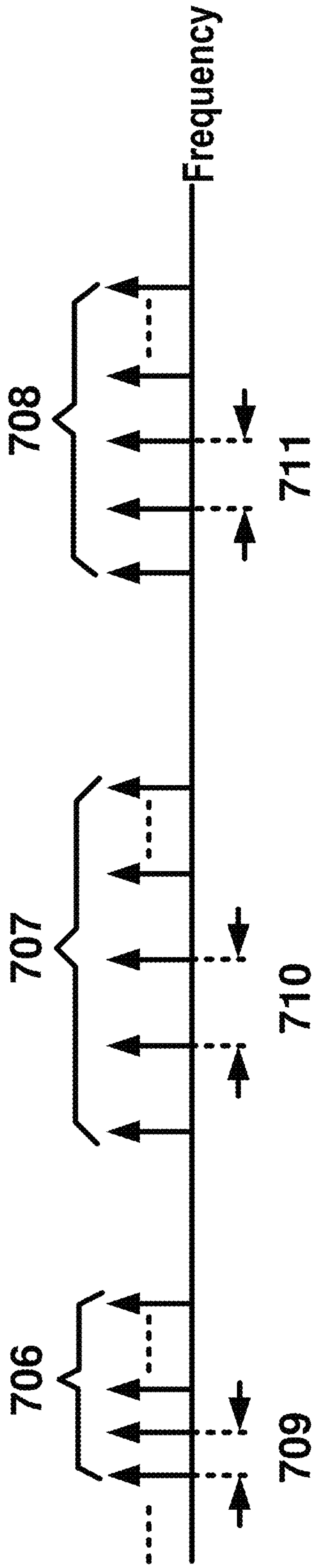

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
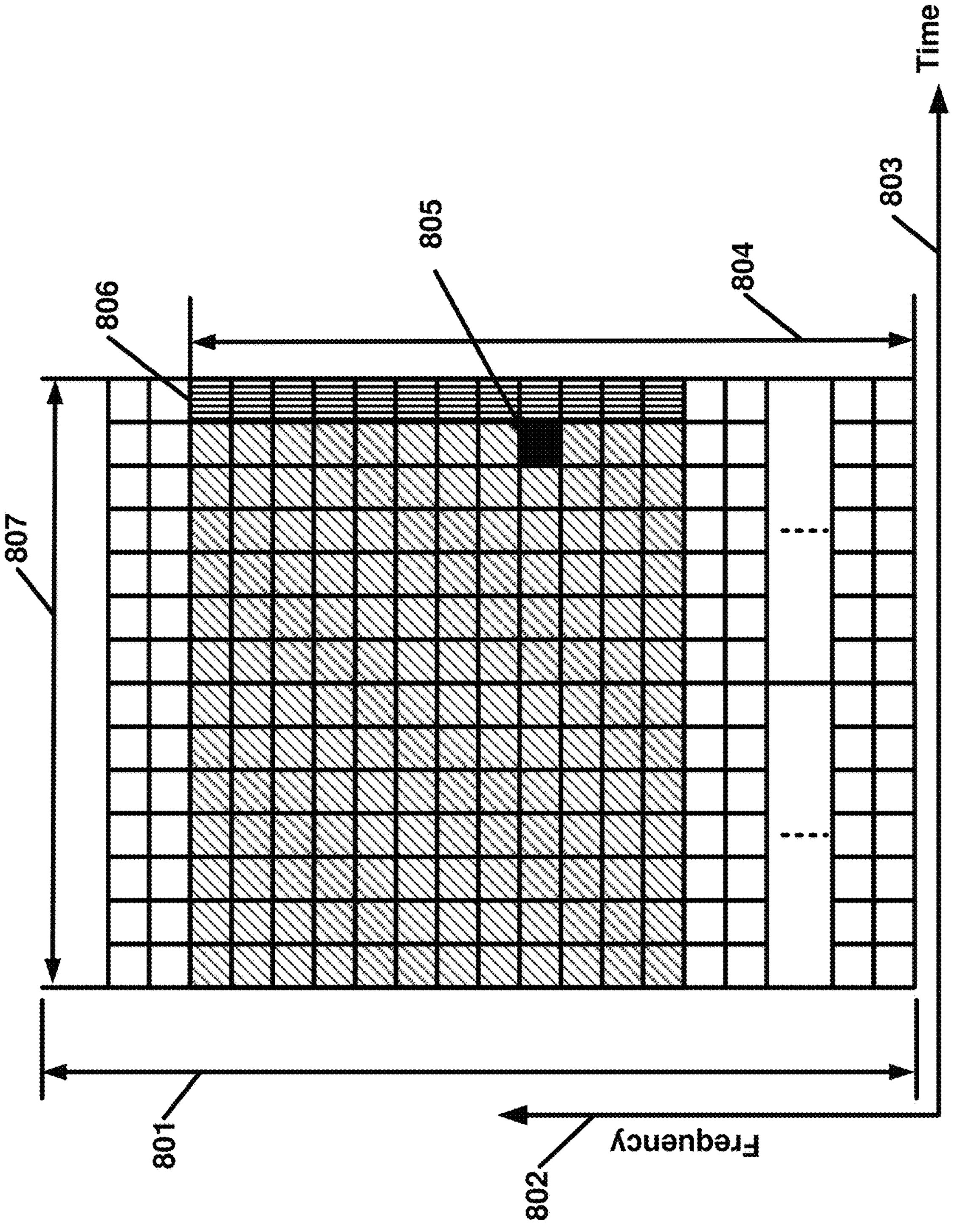
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g., RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g., transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DMRSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DMRSs of a control channel. A RS resource and DMRSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g., RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DMRSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DMRS antenna port(s) of DL data channel. The base station may transmit DCI (e.g., downlink grants) comprising information indicating the RS antenna port(s). The information may indicate RS antenna port(s) which may be QCL-ed with the DMRS antenna port(s). Different set of DMRS antenna port(s) for a DL data channel may be indicated as QCL with different set of the RS antenna port(s).

Figure 9A:
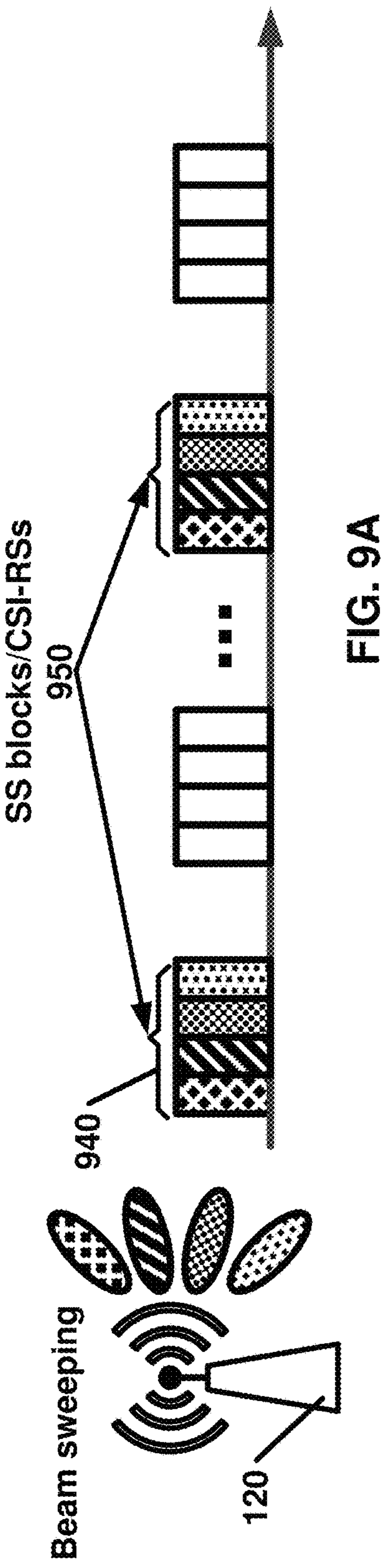
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
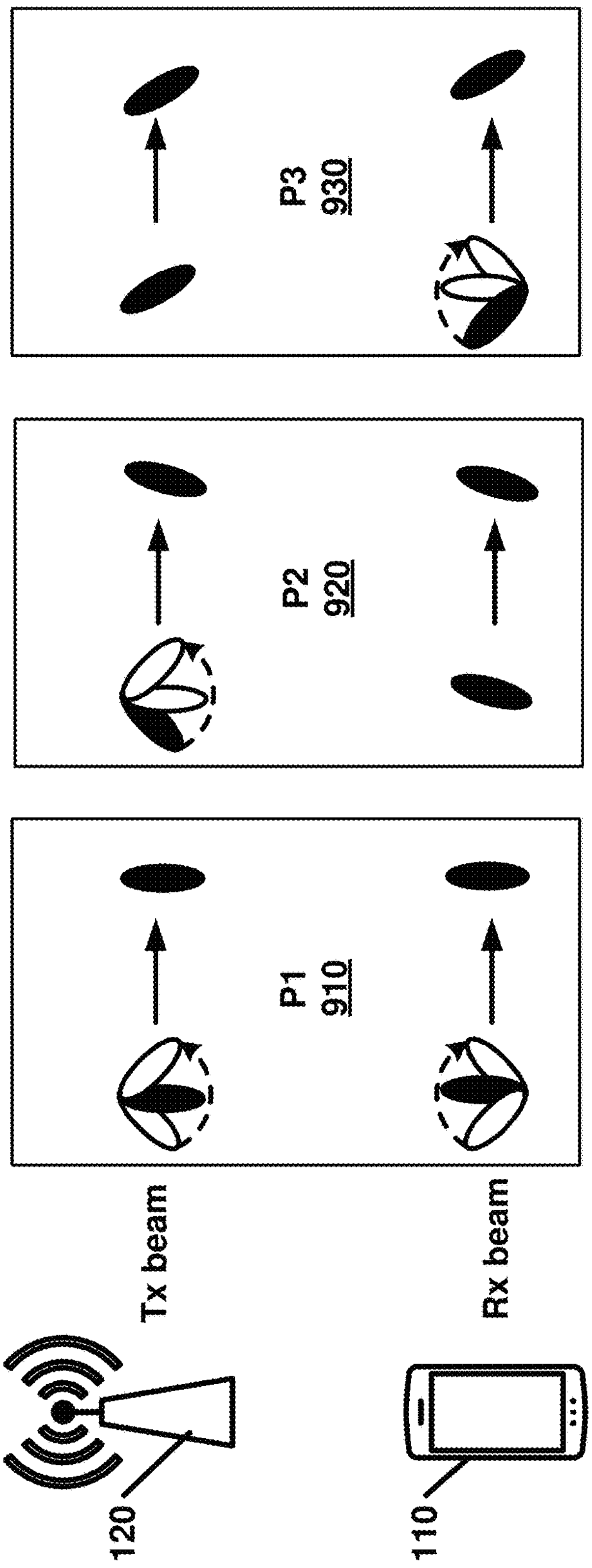
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g., to increase scheduling flexibility. For example, a UE may change a subcarrier spacing, e.g., to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
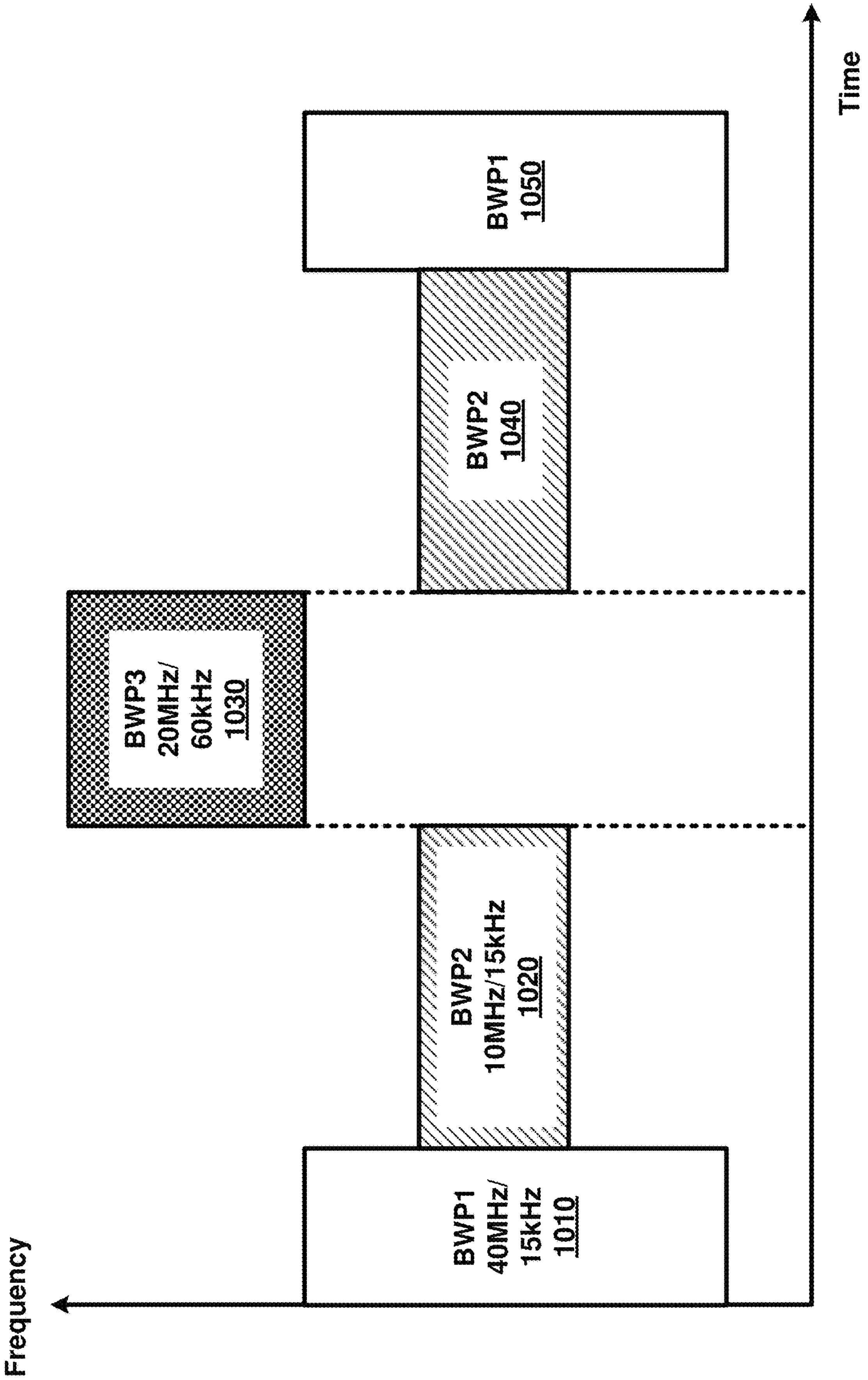
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g., RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
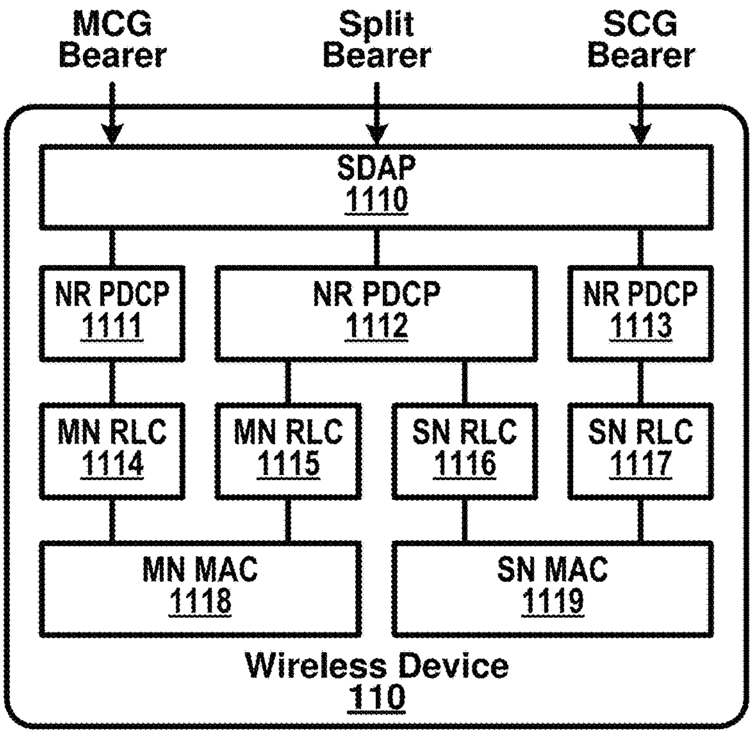
FIG. 11A, and FIG. 11B are diagrams of an example multi connectivity as per an aspect of an embodiment of the present disclosure.
Figure 11B:
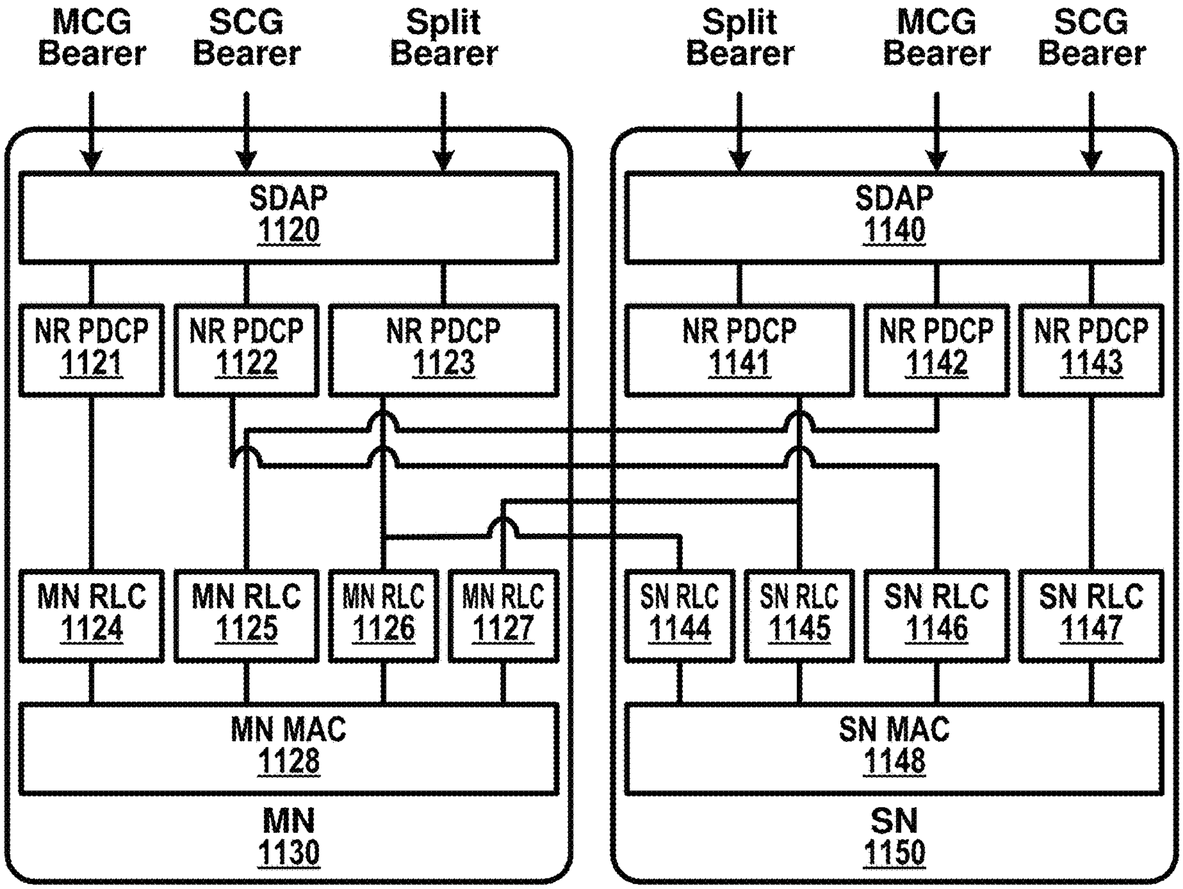

FIG. 11A and FIG. 11B show packet flows employing a multi connectivity (e.g., dual connectivity, multi connectivity, tight interworking, and/or the like). FIG. 11A is an example diagram of a protocol structure of a wireless device 110 (e.g., UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g., Wireless Device 110) may transmit and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

In an example, a master base station (e.g., MN 1130) and/or a secondary base station (e.g., SN 1150) may transmit/receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities: one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g., with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g., based on received measurement reports, traffic conditions, and/or bearer types) may decide to request a secondary base station to provide additional resources (e.g., serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g., PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g., for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
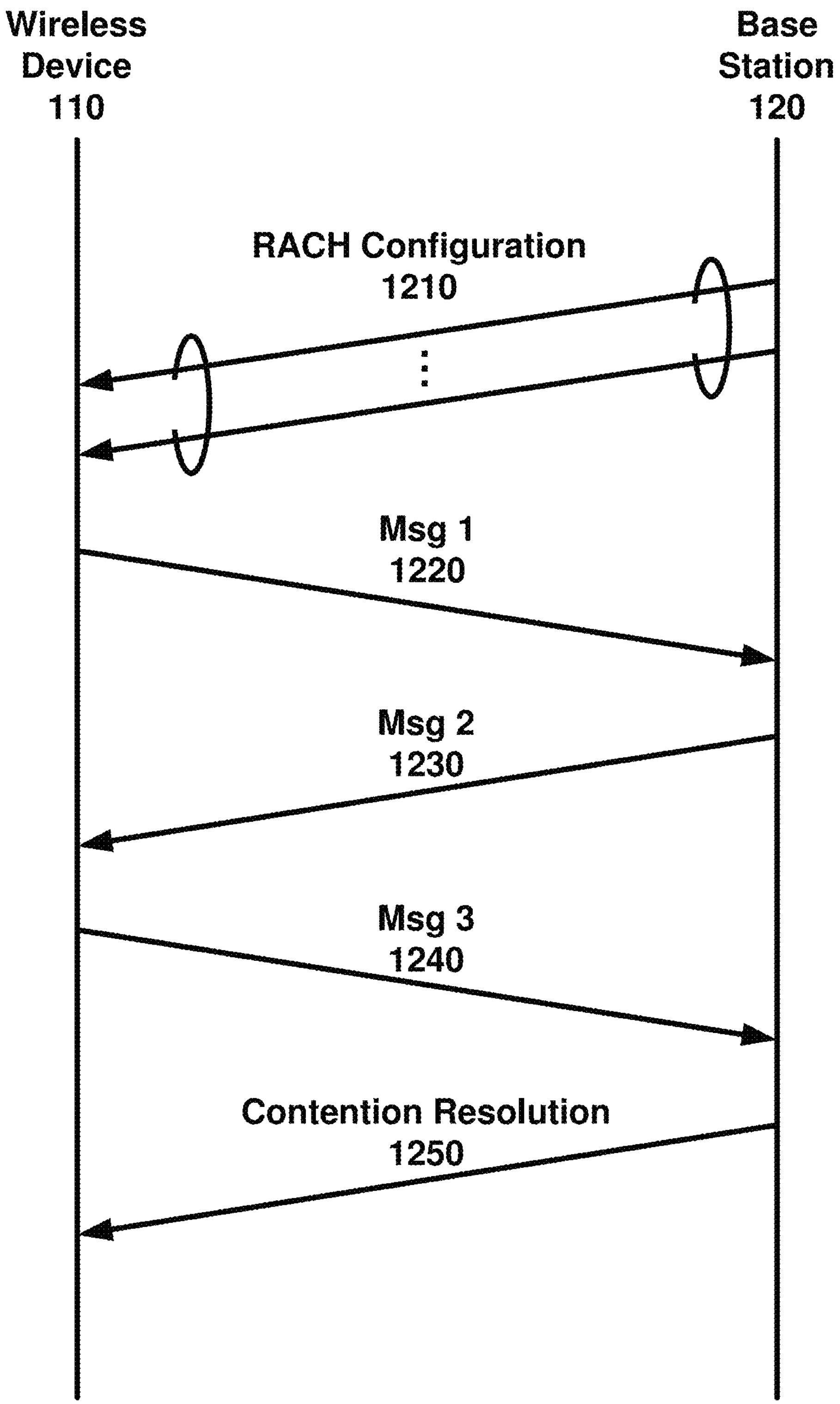
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g., with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-Response Window or bfr-Response Window) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g., RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
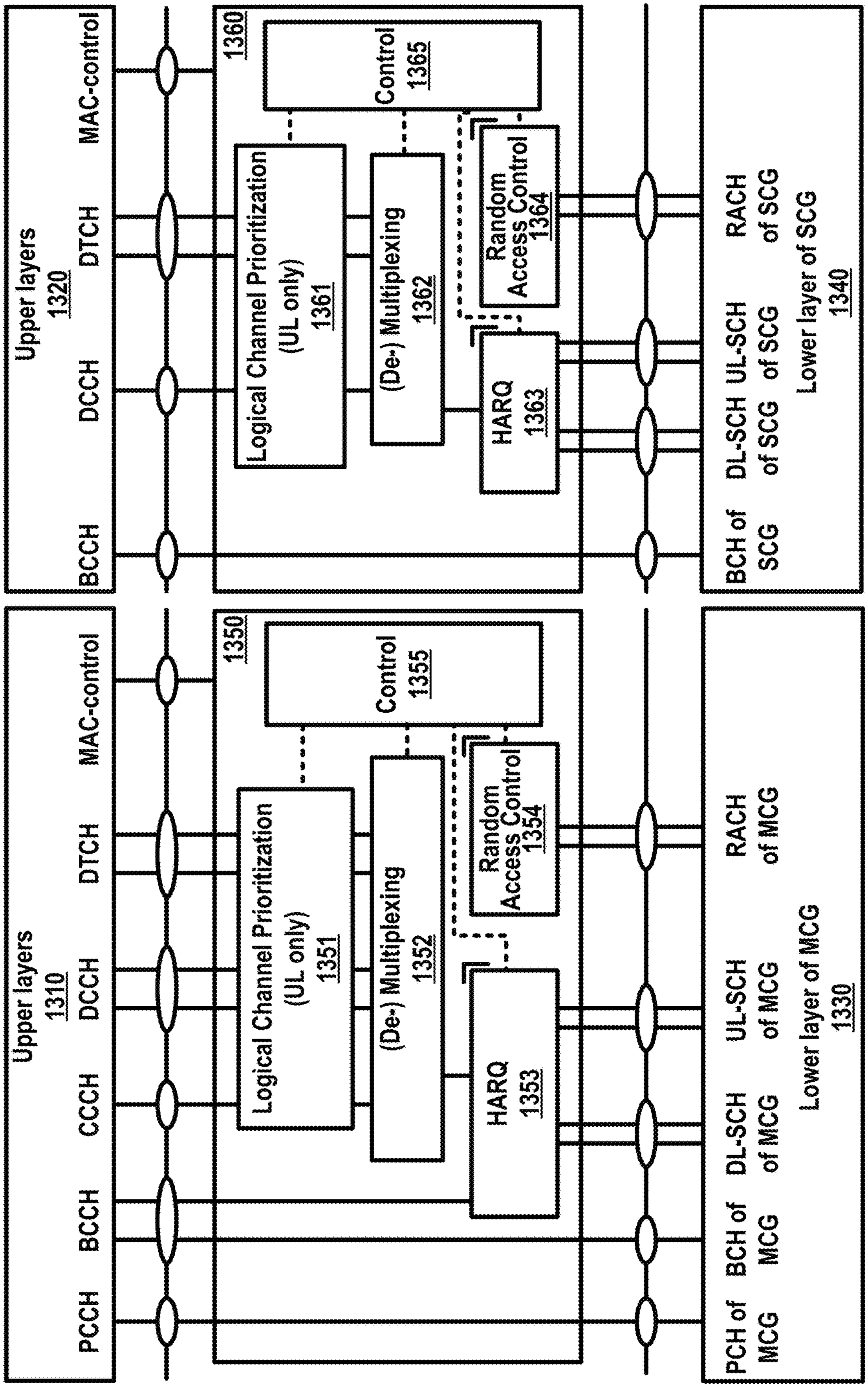
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g., one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g., 1310) may provide services on PCCH, BCCH, CCCH, DCCH, DTCH and MAC control elements. In an example, a second MAC entity (e.g., 1320) may provide services on BCCH, DCCH, DTCH and MAC control elements.

A MAC sublayer may expect from a physical layer (e.g., 1330 or 1340) services such as data transfer services, signaling of HARQ feedback, signaling of scheduling request or measurements (e.g., CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g., 1355 or 1365) element. Functions performed by a MAC entity may comprise mapping between logical channels and transport channels (e.g., in uplink or downlink), multiplexing (e.g., 1352 or 1362) of MAC SDUs from one or different logical channels onto transport blocks (TB) to be delivered to the physical layer on transport channels (e.g., in uplink), demultiplexing (e.g., 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g., 1363), and logical channel prioritization in uplink (e.g., 1351 or 1361). A MAC entity may handle a random access process (e.g., 1354 or 1364).

Figure 14:
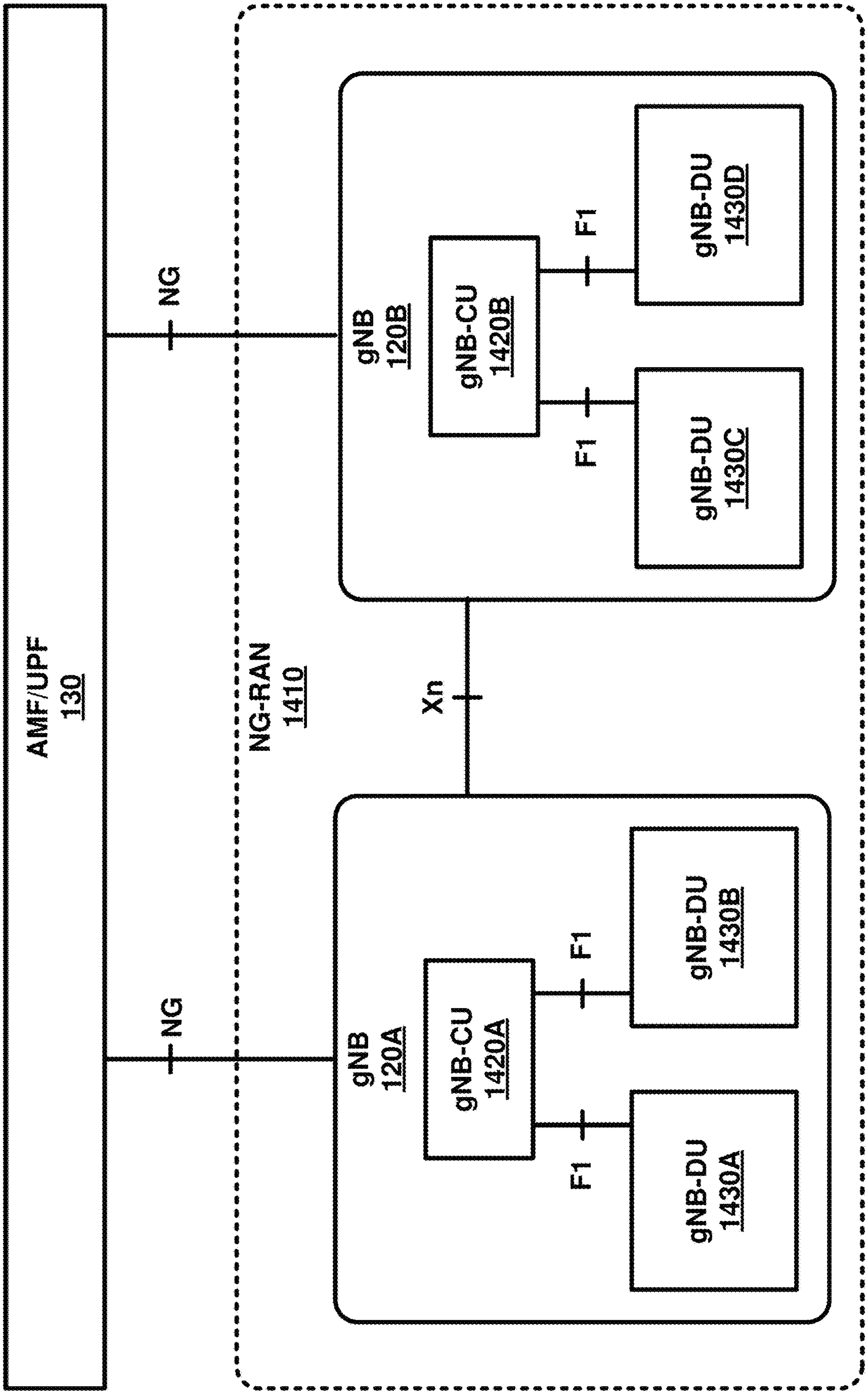
FIG. 14 is a diagram of an example RAN architecture as per an aspect of an embodiment of the present disclosure.

FIG. 14 is an example diagram of a RAN architecture comprising one or more base stations. In an example, a protocol stack (e.g., RRC, SDAP, PDCP, RLC, MAC, and PHY) may be supported at a node. A base station (e.g., 120A or 120B) may comprise a base station central unit (CU) (e.g., gNB-CU 1420A or 1420B) and at least one base station distributed unit (DU) (e.g., gNB-DU 1430A, 1430B, 1430C, or 1430D) if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
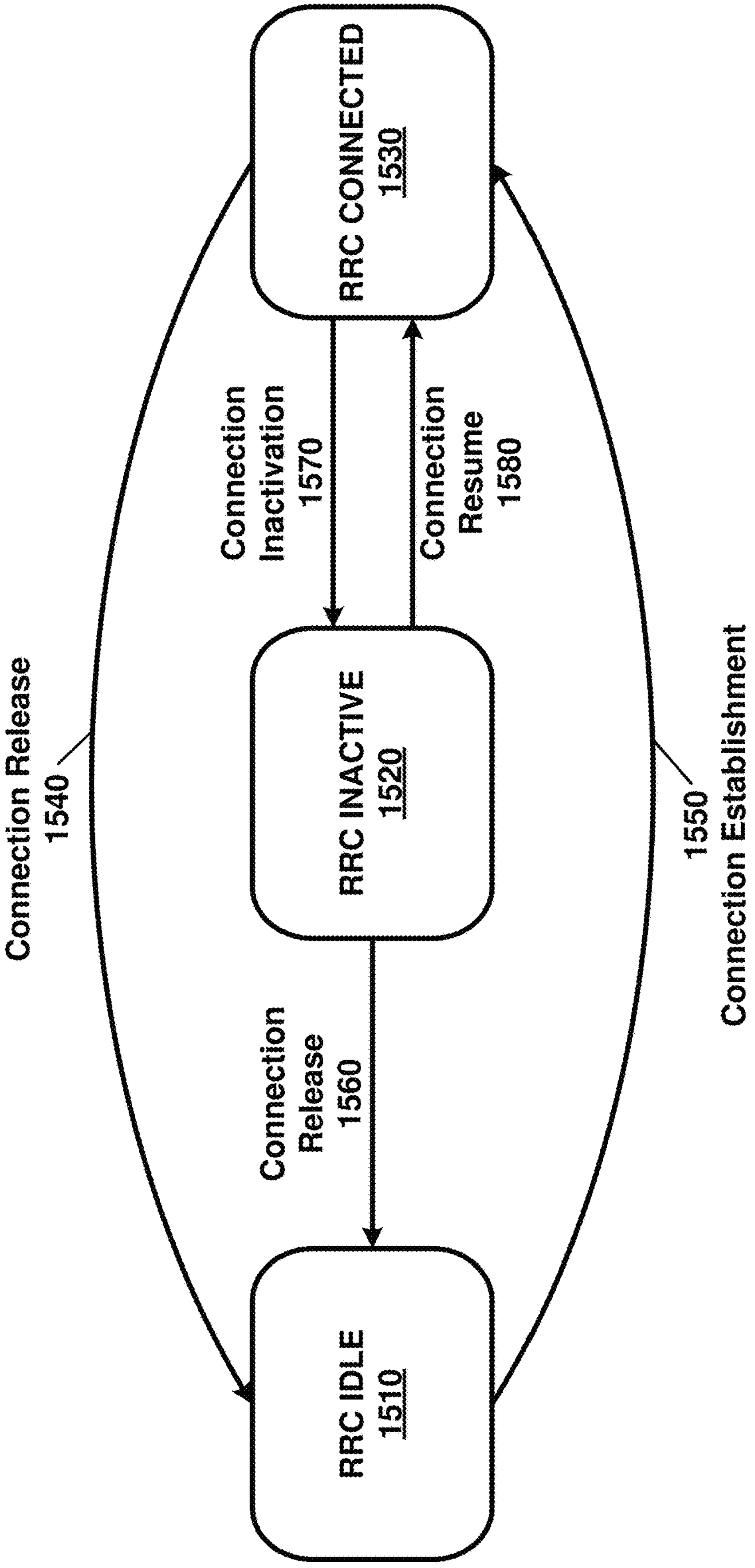
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g., RRC Connected 1530, RRC_Connected), an RRC idle state (e.g., RRC Idle 1510, RRC_Idle), and/or an RRC inactive state (e.g., RRC Inactive 1520, RRC_Inactive). In an example, in an RRC connected state, a wireless device may have at least one RRC connection with at least one base station (e.g., gNB and/or eNB), which may have a UE context of the wireless device. A UE context (e.g., a wireless device context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g., last serving base station).

In an example, a wireless device may transition a UE RRC state between an RRC idle state and an RRC connected state in both ways (e.g., connection release 1540 or connection establishment 1550; or connection reestablishment) and/or between an RRC inactive state and an RRC connected state in both ways (e.g., connection inactivation 1570 or connection resume 1580). In an example, a wireless device may transition its RRC state from an RRC inactive state to an RRC idle state (e.g., connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g., RAN paging message) to base stations of an RNA to reach to a wireless device in an RRC inactive state, and/or the base stations receiving the message from the anchor base station may broadcast and/or multicast another message (e.g., paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g., to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g., 2 stage random access) and/or four messages (e.g., 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g., AMF, MME, and/or the like). A core network entity may update a downlink tunnel endpoint identifier for one or more bearers established for the wireless device between a user plane core network entity (e.g., UPF, S-GW, and/or the like) and a RAN node (e.g., the base station), e.g., changing a downlink tunnel endpoint identifier from an address of the anchor base station to an address of the base station.

In an example, multiple DCI formats may be used for different purposes. In an example, DCI format 0_0 may be used for scheduling of PUSCH in one cell. In an example, DCI format 0_1 may be used for scheduling of PUSCH in one cell.

In an example, DCI format 1_0 may be used for scheduling of PDSCH in one cell. In an example, DCI format 1_0 scrambled by C-RNTI or CS-RNTI or MCS-C-RNTI. may comprise identifier for DCI formats, frequency domain resource assignment, random access preamble index, UL/SUL indicator, SS/PBCH index, PRACH mask index and/or reserved bits. In an example, DCI format 1_0 scrambled by P-RNTI may comprise short messages indicator, short messages, frequency domain resource assignment, time domain resource assignment, VRB-to-PRB mapping, modulation and coding scheme, TB scaling, and/or reserved bits.

In an example, DCI format 1_1 may be used for scheduling of PDSCH in one cell. In an example, DCI format 1_1 scrambled by C-RNTI or CS-RNTI or MCS-C-RNTI may comprise identifier for DCI formats, carrier indicator, bandwidth part indicator, frequency domain resource assignment, time domain resource assignment, VRB-to-PRB mapping, PRB bundling size indicator, rate matching indicator, Zero Power (ZP) CSI-RS trigger, MCS/New Data Indicator (NDI)/Redundancy Version (RV) for each transport block, HARQ process number, downlink assignment index, Transmit Power Control (TPC) command for scheduled PUCCH, PUCCH resource indicator, PDSCH-to-HARQ_feedback timing indicator, Antenna ports of DMRS, transmission configuration indication, SRS request, Code Block Group (CBG) transmission information, CBG flushing out information, and/or DMRS sequence initialization.

In an example, DCI formats 1_1 may be monitored in multiple search spaces associated with multiple CORESETs in a BWP. In this case, zeros may be appended until the payload size of the DCI formats 1_1 monitored in the multiple search spaces equal to the maximum payload size of the DCI format 1_1 monitored in the multiple search spaces.

In an example, the antenna ports of DMRS in DCI format 1_1 may indicate information comprising number of DMRS Code Division Multiplexing (CDM) groups without data, DMRS ports and/or Number of front-load symbols. For example, the number of CDM groups without data values 1, 2, and 3 may refer to CDM groups {0}, {0,1}, and {0,1,2}, respectively. The antenna ports of DMRS may be determined according to the predefined ordering of DMRS port(s).

In an example, transmission configuration indication may be 0 if higher layer parameter tci-PresentInDCI is not enabled. In an example, tci-PresentInDCI may indicate one of RRC configured TCI states for the scheduled PDSCH.

In an example, the time domain resource assignment value m in DCI format 1_0 or DCI format 1_1 may provide a row index m+1 to an allocation table. The determination of the used resource allocation table according to parameters (e.g., RNTI, PDCCH search space, Synchronization Signal (SS)/Physical Broadcasting CHannel (PBCH) block and CORESET multiplexing pattern, pdsch-ConfigCommon includes pdsch-TimeDomainAllocationList, pdsch-Config includes pdsch-TimeDomainAllocationList, PDSCH time domain resource allocation to apply and/or cyclic prefix type) may be defined in predefined tables. In an example, the indexed row may define the slot offset $K_0$, the start and length indicator Value (SLIV), the start symbol S, the allocation length L and/or PDSCH mapping type to be assumed in the PDSCH reception.

In an example, the slot allocated for the PDSCH may be determined as $$\left\lfloor n \cdot \frac{2^{\mu PDSCH}}{2^{\mu PDCCH}} \right\rfloor + K_0,$$

where n is the slot with the scheduling DCI, and $K_0$ is based on the numerology of PDSCH, and $\mu_{PDSCH}$ and $\mu_{PPCCH}$ are the subcarrier spacing configurations for PDSCH and PDCCH, respectively.

In an example, the starting symbol S relative to the start of the slot, and the number of consecutive symbols S counting from the symbol S allocated for the PDSCH may be determined from the start and length indicator SLIV. For example, if (L−1)≤7 then SLIV=14·(L−1)+S. Otherwise SLIV=14·(14−L+1)+(14−1−S) where 0<L≤14−S.

In an example, the wireless device may consider the predefined combinations of S and L as valid allocations considering PDSCH mapping type, cyclic prefix type and/or dmrs-TypeA-Position.

In an example, DCI format 2_0 may be used for notifying a group of wireless devices of the slot format. In an example, DCI format 2_1 may be used for notifying a group of wireless devices of the PRBs and OFDM symbols where a wireless device may assume no transmission is intended for the wireless device. In an example, DCI format 2_2 may be used for transmitting TPC commands for PUCCH and PUSCH. In an example, DCI format 2_3 may be used for transmitting a group of TPC commands for SRS transmissions by one or more wireless devices.

In an example, a wireless device may assume the PDSCH DMRS being mapped to physical resources according to configuration type 1 or configuration type 2 as given by the higher-layer parameter dmrs-Type.

In an example, the wireless device may assume the sequence r (m) may be scaled by a factor $$\beta_{PDSCH}^{DMRS}$$

to conform with the transmission power and mapped to resource elements $(k,l)_{p,\mu}$ according to $$a_{k,l}^{(p,\mu)} = \beta_{PDSCH}^{DMRS} w_f(k') w_t(l') r(2n + k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

where $w_f$(k'), $w_t$(l'), and Δ may be given by predefined tables.

In an example, the resource elements may be within the common resource blocks allocated for PDSCH transmission.

In an example, the reference point k may be subcarrier 0 of the lowest-numbered resource block in CORESET 0 (e.g., if the corresponding PDCCH may be associated with CORESET 0 and Type0-PDCCH common search space and may be addressed to SI-RNTI). In another example, subcarrier 0 in common resource block 0 may be subcarrier 0 (e.g., other cases).

In an example, the reference point for l and position $l_0$ of the first DM-RS symbol may depend on the indicated mapping type in DCI. For example, for PDSCH mapping type A, l may be defined relative to the start of the slot. For example, $l_0$ may be 3 (e.g., the higher-layer parameter dmrs-TypeA-Position is equal to 'pos3'). For example, $l_0$ may be 2 (e.g., otherwise). For example, for PDSCH mapping type B, l may be defined relative to the start of the scheduled PDSCH resources. For example, $l_0$ may be 0.

In an example, the one or more positions of DMRS symbols may be given by $\bar{l}$ and duration $l_d$. For example, for PDSCH mapping type A, $l_d$ may be the duration between the first OFDM symbol of the slot and the last OFDM symbol of the scheduled PDSCH resources in the slot. For example, for PDSCH mapping type B, $l_d$ may be the number of OFDM symbols of the scheduled PDSCH resources.

In an example, dmrs-AdditionalPosition equals to 'pos3' may be only supported when dmrs-TypeA-Position is equal to 'pos2'. In an example, for PDSCH mapping type A, $l_d$=3 and/or $l_d$=4 symbols may be only applicable when dmrs-TypeA-Position is equal to 'pos2'.

In an example, for PDSCH mapping type A single-symbol DM-RS, $l_l$=11 except if the predefined conditions (e.g., lte-CRS-ToMatchAround is configured, any PDSCH DMRS symbol coincides with any symbol containing LTE cell-specific reference signals as indicated by the higher-layer parameter lte-CRS-ToMatchAround, the higher-layer parameters dmrs-AdditionalPosition equal to 'pos1' and $l_0$=3 and/or the indicated capability signaling of supporting $l_l$=12.

In an example, in absence of CSI-RS configuration, and unless otherwise configured, the wireless device may assume PDSCH DMRS and SS/PBCH block may be quasi co-located (e.g., with respect to Doppler shift, Doppler spread, average delay, delay spread, and when applicable, spatial Rx parameters).

In an example, the wireless device may assume that PDSCH DMRS within the same CDM group may be quasi co-located (e.g., with respect to Doppler shift, Doppler spread, average delay, delay spread, and spatial Rx parameters). The wireless device may assume that DMRS ports associated with a PDSCH are quasi co-located (e.g., with QCL Type A, Type D (when applicable) and average gain).

In an example, a wireless device may be configured, by a base station, with one or more serving cells. In an example, the base station may activate one or more second serving cells of the one or more serving cells. In an example, the base station may configure each activated serving cell of the one or more second serving cells with a respective PDCCH monitoring. In an example, the wireless device may monitor a set of PDCCH candidates in one or more CORESETs on an active DL BWP of each activated serving cell configured with the respective PDCCH monitoring. In an example, the wireless device may monitor the set of PDCCH candidates in the one or more CORESETs according to corresponding search space sets. In an example, the monitoring may comprise decoding each PDCCH candidate of the set of PDCCH candidates according to monitored DCI formats.

In an example, a set of PDCCH candidates for a wireless device to monitor may be defined in terms of PDCCH search space sets. In an example, a search space set may be a common search space (CSS) set or a UE specific search space (USS) set.

In an example, one or more PDCCH monitoring occasions may be associated with a SS/PBCH block. In an example, the SS/PBCH block may be quasi-co-located with a CSI-RS. In an example, a TCI state of an active BWP may comprise the CSI-RS. In an example, the active BWP may comprise a CORESET identified with index being equal to zero (e.g., Coreset zero). In an example, the wireless device may determine the TCI state by the most recent of: an indication by a MAC CE activation command or a random-access procedure that is not initiated by a PDCCH order that triggers a non-contention based random access procedure. In an example, for a DCI format with CRC scrambled by a C-RNTI, a wireless device may monitor corresponding PDCCH candidates at the one or more PDCCH monitoring occasions in response to the one or more PDCCH monitoring occasions being associated with the SS/PBCH block.

In an example, a base station may configure a wireless device with one or more DL BWPs in a serving cell. In an example, for a DL BWP of the one or more DL BWPs, the wireless device may be provided by a higher layer signaling with one or more (e.g., 2, 3) control resource sets (CORESETs). For a CORESET of the one or more CORESETs, the base station may provide the wireless device, by a higher layer parameter ControlResourceSet, at least one of: a CORESET index (e.g., provided by higher layer parameter controlResourceSetId), a DMRS scrambling sequence initialization value (e.g., provided by a higher layer parameter pdcch-DMRS-ScramblingID); a number of consecutive symbols (e.g., provided by a higher layer parameter duration), a set of resource blocks (e.g., provided by higher layer parameter frequency DomainResources), CCE-to-REG mapping parameters (e.g., provided by higher layer parameter cce-REG-MappingType), an antenna port quasi co-location (e.g., from a set of antenna port quasi co-locations provided by a first higher layer parameter tci-StatesPDCCH-ToAddList and a second higher layer parameter tci-StatesPDCCH-ToReleaseList), and an indication for a presence or absence of a transmission configuration indication (TCI) field for a DCI format (e.g., DCI format 1_1) transmitted by a PDCCH in the CORESET (e.g., provided by higher layer parameter TCI-PresentInDCI). In an example, the antenna port quasi co-location may indicate a quasi co-location information of one or more DMRS antenna ports for a PDCCH reception in the CORESET. In an example, the CORESET index may be unique among the one or more DL BWPs of the serving cell. In an example, when the higher layer parameter TCI-PresentInDCI is absent, the wireless device may consider that a TCI field is absent/disabled in the DCI format.

In an example, a first higher layer parameter tci-StatesPDCCH-ToAddList and a second higher layer parameter tci-StatesPDCCH-ToReleaseList may provide a subset of TCI states defined in pdsch-Config. In an example, the wireless device may use the subset of the TCI states to provide one or more QCL relationships between one or more RS in a TCI state of the subset of the TCI states and one or more DMRS ports of a PDCCH reception in the CORESET.

In an example, a base station may configure a CORESET for a wireless device. In an example, a CORESET index (e.g., provided by higher layer parameter controlResourceSetId) of the CORESET may be non-zero. In an example, the base station may not provide the wireless device with a configuration of one or more TCI states, by a first higher layer parameter tci-StatesPDCCH-ToAddList and/or a second higher layer parameter tci-StatesPDCCH-ToReleaseList, for the CORESET. In an example, in response to not being provided with the configuration of the one or more TCI states for the CORESET, the wireless device may assume that one or more DMRS antenna ports for a PDCCH reception in the CORESET is quasi co-located with an RS (e.g., SS/PBCH block). In an example, the wireless device may identify the RS during an initial access procedure.

In an example, a base station may configure a CORESET for a wireless device. In an example, a CORESET index (e.g., provided by higher layer parameter controlResourceSetId) of the CORESET may be non-zero. In an example, the base station may provide the wireless device with an initial configuration of at least two TCI states, by a first higher layer parameter tci-StatesPDCCH-ToAddList and/or a second higher layer parameter tci-StatesPDCCH-ToReleaseList, for the CORESET. In an example, the wireless device may receive the initial configuration of the at least two TCI states from the base station. In an example, the wireless device may not receive a MAC CE activation command for at least one of the at least two TCI states for the CORESET. In an example, in response to being provided with the initial configuration for the CORESET and not receiving the MAC CE activation command for the CORESET, the wireless device may assume that one or more DMRS antenna ports for a PDCCH reception in the CORESET is quasi co-located with an RS (e.g., SS/PBCH block). In an example, the wireless device may identify the RS during an initial access procedure.

In an example, a base station may configure a CORESET for a wireless device. In an example, a CORESET index (e.g., provided by higher layer parameter controlResourceSetId) of the CORESET may be equal to zero. In an example, the wireless device may not receive a MAC CE activation command for a TCI state for the CORESET. In response to not receiving the MAC CE activation command, the wireless device may assume that one or more DMRS antenna ports for a PDCCH reception in the CORESET is quasi co-located with an RS (e.g., SS/PBCH block). In an example, the wireless device may identify the RS during an initial access procedure. In an example, the wireless device may identify the RS from a most recent random-access procedure. In an example, the wireless device may not initiate the most recent random-access procedure in response to receiving a PDCCH order triggering a non-contention based random-access procedure.

In an example, a base station may provide a wireless device with a single TCI state for a CORESET. In an example, the base station may provide the single TCI state by a first higher layer parameter tci-StatesPDCCH-ToAddList and/or a second higher layer parameter tci-StatesPDCCH-ToReleaseList. In response to being provided with the single TCI state for the CORESET, the wireless device may assume that one or more DMRS antenna ports for a PDCCH reception in the CORESET is quasi co-located with one or more DL RSs configured by the single TCI state.

In an example, a base station may configure a CORESET for a wireless device. In an example, the base station may provide the wireless device with a configuration of at least two TCI states, by a first higher layer parameter tci-StatesPDCCH-ToAddList and/or a second higher layer parameter tci-StatesPDCCH-ToReleaseList, for the CORESET. In an example, the wireless device may receive the configuration of the at least two TCI states from the base station. In an example, the wireless device may receive a MAC CE activation command for at least one of the at least two TCI states for the CORESET. In response to the receiving the MAC CE activation command for the at least one of the at least two TCI states, the wireless device may assume that one or more DMRS antenna ports for a PDCCH reception in the CORESET is quasi co-located with one or more DL RSs configured by the single TCI state.

In an example, a base station may configure a CORESET for a wireless device. In an example, a CORESET index (e.g., provided by higher layer parameter controlResourceSetId) of the CORESET may be equal to zero. In an example, the base station may provide the wireless device with a configuration of at least two TCI states for the CORESET. In an example, the wireless device may receive the configuration of the at least two TCI states from the base station. In an example, the wireless device may receive a MAC CE activation command for at least one of the at least two TCI states for the CORESET. In an example, in response to the CORESET index being equal to zero, the wireless device may expect that a QCL type (e.g., QCL-TypeD) of a first RS (e.g., CSI-RS) in the at least one of the at least two TCI states is provided by a second RS (e.g., SS/PBCH block). In an example, in response to the CORESET index being equal to zero, the wireless device may expect that a QCL type (e.g., QCL-TypeD) of a first RS (e.g., CSI-RS) in the at least one of the at least two TCI states is spatial QCL-ed with a second RS (e.g., SS/PBCH block).

In an example, a wireless device may receive a MAC CE activation command for at least one of at least two TCI states for a CORESET. In an example, a PDSCH may provide the MAC CE activation command. In an example, the wireless device may transmit a HARQ-ACK information for the PDSCH in a slot. In an example, when the wireless device receives the MAC CE activation command for the at least one of the at least two TCI states for the CORESET, in response to the transmitting HARQ-ACK information in the slot, the wireless device may apply the MAC CE activation command X msec (e.g., 3 msec, 5 msec) after the slot. In an example, when the wireless device applies the MAC CE activation command in a second slot, a first BWP may be active in the second slot. In response to the first BWP being active in the second slot, the first BWP may be an active BWP.

In an example, a base station may configure a wireless device with one or more DL BWPs in a serving cell. In an example, for a DL BWP of the one or more DL BWPs, the wireless device may be provided by higher layers with one or more (e.g., 3, 5, 10) search space sets. In an example, for a search space set of the one or more search space sets, the wireless device may be provided, by a higher layer parameter SearchSpace, at least one of: a search space set index (e.g., provided by higher layer parameter searchSpaceId), an association between the search space set and a CORESET (e.g., provided by a higher layer parameter controlResourceSetId); a PDCCH monitoring periodicity of a first number of slots and a PDCCH monitoring offset of a second number of slots (e.g., provided by a higher layer parameter monitoringSlotPeriodicityAndOffset); a PDCCH monitoring pattern within a slot, indicating first symbol(s) of the CORESET within the slot for PDCCH monitoring, (e.g., provided by a higher layer parameter monitoringSymbolsWithinSlot); a duration of a third number of slots (e.g., provided by a higher layer parameter duration); a number of PDCCH candidates; an indication that the search space set is either a common search space set or a UE-specific search space set (e.g., provided by a higher layer parameter searchSpaceType). In an example, the duration may indicate a number of slots that the search space set may exi In an example, a wireless device may not expect two PDCCH monitoring occasions on an active DL BWP, for a same search space set or for different search space sets, in a same CORESET to be separated by a non-zero number of symbols that is smaller than the CORESET duration.

In an example, the wireless device may determine a PDCCH monitoring occasion on an active DL BWP based on the PDCCH monitoring periodicity, the PDCCH monitoring offset, and the PDCCH monitoring pattern within a slot. In an example, for the search space set, the wireless device may determine that a PDCCH monitoring occasion exists in a slot. In an example, the wireless device may monitor at least one PDCCH for the search space set for the duration of third number of slots (consecutive) starting from the slot.

In an example, a wireless device may monitor one or more PDCCH candidates in a USS set on an active DL BWP of a serving cell. In an example, a base station may not configure the wireless device with a carrier indicator field. In response to not being configured with the carrier indicator field, the wireless device may monitor the one or more PDCCH candidates without the carrier indicator field.

In an example, a wireless device may monitor one or more PDCCH candidates in a USS set on an active DL BWP of a serving cell. In an example, a base station may configure the wireless device with a carrier indicator field. In response to being configured with the carrier indicator field, the wireless device may monitor the one or more PDCCH candidates with the carrier indicator field.

In an example, a base station may configure a wireless device to monitor one or more PDCCH candidates with a carrier indicator field in a first cell. In an example, the carrier indicator field may indicate a second cell. In an example, the carrier indicator field may correspond to a second cell. In response to monitoring the one or more PDCCH candidates, in the first cell, with the carrier indicator field indicating the second cell, the wireless device may not expect to monitor the one or more PDCCH candidates on an active DL BWP of the second cell.

In an example, a wireless device may monitor one or more PDCCH candidates on an active DL BWP of a serving cell. In response to the monitoring the one or more PDCCH candidates on the active DL BWP of the serving cell, the wireless device may monitor the one or more PDCCH candidates for the serving cell.

In an example, a wireless device may monitor one or more PDCCH candidates on an active DL BWP of a serving cell. In response to the monitoring the one or more PDCCH candidates on the active DL BWP of the serving cell, the wireless device may monitor the one or more PDCCH candidates at least for the serving cell. In an example, the wireless device may monitor the one or more PDCCH candidates for the serving cell and at least a second serving cell.

In an example, a base station may configure a wireless device with one or more cells. In an example, when a number of the one or more cells is one, the base station may configure the wireless device for a single-cell operation. In an example, when a number of the one or more cells is more than one, the base station may configure the wireless device for an operation with a carrier aggregation in a same frequency band (e.g., intra-band).

In an example, the wireless device may monitor one or more PDCCH candidates in overlapping PDCCH monitoring occasions in a plurality of CORESETs on active DL BWP(s) of the one or more cells. In an example, the plurality of the CORESETs may have a different QCL-TypeD property.

In an example, a first PDCCH monitoring occasion in a first CORESET, of the plurality of CORESETs, of a first cell of the one or more cells may overlap with a second PDCCH monitoring occasion in a second CORESET, of the plurality of CORESETs, of the first cell. In an example, the wireless device may monitor at least one first PDCCH candidate in the first PDCCH monitoring occasion on an active DL BWP, of the active DL BWP(s), of the first cell. In an example, the wireless device may monitor at least one second PDCCH candidate in the second PDCCH monitoring occasion on the active DL BWP, of the active DL BWP(s), of the first cell.

In an example, a first PDCCH monitoring occasion in a first CORESET, of the plurality of CORESETs, of a first cell of the one or more cells may overlap with a second PDCCH monitoring occasion in a second CORESET, of the plurality of CORESETs, of a second cell of the one or more cells. In an example, the wireless device may monitor at least one first PDCCH candidate in the first PDCCH monitoring occasion on a first active DL BWP, of the active DL BWP(s), of the first cell. In an example, the wireless device may monitor at least one second PDCCH candidate in the second PDCCH monitoring occasion on a second active DL BWP, of the active DL BWP(s), of the second cell.

In an example, a first QCL type property (e.g., QCL-TypeD) of the first CORESET may be different from a second QCL type property (e.g., QCL-TypeD) of the second CORESET.

In an example, in response to the monitoring the one or more PDCCH candidates in the overlapping PDCCH monitoring occasions in the plurality of CORESETs and the plurality of the CORESETs having the different QCL-TypeD property, for a CORESET determination rule, the wireless device may determine a selected CORESET, of the plurality of the CORESETs, of a cell of the one or more cells. In an example, in response to the determining, the wireless device may monitor at least one PDCCH candidate, in the overlapping PDCCH monitoring occasions, in the selected CORESET on an active DL BWP of the cell. In an example, the selected CORESET may be associated with a search space set (e.g., association provided by a higher layer parameter controlResourceSetId).

In an example, one or more CORESETs of the plurality of CORESETs may be associated with a CSS set. In an example, the one or more CORESETs of the plurality of CORESETs being associated with the CSS set may comprise that at least one search space set of a CORESET (e.g., association between the at least one search space set and the CORESET provided by a higher layer parameter controlResourceSetId) of the one or more CORESETs has at least one PDCCH candidate in the overlapping PDCCH monitoring occasions and/or is a CSS set.

In an example, the first CORESET may be associated with a first CSS set. In an example, the first CORESET may be associated with a first USS set. In an example, the second CORESET may be associated with a second CSS set. In an example, the second CORESET may be associated with a second USS set. In an example, a CORESET (e.g., the first CORESET, the second CORESET) being associated with a CSS set (e.g., first CSS set, second CSS set) may comprise that at least one search space of the CORESET is the CSS set. In an example, a CORESET (e.g., the first CORESET, the second CORESET) being associated with an USS set (e.g., first USS set, second USS set) may comprise that at least one search space of the CORESET is the USS set.

In an example, when the first CORESET is associated with the first CSS set and the second CORESET is associated with the second CSS set, the one or more CORESETs may comprise the first CORESET and the second CORESET.

In an example, when the one or more CORESETs comprises the first CORESET and the second CORESET, the one or more selected cells may comprise the first cell and the second cell in response to the first CORESET being configured in the first cell and the second CORESET being configured in the second cell.

In an example, when the one or more CORESETs comprises the first CORESET and the second CORESET, the one or more selected cells may comprise the first cell in response to the first CORESET being configured in the first cell and the second CORESET being configured in the first cell. In an example, the at least one CORESET may comprise the first CORESET and the second CORESET. In an example, a first search space set of the first CORESET of the at least one CORESET may be identified by a first search space set specific index (e.g., provided by a higher layer parameter searchSpaceId). In an example, the wireless device may monitor the at least one first PDCCH candidate in the first PDCCH monitoring occasion in the first CORESET associated with the first search space set (e.g., association provided by a higher layer parameter controlResourceSetId). In an example, a second search space set of the second CORESET of the at least one CORESET may be identified by a second search space set specific index (e.g., provided by a higher layer parameter searchSpaceId). In an example, the wireless device may monitor the at least one second PDCCH candidate in the second PDCCH monitoring occasion in the second CORESET associated with the second search space set (e.g., association provided by a higher layer parameter controlResourceSetId). In an example, the first search space set specific index may be lower than the second search space set specific index. In response to the first search space set specific index being lower than the second search space set specific index, for a CORESET determination rule, the wireless device may select the first search space set. In an example, in response to the selecting, for the CORESET determination rule, the wireless device may monitor the at least one first PDCCH candidate in the first PDCCH monitoring occasion in the first CORESET on the active DL BWP of the first cell. In an example, in response to the selecting, for the CORESET determination rule, the wireless device may stop monitoring the at least one second PDCCH candidate in the second PDCCH monitoring occasion in the second CORESET on the active DL BWP of the first cell. In an example, in response to the selecting, the wireless device may drop monitoring the at least one second PDCCH candidate in the second PDCCH monitoring occasion in the second CORESET on the active DL BWP of the first cell.

In an example, the first cell may be identified by a first cell-specific index. In an example, the second cell may be identified by a second cell-specific index. In an example, the first cell-specific index may be lower than the second cell-specific index. In an example, when the one or more selected cells comprises the first cell and the second cell, the wireless device may select the first cell in response to the first cell-specific index being lower than the second cell-specific index.

In an example, when the first CORESET is associated with the first CSS set and the second CORESET is associated with the second USS set, the one or more CORESETs may comprise the first CORESET. In an example, when the one or more CORESETs comprises the first CORESET, the one or more selected cells may comprise the first cell in response to the first CORESET being configured in the first cell.

In an example, when the first CORESET is associated with the first USS set and the second CORESET is associated with the second CSS set, the one or more CORESETs may comprise the second CORESET. In an example, when the one or more CORESETs comprises the second CORESET, the one or more selected cells may comprise the first cell in response to the second CORESET being configured in the first cell. In an example, when the one or more CORESETs comprises the second CORESET, the one or more selected cells may comprise the second cell in response to the second CORESET being configured in the second cell.

In an example, the wireless device may determine that the one or more CORESETs are associated with one or more selected cells of the one or more cells. In an example, the base station may configure a first CORESET of the one or more CORESETs in a first cell of the one or more selected cells. In an example, the base station may configure a second CORESET of the one or more CORESETs in the first cell. In an example, the base station may configure a third CORESET of the one or more CORESETs in a second cell of the one or more selected cells. In an example, the first cell and the second cell may be different.

In an example, the wireless device may receive, from the base station, one or more configuration parameters. The one or more configuration parameters may indicate cell-specific indices (e.g., provided by a higher layer parameter servCellIndex) for the one or more cells. In an example, each cell of the one or more cells may be identified by a respective one cell-specific index of the cell-specific indices. In an example, a cell-specific index of a cell of the one or more selected cells may be lowest among the cell-specific indices of the one or more selected cells.

In an example, when the wireless device determines that the one or more CORESETs are associated with the one or more selected cells of the one or more cells, for the CORESET determination rule, the wireless device may select the cell in response to the cell-specific index of the cell being lowest among the cell-specific indices of the one or more selected cells.

In an example, the base station may configure at least one CORESET of the one or more CORESETs in the (selected) cell. In an example, at least one search space set of the at least one CORESET may have at least one PDCCH candidate in the overlapping PDCCH monitoring occasions and/or may be a CSS set.

In an example, the one or more configuration parameters may indicate search space set specific indices (e.g., provided by a higher layer parameter searchSpaceId) for the at least one search space set of the cell. In an example, each search space set of the at least one search space set may be identified by a respective one search space set specific index of the search space set specific indices. In an example, the wireless device may determine that a search space specific index of a search space set of the at least one search space set may be the lowest among the search space set specific indices of the at least one search space set. In response to the determining that the search space specific index of the search space set specific index being the lowest among the search space set specific indices of the at least one search space set, for the CORESET determination rule, the wireless device may select the search space set. In an example, the search space set may be associated with a selected CORESET of the at least one CORESET (e.g., association provided by a higher layer parameter controlResourceSetId).

In an example, when the wireless device monitors the one or more PDCCH candidates in the overlapping PDCCH monitoring occasions in the plurality of CORESETs and the plurality of the CORESETs have the different QCL-TypeD property, the wireless device may monitor at least one PDCCH in the selected CORESET of the plurality of the CORESETs on an active DL BWP of the cell of the one or more cells in response to the selecting the cell and/or the selecting the search space set associated with the selected CORESET. In an example, the wireless device may select the selected CORESET associated with the search space set and the cell for the CORESET determination rule.

In an example, the selected CORESET may have a first QCL-TypeD property. In an example, a second CORESET of the plurality of the CORESETs may have a second QCL-TypeD property. In an example, the selected CORESET and the second CORESET may be different.

In an example, the first QCL-TypeD property and the second QCL-TypeD property may be the same. In an example, the wireless device may monitor at least one second PDCCH candidate (in the overlapping PDCCH monitoring occasions) in the second CORESET of the plurality of the CORESETs in response to the first QCL-TypeD property of the selected CORESET and the second QCL-TypeD property of the second CORESET being the same.

In an example, the first QCL-TypeD property and the second QCL-TypeD property may be different. In an example, the wireless device may stop monitoring at least one second PDCCH candidate (in the overlapping PDCCH monitoring occasions) in the second CORESET of the plurality of the CORESETs in response to the first QCL-TypeD property of the selected CORESET and the second QCL-TypeD property of the second CORESET being different. In an example, the wireless device may drop monitoring at least one second PDCCH candidate (in the overlapping PDCCH monitoring occasions) in the second CORESET of the plurality of the CORESETs in response to the first QCL-TypeD property of the selected CORESET and the second QCL-TypeD property of the second CORESET being different.

In an example, for the CORESET determination rule, a wireless device may consider that a first QCL type (e.g., QCL-TypeD) property of a first RS (e.g., SS/PBCH block) is different from a second QCL type (e.g., QCL-TypeD) property of a second RS (CSI-RS)

In an example, for the CORESET determination rule, a first RS (e.g., CSI-RS) may be associated or quasi co-located (QCL-ed) with an RS (e.g., SS/PBCH block) in a first cell. In an example, a second RS (e.g., CSI-RS) may be associated (e.g., QCL-ed) with the RS in a second cell. In response to the first RS and the second RS being associated with the RS, the wireless device may consider that a first QCL type (e.g., QCL-TypeD) property of the first RS and a second QCL type (e.g., QCL-TypeD) property of the second RS are the same.

In an example, the wireless device may determine a number of active TCI states from the plurality of CORESETs.

In an example, a wireless device may monitor multiple search space sets associated with different CORESETs for one or more cells (e.g., for a single cell operation or for an operation with carrier aggregation in a same frequency band). In an example, at least two monitoring occasions of at least two search space sets of the multiple search space sets may overlap in time (e.g., at least one symbol, at least one slot, subframe, and etc.). In an example, the at least two search space sets may be associated with at least two first CORESETs. The at least two first CORESETs may have different QCL-TypeD properties. In an example, for the CORESET determination rule, the wireless device may monitor at least one search space set associated with a selected CORESET in an active DL BWP of a cell. In an example, the at least one search space set may be a CSS set. In an example, a cell-specific index of the cell may be lowest among cell-specific indices of the one or more cells comprising the cell. In an example, at least two second CORESETs of the cell may comprise a CSS set. In response to the at least two second CORESETs of the cell comprising the CSS set, the wireless device may select a selected CORESET of the at least two second CORESETs in response to a search space specific index of a search space set associated with the selected CORESET being the lowest among search space specific indices of search space sets associated with the at least two second CORESETs. In an example, the wireless device monitors the search space set in the at least two monitoring occasions.

In an example, the wireless device may determine that the at least two first CORESETs may not be associated with a CSS set. In an example, the wireless device may determine that each CORESET of the at least two first CORESETs may not be associated with a CSS set. In an example, for the CORESET determination rule, in response to the determining, the wireless device may monitor at least one search space set associated with a selected CORESET in an active DL BWP of a cell. In an example, the at least one search space set may be a USS set. In an example, a cell-specific index of the cell may be lowest among cell-specific indices of the one or more cells comprising the cell. In an example, at least two second CORESETs of the cell may comprise a USS set. In response to the at least two second CORESETs of the cell comprising the USS set, the wireless device may select a selected CORESET of the at least two second CORESETs in response to a search space specific index of a search space set associated with the selected CORESET being the lowest among search space specific indices of search space sets associated with the at least two second CORESETs. In an example, the wireless device monitors the search space set in the at least two monitoring occasions.

In an example, a base station may indicate, to a wireless device, a TCI state for a PDCCH reception for a CORESET of a serving cell by sending a TCI state indication for UE-specific PDCCH MAC CE. In an example, when a MAC entity of the wireless device receives a TCI state indication for UE-specific PDCCH MAC CE on/for a serving cell, the MAC entity may indicate to lower layers (e.g., PHY) the information regarding the TCI state indication for the UE-specific PDCCH MAC CE.

In an example, a TCI state indication for UE-specific PDCCH MAC CE may be identified by a MAC PDU subheader with LCID. The TCI state indication for UE-specific PDCCH MAC CE may have a fixed size of 16 bits comprising one or more fields. In an example, the one or more fields may comprise a serving cell ID, CORESET ID, TCI state ID and a reserved bit.

In an example, the serving cell ID may indicate the identity of the serving cell for which the TCI state indication for the UE-specific PDCCH MAC CE applies. The length of the serving cell ID may be n bits (e.g., n=5 bits).

In an example, the CORESET ID may indicate a control resource set. The control resource set may be identified with a control resource set ID (e.g., ControlResourceSetId). The TCI State is being indicated to the control resource set ID for which. The length of the CORESET ID may be n3 bits (e.g., n3=4 bits).

In an example, the TCI state ID may indicate a TCI state identified by TCI-StateId. The TCI state may be applicable to the control resource set identified by the CORESET ID. The length of the TCI state ID may be n4 bits (e.g., n4=6 bits).

An information element ControlResourceSet may be used to configure a time/frequency control resource set (CORESET) in which to search for downlink control information.

An information element TCI-State may associate one or two DL reference signals with a corresponding quasi co-location (QCL) type. The information element TCI-State may comprise one or more fields including TCI-StateId and QCL-Info. The QCL-Info may comprise one or more second fields. The one or more second fields may comprise serving cell index, BWP ID, a reference signal index (e.g., SSB-index, NZP-CSI-RS-ResourceID), and a QCL Type (e.g., QCL-typeA, QCL-typeB, QCL-typeC, QCL-typeD). In an example, the TCI-StateID may identify a configuration of a TCI state.

In an example, the serving cell index may indicate a serving cell in which a reference signal indicated by the reference signal index is located in. When the serving cell index is absent in an information element TCI-State, the information element TCI-State may apply to a serving cell in which the information element TCI-State is configured. The reference signal may be located on a second serving cell other than the serving cell in which the information element TCI-State is configured only if the QCL-Type is configured as first type (e.g., TypeD, TypeA, TypeB). In an example, the BWP ID may indicate a downlink BWP of the serving cell in which the reference signal is located in.

An information element SearchSpace may define how/where to search for PDCCH candidates in a search space. The search space may be identified by a searchSpaceId field in the information element SearchSpace. Each search space may be associated with a control resource set (e.g., ControlResourceSet). The control resource set may be identified by a controlResourceSetId field in the information element SearchSpace. The controlResourceSetId field may indicate the control resource set (CORESET) applicable for the SearchSpace.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

A base station may configure a wireless device with a list of one or more TCI-State configurations by a higher layer parameter PDSCH-Config for a serving cell. A number of the one or more TCI states may depend on a capability of the wireless device. The wireless device may use the one or more TCI-States to decode a PDSCH according to a detected PDCCH with a DCI. The DCI may be intended for the wireless device and a serving cell of the wireless device.

In an example, a TCI state of the one or more TCI-State configurations may contain one or more parameters. The wireless device may use the one or more parameters to configure a quasi co-location relationship between one or two downlink reference signals (e.g., first DL RS and second DL RS) and DMRS ports of a PDSCH. The quasi co-location relationship may be configured by a higher layer parameter qcl-Type1 for the first DL RS. The quasi co-location relationship may be configured by a higher layer parameter qcl-Type2 for the second DL RS (if configured).

In an example, when the wireless device configures a quasi co-location relationship between the two downlink reference signals (e.g., first DL RS and second DL RS), a first QCL type of the first DL RS and a second QCL type of the second DL RS may not be the same. In an example, the first DL RS and the second DL RS may be the same. In an example, the first DL RS and the second DL RS may be different.

In an example, a quasi co-location type (e.g., the first QCL type, the second QCL type) of a DL RS (e.g., the first DL RS, the second DL RS) may be provided to the wireless device by a higher layer parameter qcl-Type in QCL-Info. The higher layer parameter QCL-Type may take at least one of: QCL-TypeA: {Doppler shift, Doppler spread, average delay, delay spread}; QCL-TypeB: {Doppler shift, Doppler spread}; QCL-TypeC: {average delay, Doppler shift} and QCL-TypeD: {Spatial Rx parameter}.

In an example, a wireless device may receive an activation command. The activation command may be used to map one or more TCI states (e.g., up to 8) to one or more codepoints of a DCI field "Transmission Configuration Indication (TCI)". In an example, the wireless device may transmit a HARQ-ACK corresponding to a PDSCH in slot n. The PDSCH may comprise/carry the activation command. In response to the transmitting the HARQ-ACK in the slot n, the wireless device may apply the mapping between the one or more TCI states and the one or more codepoints of the DCI field "Transmission Configuration Indication" starting from slot $$n + 3N_{slot}^{subframe,\mu} + 1.$$

In an example, after the wireless device receives an initial higher layer configuration of one or more TCI states and before the reception of the activation command, the wireless device may assume that one or more DMRS ports of a PDSCH of a serving cell are quasi co-located with an SSB/PBCH block. In an example, the wireless device may determine the SSB/PBCH block in an initial access procedure with respect 'QCL-TypeA'. In an example, the wireless device may determine the SSB/PBCH block in the initial access procedure with respect to' QCL-TypeD' (when applicable).

In an example, a wireless device may be configured, by a base station, with a higher layer parameter TCI-PresentInDCI. When the higher layer parameter TCI-PresentInDCI is set as 'enabled' for a control resource set (CORESET) scheduling a PDSCH, the wireless device may assume that a TCI field is present in a DCI format (e.g., DCI format 1_1) of a PDCCH transmitted on the CORESET.

In an example, a base station may not configure a CORESET with a higher layer parameter TCI-PresentInDCI. In an example, the CORESET may schedule a PDSCH. In an example, a time offset between a reception of a DCI (e.g., DCI format 1_1, DCI format 1_0) received in the CORESET and the (corresponding) PDSCH may be equal to or greater than a threshold (e.g., Threshold-Sched-Offset). In an example, the threshold may be based on a reported UE capability. In an example, the wireless device may apply a second TCI state for the CORESET used for a PDCCH transmission of the DCI. In an example, the wireless device may apply a second QCL assumption for the CORESET used for a PDCCH transmission of the DCI. In an example, in response to the base station not configuring the CORESET with the higher layer parameter TCI-PresentInDCI and the time offset between the reception of the DCI and the PDSCH being equal or greater than the threshold, the wireless device may perform a default PDSCH RS selection. In an example, in the default PDSCH RS selection, the wireless device may assume, in order to determine antenna port quasi co-location of the PDSCH, that a first TCI state or a first QCL assumption for the PDSCH is identical to the second TCI state or the second QCL assumption applied for the CORESET.

In an example, a base station may configure a CORESET with a higher layer parameter TCI-PresentInDCI. In an example, the higher layer parameter TCI-PresentInDCI may be set as "enabled". In an example, the CORESET may schedule a PDSCH with a DCI (e.g., DCI format 1_0). In an example, the DCI may not comprise a TCI field. In an example, a time offset between a reception of the DCI received in the CORESET and the (corresponding) PDSCH may be equal to or greater than a threshold (e.g., Threshold-Sched-Offset). In an example, the threshold may be based on a reported UE capability. In an example, the wireless device may apply a second TCI state for the CORESET used for a PDCCH transmission of the DCI. In an example, the wireless device may apply a second QCL assumption for the CORESET used for a PDCCH transmission of the DCI. In an example, in response to the base station scheduling the PDSCH with the DCI not comprising the TCI field and the time offset between the reception of the DCI and the PDSCH being equal or greater than the threshold, the wireless device may perform a default PDSCH RS selection. In an example, in the default PDSCH RS selection, the wireless device may assume, in order to determine antenna port quasi co-location of the PDSCH, that a first TCI state or a first QCL assumption for the PDSCH is identical to the second TCI state or the second QCL assumption applied for the CORESET.

In an example, a base station may configure a CORESET with a higher layer parameter TCI-PresentInDCI. In an example, the higher layer parameter TCI-PresentInDCI may be set as "enabled". The wireless device may receive a DCI in the CORESET of a scheduling component carrier. The DCI may comprise a TCI field. In response to the higher layer parameter TCI-PresentinDCI being set as 'enabled', the TCI field in the DCI in the scheduling component carrier may point to one or more activated TCI states (e.g., after receiving the activation command) in a scheduled component carrier or in a DL BWP.

In an example, a base station may configure a CORESET with a higher layer parameter TCI-PresentInDCI. In an example, the higher layer parameter TCI-PresentInDCI may be set as "enabled". The wireless device may receive a DCI (e.g., DCI format 1_1) in the CORESET. In an example, the DCI may schedule a PDSCH of a wireless device. In an example, a TCI field may be present in the DCI. In an example, a time offset between a reception of the DCI and the (corresponding scheduled) PDSCH may be equal to or greater than a threshold (e.g., Threshold-Sched-Offset). In an example, the threshold may be based on a reported UE capability. In an example, in response to the TCI field being present in the DCI scheduling the PDSCH and the higher layer parameter TCI-PresentinDCI being set as 'enabled' for the CORESET, the wireless device may, in order to determine antenna port quasi co-location for the PDSCH, use a TCI State according to a value of the TCI field in a detected PDCCH with the DCI. In an example, the using the TCI State according to the value of the TCI field may comprise that the wireless device may assume that one or more DMRS ports of the PDSCH of a serving cell are quasi co-located with one or more RS(s) in the TCI State with respect to one or more QCL type parameter(s) given by the TCI state when the time offset between the reception of the DCI and the PDSCH is equal or greater than the threshold. In an example, the value of the TCI field may indicate the TCI state.

In an example, a base station may configure a wireless device with a single slot PDSCH. In an example, the single slot PDSCH may be scheduled in a slot. In an example, the base station may activate one or more TCI states in the slot. In response to being configured with the single slot PDSCH, a TCI state (e.g., indicated by a TCI field in a DCI scheduling the single slot PDSCH) may be based on the one or more activated TCI states in the slot with the scheduled single slot PDSCH. In an example, the TCI state may be one of the one or more activated TCI states in the slot. In an example, the TCI field in the DCI may indicate a TCI state of the one or more activated TCI states in the slot.

In an example, a wireless device may be configured with a CORESET. In an example, the CORESET may be associated with a search space set for cross-carrier scheduling. In an example, in response to the CORESET being associated with the search space set for cross-carrier scheduling, the wireless device may expect the higher layer parameter TCI-PresentInDCI set as 'enabled' for the CORESET. In an example, a base station may configure a serving cell with one or more TCI states. In an example, the wireless device may detect, in the search space set, a PDCCH, with a DCI, scheduling a PDSCH. In an example, a TCI field in the DCI may indicate at least one of the one or more TCI states. In an example, the at least one of the one more TCI states (scheduled by the search space set) may comprise/contain a QCL type (e.g., QCL-TypeD). In an example, in response to the at least one of the one or more TCI states scheduled by the search space set containing the QCL type, the wireless device may expect a time offset between a reception of the PDCCH detected in the search space set and the (corresponding) PDSCH is larger than or equal to the threshold (e.g., Threshold-Sched-Offset).

In an example, a base station may configure a CORESET with a higher layer parameter TCI-PresentInDCI. In an example, the higher layer parameter TCI-PresentInDCI may be set as "enabled". In an example, when the higher layer parameter TCI-PresentInDCI is set to 'enabled' for the CORESET, an offset between a reception of a DCI in the CORESET and a PDSCH scheduled by the DCI may be less than the threshold (e.g., Threshold-Sched-Offset).

In an example, a base station may not configure a CORESET with a higher layer parameter TCI-PresentInDCI. In an example, the wireless device may be in an RRC connected mode. In an example, the wireless device may be in an RRC idle mode. In an example, the wireless device may be in an RRC inactive mode. In an example, when the higher layer parameter TCI-PresentInDCI is not configured for the CORESET, an offset between a reception of a DCI in the CORESET and a PDSCH scheduled by the DCI may be lower than the threshold (e.g., Threshold-Sched-Offset).

In an example, a wireless device may monitor one or more CORESETs (or one or more search spaces) within/in an active BWP (e.g., active downlink BWP) of a serving cell in one or more slots. In an example, the monitoring the one or more CORESETs within/in the active BWP of the serving cell in the one or more slots may comprise monitoring at least one CORESET within/in the active BWP of the serving cell in each slot of the one or more slots. In an example, a latest slot of the one or more slots may occur latest in time. In an example, the wireless device may monitor, within/in the active BWP of the serving cell, one or more second CORESETs of the one or more CORESETs in the latest slot. In response to the monitoring the one or more second CORESETs in the latest slot and the latest slot occurring latest in time, the wireless device may determine the latest slot. In an example, each CORESET of the one or more second CORESETs may be identified by a CORESET specific index (e.g., indicated by a higher layer CORESET-ID). In an example, a CORESET specific index of a CORESET of the one or more secondary CORESETs may be the lowest among the CORESET specific indices of the one or more second CORESETs. In an example, the wireless device may monitor a search space associated with the CORESET in the latest slot. In an example, in response to the CORESET specific index of the CORESET being the lowest and the monitoring the search space associated with the CORESET in the latest slot, the wireless device may select the CORESET of the one or more secondary CORESETs.

In an example, when the offset between the reception of the DCI in the CORESET and the PDSCH scheduled by the DCI is lower than the threshold (e.g., Threshold-Sched-Offset), the wireless device may perform a default PDSCH RS selection. In an example, in the default PDSCH RS selection, the wireless device may assume that one or more DMRS ports of the PDSCH of a serving cell are quasi co-located with one or more RSs in a TCI state with respect to one or more QCL type parameter(s). The one or more RSs in the TCI state may be used for PDCCH quasi co-location indication of the (selected) CORESET of the one or more second CORESETs.

In an example, a wireless device may receive a DCI via a PDCCH in a CORESET. In an example, the DCI may schedule a PDSCH. In an example, an offset between a reception of the DCI and the PDSCH may be less than a threshold (e.g., Threshold-Sched-Offset). A first QCL type (e.g., 'QCL-TypeD') of one or more DMRS ports of the PDSCH may be different from a second QCL type (e.g., 'QCL-TypeD') of one or more second DMRS ports of the PDCCH. In an example, the PDSCH and the PDCCH may overlap in at least one symbol. In an example, in response to the PDSCH and the PDCCH overlapping in at least one symbol and the first QCL type being different from the second QCL type, the wireless device may prioritize a reception of the PDCCH associated with the CORESET. In an example, the prioritizing may apply to an intra-band CA case (when the PDSCH and the CORESET are in different component carriers). In an example, the prioritizing the reception of the PDCCH may comprise receiving the PDSCH with the second QCL type of one or more second DMRS ports of the PDCCH. In an example, the prioritizing the reception of the PDCCH may comprise overwriting the first QCL type of the one or more DMRS ports of the PDSCH with the second QCL type of the one or more second DMRS ports of the PDCCH. In an example, the prioritizing the reception of the PDCCH may comprise assuming a spatial QCL of the PDCCH (e.g., the second QCL type), for the simultaneous reception of the PDCCH and PDSCH, on the PDSCH. In an example, the prioritizing the reception of the PDCCH may comprise applying a spatial QCL of the PDCCH (e.g., the second QCL type), for the simultaneous reception of the PDCCH and PDSCH, on the PDSCH.

In an example, none of the configured TCI states may contain a QCL type (e.g., 'QCL-TypeD'). In response to the none of the configured TCI states containing the QCL type, the wireless device may obtain the other QCL assumptions from the indicated TCI states for its scheduled PDSCH irrespective of the time offset between the reception of the DCI and the corresponding PDSCH.

In an example, a wireless device may use CSI-RS for at least one of: time/frequency tracking, CSI computation, L1-RSRP computation and mobility.

In an example, a base station may configure a wireless device to monitor a CORESET on one or more symbols. In an example, a CSI-RS resource may be associated with a NZP-CSI-RS-ResourceSet. A higher layer parameter repetition of the NZP-CSI-RS-ResourceSet may be set to 'on'. In an example, in response to the CSI-RS resource being associated with the NZP-CSI-RS-ResourceSet with the higher layer parameter repetition set to 'on', the wireless device may not expect to be configured with a CSI-RS of the CSI-RS resource over the one or more symbols.

In an example, a higher layer parameter repetition of the NZP-CSI-RS-ResourceSet may not be set to 'on'. In an example, a base station may configure a CSI-RS resource and one or more search space sets associated with a CORESET in the same one or more symbols (e.g., OFDM symbols). In an example, in response to the higher layer parameter repetition of the NZP-CSI-RS-ResourceSet not being set to 'on', and the CSI-RS resource and the one or more search space sets associated with the CORESET being configured in the same one or more symbols, the wireless device may assume that a CSI-RS of the CSI-RS resource and one or more DMRS ports of a PDCCH are quasi co-located with 'QCL-TypeD'. In an example, the base station may transmit the PDCCH in the one or more search space sets associated with the CORESET.

In an example, a higher layer parameter repetition of the NZP-CSI-RS-ResourceSet may not be set to 'on'. In an example, a base station may configure a CSI-RS resource of a first cell and one or more search space sets associated with a CORESET of a second cell in the same one or more symbols (e.g., OFDM symbols). In an example, in response to the higher layer parameter repetition of the NZP-CSI-RS-ResourceSet not being set to 'on', and the CSI-RS resource and the one or more search space sets associated with the CORESET being configured in the same one or more symbols, the wireless device may assume that a CSI-RS of the CSI-RS resource and one or more DMRS ports of a PDCCH are quasi co-located with 'QCL-TypeD'. In an example, the base station may transmit the PDCCH in the one or more search space sets associated with the CORESET. In an example, the first cell and the second cell may be in different intra-band component carriers.

In an example, a base station may configure a wireless device with a CSI-RS in a first set of PRBs. In an example, the base station may configure the wireless device with one or more search space sets associated with a CORESET in one or more symbols (e.g., OFDM symbols) and in a second set of PRBs. In an example, the wireless device may not expect the first set of PRBs sand the second set of PRBs overlapping in the one or more symbols.

In an example, a base station may configure a wireless device with a CSI-RS resource and an SS/PBCH block in the same one or more (OFDM) symbols. In an example, in response to the CSI-RS resource and the SS/PBCH block being configured in the same one or more (OFDM) symbols, the wireless device may assume that the CSI-RS resource and the SS/PBCH block are quasi co-located with a QCL type (e.g., 'QCL-TypeD').

In an example, the base station may configure the CSI-RS resource in a first set of PRBs for the wireless device. In an example, the base station may configure the SS/PBCH block in a second set of PRBs for the wireless device. In an example, the wireless device may not expect the first set of PRBs overlapping with the second set of PRBs.

In an example, the base station may configure the CSI-RS resource with a first subcarrier spacing for the wireless device. In an example, the base station may configure the SS/PBCH block with a second subcarrier spacing for the wireless device. In an example, the wireless device may expect the first subcarrier spacing and the second subcarrier spacing being the same.

In an example, a base station may configure a wireless device with a NZP-CSI-RS-ResourceSet. In an example, the NZP-CSI-RS-ResourceSet may be configured with a higher layer parameter repetition set to 'on'. In an example, in response to the NZP-CSI-RS-ResourceSet being configured with the higher layer parameter repetition set to 'on', the wireless device may assume that the base station transmits one or more CSI-RS resources within the NZP-CSI-RS-ResourceSet with the same downlink spatial domain transmission filter. In an example, the base station may transmit each CSI-RS resource of the one or more CSI-RS resources in different symbols (e.g., OFDM symbols).

In an example, the NZP-CSI-RS-ResourceSet may be configured with a higher layer parameter repetition set to 'off'. In an example, in response to the NZP-CSI-RS-ResourceSet being configured with the higher layer parameter repetition set to 'off', the wireless device may not assume that the base station transmits one or more CSI-RS resources within the NZP-CSI-RS-ResourceSet with the same downlink spatial domain transmission filter.

In an example, a base station may configure a wireless device with a higher layer parameter groupBasedBeamReporting. In an example, the base station may set the higher layer parameter groupBasedBeamReporting to "enabled". In response to the higher layer parameter groupBasedBeamReporting set to "enabled", the wireless device may report at least two different resource indicators (e.g., CRI, SSBRI) in a single reporting instance for a reporting setting of one or more report settings. In an example, the wireless device may receive at least two RSs (e.g., CSI-RS, SSB) indicated by the at least two different resource indicators simultaneously. In an example, the wireless device may receive the at least two RSs simultaneously with a single spatial domain receive filter. In an example, the wireless device may receive the at least two RSs simultaneously with a plurality of simultaneous spatial domain receive filters.

In an example, a base station may need (additional) one or more UE radio access capability information of a wireless device. In response to the needing the one or more UE radio access capability information, the base station may initiate a procedure to request the one or more UE radio access capability information (e.g., by an information element UECapabilityEnquiry) from the wireless device. In an example, the wireless device may use an information element (e.g., UECapabilityInformation message) to transfer one or more UE radio access capability information requested by the base station. In an example, the wireless device may provide a threshold (e.g., timeDurationForQCL, Threshold-Sched-Offset) in FeatureSetDownlink indicating a set of features that the wireless device supports.

In an example, the threshold may comprise a minimum number of OFDM symbols required by the wireless device to perform a PDCCH reception with a DCI and to apply a spatial QCL information (e.g., TCI-State) received in (or indicated by) the DCI for a processing of a PDSCH scheduled by the DCI.

In an example, the wireless device may require the minimum number of OFDM symbols between the PDCCH reception and the processing of the PDSCH to apply the spatial QCL information, indicated by the DCI, to the PDSCH.

In an example, a base station may configure a wireless device with one or more first reference signals (e.g., SS/PBCH block, CSI-RS, etc.) for beam failure detection. In an example, the wireless device may declare/detect a beam failure based on the one or more first reference signals (RSs) when a number of beam failure instance indications from a physical layer of the wireless device to a higher layer (e.g., MAC layer) of the wireless device reaches a configured threshold (e.g., beamFailureInstanceMaxCount) before an expiry of a configured timer (e.g., beamFailureDetectionTimer).

In an example, an SSB (e.g., cell-defining SSB) may be associated with an initial downlink BWP of a cell. The wireless device may detect a beam failure based on the SSB in response to the SSB being associated with the initial downlink BWP. In an example, the base station may configure the SSB, for detecting the beam failure, for the initial downlink BWP. In an example, a downlink BWP of the cell may comprise the SSB. The base station may configure the SSB, for detecting the beam failure, for the downlink BWP based on the downlink BWP comprising the SSB. The one or more first RSs may comprise the SSB.

In an example, a downlink BWP of the cell may not comprise the SSB. In response to the downlink BWP not comprising the SSB, the wireless device may detect a beam failure for the downlink BWP based on one or more CSI-RSs. The one or more first RSs may comprise the one or more CSI-RSs.

In an example, a wireless device may trigger a beam failure recovery by initiating a random-access procedure on a primary cell based on detecting a beam failure. In an example, a wireless device may select a suitable/candidate beam for a beam failure recovery based on detecting a beam failure. In an example, the wireless device may determine that the beam failure recovery is complete based on completion of the random-access procedure.

In an example, a base station may configure a medium-access control (MAC) entity of a wireless device with a beam failure recovery procedure by an RRC. The wireless device may detect a beam failure based on one or more first RSs (e.g., SSB, CSI-RS). The beam failure recovery procedure may be used for indicating to the base station of a candidate RS (e.g., SSB or CSI-RS) when the wireless device detects the beam failure. In an example, the wireless device may detect the beam failure based on counting a beam failure instance indication from a lower layer of the wireless device (e.g. PHY layer) to the MAC entity.

In an example, a base station may reconfigure an information element (IE) beamFailureRecoveryConfig during an ongoing random-access procedure for a beam failure recovery. In response to the reconfiguring the IE beamFailureRecoveryConfig, the MAC entity may stop the ongoing random-access procedure. Based on the stopping the ongoing random-access procedure, the wireless device may initiate a second random-access procedure for the beam failure recovery using/with the reconfigured IE beamFailureRecoveryConfig.

In an example, an RRC may configure a wireless device with one or more parameters in an IE BeamFailureRecoveryConfig and an IE RadioLinkMonitoringConfig for a beam failure detection and recovery procedure. The one or more parameters may comprise at least: beamFailureInstanceMaxCount for a beam failure detection; beamFailureDetectionTimer for the beam failure detection; beamFailureRecoveryTimer for a beam failure recovery; rsrp-ThresholdSSB: an RSRP threshold for the beam failure recovery; PowerRampingStep for the beam failure recovery; powerRampingStepHighPriority for the beam failure recovery; preambleReceivedTargetPower for the beam failure recovery; preambleTransMax for the beam failure recovery; scalingFactorBI for the beam failure recovery; ssb-perRACH-Occasion for the beam failure recovery; ra-OccasionList for the beam failure recovery; ra-ssb-OccasionMaskIndex for the beam failure recovery; prach-ConfigurationIndex for the beam failure recovery; and ra-Response Window. The ra-Response Window may be a time window to monitor at least one response (e.g., random-access response, BFR response) for the beam failure recovery. In an example, the wireless device may use a contention-free random-access preamble for the beam failure recovery.

Figure 16:
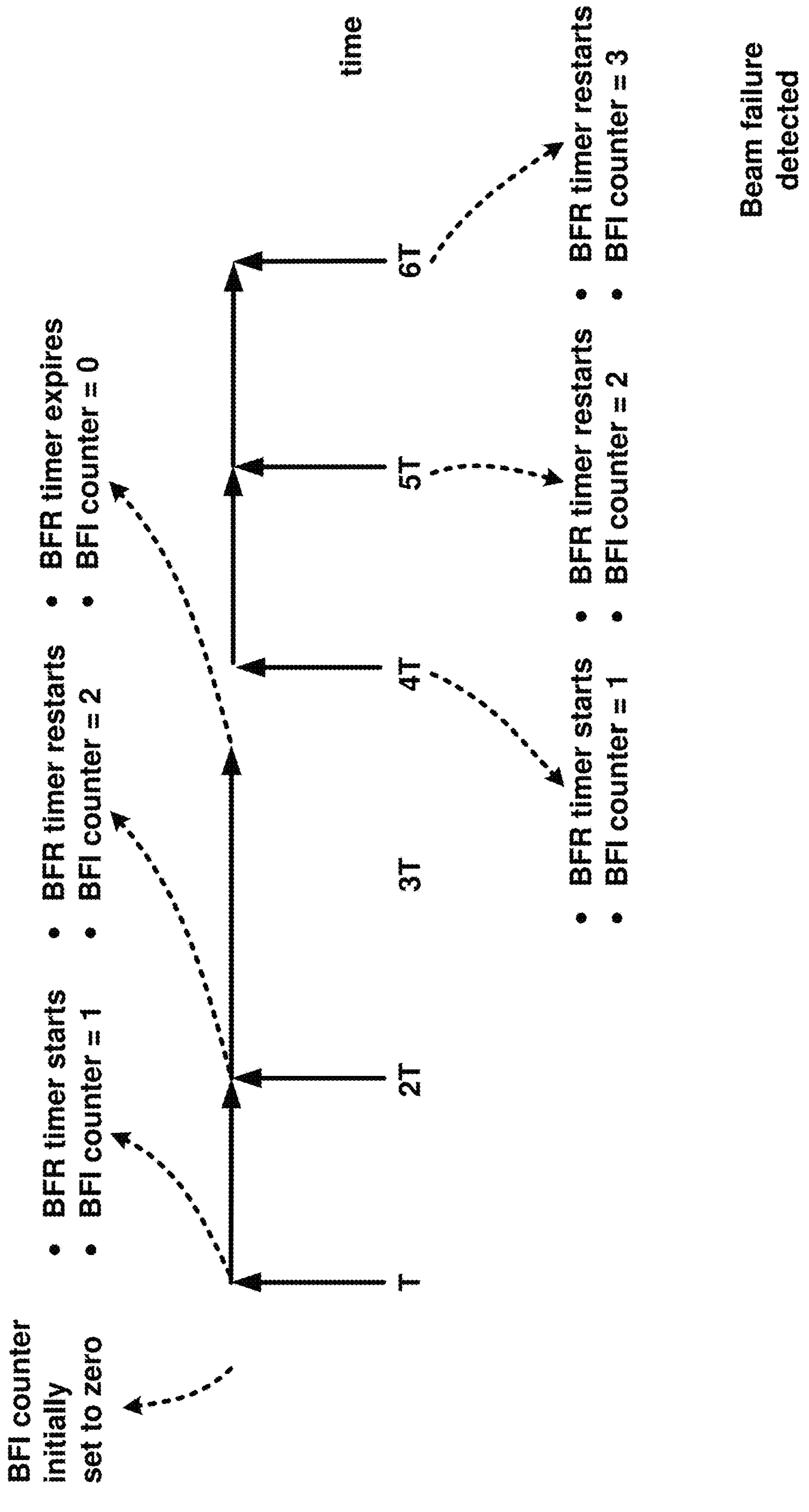
FIG. 16 is an example diagram to show beam failure report procedure as per an aspect of an embodiment of the present disclosure.

FIG. 16 shows an example of a beam failure instance (BFI) indication. In an example, a wireless device may use at least one UE variable for a beam failure detection. In an example, BFI_COUNTER may be one of the at least one UE variable. The BFI_COUNTER may be a counter for a beam failure instance indication. The wireless device may set the BFI_COUNTER initially to zero.

In an example, a MAC entity of a wireless device may receive a beam failure instance (BFI) indication from a lower layer (e.g. PHY) of the wireless device. Based on the receiving the BFI indication, the MAC entity of the wireless device may start or restart the beamFailureDetectionTimer (e.g., BFR timer in FIG. 16). Based on the receiving the BFI indication, the MAC entity of the wireless device may increment BFI_COUNTER by one (e.g., at time T, 2T, 5T in FIG. 16).

In an example, the BFI_COUNTER may be equal to or greater than the beamFailureInstanceMaxCount. Based on the BFI_COUNTER being equal to or greater than the beamFailureInstanceMaxCount, the MAC entity of the wireless device may initiate a random-access procedure (e.g. on an SpCell) for a beam failure recovery.

In an example, in FIG. 16, the wireless device may initiate the random-access procedure at time 6T, when the BFI_COUNTER is equal to or greater than the beamFailureInstanceMaxCount (e.g., 3).

In an example, the wireless device may select an uplink carrier (e.g., SUL, NUL) to perform the random-access procedure for the beam failure recovery. In an example, the base station may configure an active uplink BWP of the selected uplink carrier with IE beamFailureRecoveryConfig. When the wireless device initiates the random-access procedure for the beam failure recovery, based on the active uplink BWP of the selected uplink carrier being configured with the IE beamFailureRecoveryConfig, the wireless device may start, if configured, the beamFailureRecovery- Timer. When the wireless device initiates the random-access procedure for the beam failure recovery, based on the active uplink BWP of the selected uplink carrier being configured with the IE beamFailureRecoveryConfig, the wireless device may apply one or more parameters (e.g., powerRampingStep, preambleReceivedTargetPower, and preambleTransMax) configured in the IE BeamFailureRecoveryConfig for the random-access procedure.

In an example, the base station may configure powerRampingStepHighPriority in the IE beamFailureRecoveryConfig. When the wireless device initiates the random-access procedure for the beam failure recovery and the active uplink BWP of the selected uplink carrier is configured with the IE beamFailureRecoveryConfig, based on the powerRampingStepHighPriority being configured in the IE beamFailureRecoveryConfig, the wireless device may set PREAMBLE_POWER_RAMPING_STEP to the powerRampingStepHighPriority.

In an example, the base station may not configure powerRampingStepHighPriority in the IE beamFailureRecoveryConfig. When the wireless device initiates the random-access procedure for the beam failure recovery and the active uplink BWP of the selected uplink carrier is configured with the IE beamFailureRecoveryConfig, based on the powerRampingStepHighPriority not being configured in the IE beamFailureRecoveryConfig, the wireless device may set PREAMBLE_POWER_RAMPING_STEP to the powerRampingStep.

In an example, the base station may configure scalingFactorBI in the IE beamFailureRecoveryConfig. When the wireless device initiates the random-access procedure for the beam failure recovery and the active uplink BWP of the selected uplink carrier is configured with the IE beamFailureRecoveryConfig, based on the scalingFactorBI being configured in the IE beamFailureRecoveryConfig, the wireless device may set SCALING_FACTOR_BI to the scalingFactorBI.

In an example, the base station may configure the active uplink BWP of the selected uplink carrier with the IE beamFailureRecoveryConfig. Based on the active uplink BWP of the selected uplink carrier being configured with the IE beamFailureRecoveryConfig, the random-access procedure may be a contention-free random-access procedure.

In an example, the base station may not configure the active uplink BWP of the selected uplink carrier with the IE beamFailureRecoveryConfig. Based on the active uplink BWP of the selected uplink carrier not being configured with the IE beamFailureRecoveryConfig, the random-access procedure may be a contention-based random-access procedure.

In an example, the beamFailureDetection Timer may expire. Based on the beamFailureDetection Timer expiring, the MAC entity of the wireless device may set the BFI_COUNTER to zero (e.g., in FIG. 16, between time 3T and 4T).

In an example, a base station may configure a wireless device with one or more first RSs (e.g., SS/PBCH block, CSI-RS, etc.) for a beam failure detection (e.g., by RadioLinkMonitoringRS in the IE RadioLinkMonitoringConfig). In an example, the base station may reconfigure the beamFailureDetectionTimer or the beamFailureInstanceMaxCount or at least one RS of the one or more first RSs by higher layers (e.g., RRC). Based on the reconfiguring, the MAC entity of the wireless device may set the BFI_COUNTER to zero.

In an example, the wireless device may complete the random-access procedure (e.g., contention-free random-access or contention-based random-access) for the beam failure recovery successfully. Based on the completing the random-access procedure successfully, the wireless device may determine/consider that the beam failure recovery is successfully completed.

In an example, the wireless device may complete the random-access procedure for the beam failure recovery successfully. Based on the completing the random-access procedure successfully, the wireless device may, if configured, stop the beamFailureRecoveryTimer. Based on the completing the random-access procedure successfully, the wireless device may set the BFI_COUNTER to zero.

In an example, the beamFailureRecovery Timer may be running. In an example, the base station may not configure the wireless device with the beamFailureRecoveryTimer. In an example, the base station may provide the wireless device with one or more second RSs (e.g., SS/PBCH blocks, periodic CSI-RSs, etc.) for a beam failure recovery by a higher layer parameter candidateBeamRSList in the IE beamFailureRecoveryConfig. In an example, the base station may provide the wireless device with one or more uplink resources (e.g., contention-free random-access resources) for a beam failure recovery request (BFRQ) used in the beam failure recovery by a higher layer (e.g., RRC) parameter (e.g., candidateBeamRSList, ssb-perRACH-Occasion, ra-ssb-OccasionMaskIndex in the IE beamFailureRecoveryConfig). An uplink resource of the one or more uplink resources may be associated with a candidate RS (e.g., SSB, CSI-RS) of the one or more second RSs. In an example, the association between the uplink resource and the candidate RS may be one-to-one.

In an example, at least one RS among the one or more second RSs may have a RSRP (e.g., SS-RSRP, CSI-RSRP) higher than a second threshold (e.g., rsrp-ThresholdSSB, rsrp-ThresholdCSI-RS). In an example, the wireless device may select a candidate RS among the at least one RS for the beam failure recovery.

In an example, the candidate RS may be a CSI-RS. In an example, there may be no ra-PreambleIndex associated with the candidate RS. Based on the candidate RS being the CSI-RS and no ra-PreambleIndex being associated with the candidate RS, the MAC entity of the wireless device may set PREAMBLE_INDEX to an ra-PreambleIndex. The ra-PreambleIndex may be associated/corresponding to an SSB in the one or more second RSs (e.g., indicated candidateBeamRSList). The SSB may be quasi-collocated with the candidate RS.

In an example, the candidate RS may be a CSI-RS and there may be ra-PreambleIndex associated with the candidate RS. In an example, the candidate RS may be an SSB. The MAC entity of the wireless device may set PREAMBLE_INDEX to a ra-PreambleIndex, associated/corresponding to the candidate RS, from a set of random-access preambles for the BFRQ. In an example, a higher layer (RRC) parameter may configure the set of random-access preambles for the BFRQ for the random-access procedure for the beam failure recovery.

In an example, a MAC entity of a wireless device may transmit an uplink signal (e.g., contention-free random-access preamble) for the BFRQ. Based on the transmitting the uplink signal, the MAC entity may start a response window (e.g., ra-Response Window configured in the IE BeamFailureRecoveryConfig) at a first PDCCH occasion from the end of the transmitting the uplink signal. Based on the transmitting the uplink signal, the wireless device may, while the response window is running, monitor at least one PDCCH on a search space indicated by recoverySearchSpaceId (e.g. of an SpCell) for a DCI. The DCI may be identified by an RNTI (e.g., C-RNTI, MCS-C-RNTI) of the wireless device.

In an example, the MAC entity of the wireless device may receive, from a lower layer (e.g., PHY) of the wireless device, a notification of a reception of the DCI on the search space indicated by the recoverySearchSpaceId. In an example, the wireless device may receive the DCI on a serving cell. In an example, the wireless device may transmit the uplink signal via the serving cell. In an example, the DCI may be addressed to the RNTI (e.g., C-RNTI) of the wireless device. In an example, based on the receiving the notification and the DCI being addressed to the RNTI, the wireless device may determine/consider the random-access procedure being successfully completed.

In an example, the wireless device may transmit the uplink signal on an SpCell. In an example, the response window configured in the IE BeamFailureRecoveryConfig may expire. In an example, the wireless device may not receive a DCI (or a PDCCH transmission) addressed to the RNTI of the wireless device on the search space indicated by recoverySearchSpaceId on the serving cell (e.g., before the response window expires). Based on the response window expiring and not receiving the DCI, the wireless device may consider a reception of a random-access response (e.g., BFR response) unsuccessful. Based on the response window expiring and not receiving the DCI, the wireless device may increment a transmission counter (e.g., PREAMBLE_TRANSMISSION_COUNTER) by one. In an example, the transmission counter may be equal to preambleTransMax plus one. Based on the transmission counter being equal to the preambleTransMax plus one and transmitting the uplink signal on the SpCell, the wireless device may indicate a random-access problem to upper layers (e.g., RRC).

In an example, the MAC entity of the wireless device may stop the response window (and hence monitoring for the random access response) after successful reception of the random-access response (e.g., the DCI addressed to the RNTI of the wireless device, BFR response) in response to the random access response comprising a random access preamble identifier that matches the transmitted PREAMBLE_INDEX.

In an example, based on completion of a random-access procedure, a MAC entity of a wireless device may discard explicitly signaled contention-free random-access resources except one or more uplink resources (e.g., contention-free random-access resources) for BFRQ.

In an example, a base station may provide a wireless device, for a serving cell (e.g., primary cell, secondary cell), with a first set of resource configuration indexes (e.g., periodic CSI-RS resource configuration indexes) by a higher layer parameter failureDetectionResources. The first set of resource configuration indexes may indicate one or more first RSs (e.g., CSI-RS, SS/PBCH block, etc.). The base station may configure the higher layer parameter failureDetectionResources for a downlink BWP (of configured downlink BWPs) of the serving cell. In an example, the base station may provide the wireless device, for the serving cell, with a second set of resource configuration indexes (e.g., periodic CSI-RS resource configuration indexes, SS/PBCH block indexes) by a higher layer parameter candidate BeamRSList. The second set of resource configuration indexes may indicate one or more second RSs (e.g., CSI-RS, SS/PBCH block, etc.). The base station may configure the higher layer parameter candidateBeamRSList for an uplink BWP (of configured uplink BWPs) of the serving cell. In an example, the wireless device may use the one or more first RSs and/or the one or more second RSs for radio link quality measurements on the serving cell.

In an example, a base station may not provide a wireless device with a higher layer parameter failureDetectionResources. Based on not being provided with the higher layer parameter failureDetectionResources, the wireless device may determine a first set of resource configuration indexes to include a resource configuration index (e.g., periodic CSI-RS resource configuration indexes). In an example, the resource configuration index may be same as an RS index in a RS set. In an example, the RS index may be indicated by a TCI state (e.g., via a higher layer parameter TCI-state). In an example, the TCI state may be used for a control resource set (CORESET) that the wireless device is configured to monitor at least one PDCCH. In an example, the base station may configure the TCI state for the CORESET. In an example, the TCI state may comprise two RS indexes. Based on the TCI state comprising two RS indexes, the first set of resource configuration indexes may include an RS index, of the two RS indexes, with QCL-TypeD configuration. In an example, the base station may configure the TCI state for the CORESET.

In an example, the wireless device may expect the first set of resource configuration indexes to include up to two RS indexes. The wireless device may expect a single port RS in the first set of resource configuration indexes. In an example, the one or more first RSs may comprise up to two RSs indicated by the two RS indexes.

In an example, a first threshold (e.g. Qout,LR) may correspond to a default value of higher layer parameter rlmInSyncOutOfSyncThreshold. In an example, a second threshold (e.g. Qin,LR) may correspond to a value provided by higher layer parameter rsrp-ThresholdSSB in the IE BeamFailureRecoveryConfig.

In an example, a physical layer in a wireless device may assess a first radio link quality of the one or more first RSs (or the first set of resource configuration indexes) against the first threshold. In an example, a first RS of the one or more first RSs may be associated (e.g. quasi co-located) with at least one DM-RS of a PDCCH monitored by the wireless device.

In an example, the wireless device may apply the second threshold to a first L1-RSRP measurement obtained from a SS/PBCH block of the one or more second RSs (or the second set of resource configuration indexes). In an example, the wireless device may apply the second threshold to a second L1-RSRP measurement obtained from a CSI-RS of the one or more second RSs (or the second set of resource configuration indexes) after scaling a reception power of the CSI-RS with a value provided by a higher layer parameter powerControlOffsetSS.

In an example, a wireless device may assess the first radio link quality of the one or more first RSs (indicated by the first set of resource configuration indexes). A physical layer in the wireless device may provide a BFI indication to a higher layer (e.g. MAC) of the wireless device when the first radio link quality is worse than the first threshold. In non-DRX mode operation, when the first radio link quality is worse than the first threshold, the physical layer may inform the higher layer with a first periodicity. The wireless device may determine the first periodicity by the maximum between a shortest periodicity among one or more periodicities of the one or more first RSs (e.g., resource configurations in the first set) and a first value (e.g. 2 msec). The first periodicity may be defined as max (the first value, TBFD-RS,M), where TBFD-RS,M is the shortest periodicity.

In an example, in DRX mode operation, when the first radio link quality is worse than the first threshold, the physical layer may inform the higher layer with a second periodicity. N an example, the base station may configure the wireless device with a DRX_cycle_length for the DRX mode operation. The wireless device may determine the second periodicity by max (1.5*DRX_cycle_length, 1.5*TBFD-RS,M) when the DRX_cycle_length is less than or equal to 320 ms. The wireless device may determine that the second periodicity is equal to the DRX_cycle_length when the DRX_cycle_length is greater than 320 ms.

In an example, based on a request from a higher layer (e.g. MAC) of the wireless device, the wireless device may provide to the higher layer one or more candidate RSs (e.g., the periodic CSI-RS configuration indexes, the SS/PBCH blocks indexes) from the one or more second RSs (e.g., the second set) and one or more L1-RSRP measurements. In an example, each candidate RS of the one or more candidate RSs may be associated with a L1-RSRP measurement of the one or more L1-RSRP measurements. In an example, the association may be one-to-one. In an example, the one or more L1-RSRP measurements associated with the one or more candidate RSs may be larger than or equal to the second threshold. In an example, the higher layer may select a candidate RS (e.g., periodic CSI-RS resource configuration, SS/PBCH block) among the one or more candidate RSs. In an example, the candidate RS may be identified by a first RS index of the second set of resource configuration indexes. In an example, the first RS index may indicate the candidate RS.

In an example, a wireless device may be provided/configured with a control resource set (CORESET) through a link to a search space set. The CORESET may be UE specific or dedicated to the wireless device or wireless device specific. In an example, the wireless device may monitor the CORESET for a beam failure recovery. In an example, the base station may provide the wireless device with the search space set by a higher layer parameter recoverySearchSpaceId in the IE BeamFailureRecoveryConfig. The wireless device may monitor at least one PDCCH in the control resource set.

In an example, the base station may provide the wireless device with the higher layer parameter recoverySearchSpaceId. Based on being provided with the higher layer parameter recoverySearchSpaceId, the wireless device may not expect to be provided with a second search space set for monitoring at least one PDCCH in the CORESET. In an example, the CORESET may be associated with the search space set provided by the higher layer parameter recoverySearchSpaceId. Based on the CORESET being associated with the search space set provided by the higher layer parameter recoverySearchSpaceId, the wireless device may not expect that the CORESET is associated with a second search space set.

In an example, the base station may provide the wireless device with a configuration for a transmission of an uplink signal (e.g., a PRACH transmission) by a higher layer parameter PRACH-ResourceDedicatedBFR in the IE BeamFailureRecoveryConfig. Based on the transmission of the uplink signal (e.g., the PRACH transmission) in a first slot (e.g., slot n) and, the wireless device, starting from a second slot (e.g., slot n+4), may monitor at least one PDCCH in a search space set (e.g., provided by the higher layer parameter recoverySearchSpaceId) for detection of a DCI format within a response window (e.g., ra-response Window). In an example, the wireless device may monitor the at least one PDCCH in the search space set (or CORESET) according to antenna port quasi co-location parameters associated with the candidate RS (provided by the higher layer). In an example, the response window may be configured by the IE BeamFailureRecoveryConfig. The DCI format may be configured with CRC scrambled by a RNTI (e.g., C-RNTI, MCS-C-RNTI).

In an example, when the wireless device monitors at least one PDCCH in the search space set (e.g., provided by the higher layer parameter recoverySearchSpaceId) and for a reception of corresponding PDSCH, the wireless device may assume that antenna port quasi-collocation parameters for the at least one PDCCH and the corresponding PDSCH are same as the candidate RS until the wireless device receives, by higher layers, an activation for a TCI state or a higher layer parameter TCI-StatesPDCCH-ToAddlist and/or a higher layer parameter TCI-StatesPDCCH-ToReleaseList. In an example, a DCI format received in the search space set while monitoring the at least one PDCCH may schedule the corresponding PDSCH.

In an example, after the wireless device detects the DCI format with CRC scrambled by the RNTI (e.g., C-RNTI or MCS-C-RNTI) in the search space set (e.g., provided by the higher layer parameter recoverySearchSpaceId), the wireless device may continue to monitor at least one PDCCH in the search space set until the wireless device receives an activation command (e.g., MAC CE) for a TCI state or a higher layer parameter TCI-StatesPDCCH-ToAddlist and/or a higher layer parameter TCI-StatesPDCCH-ToReleaseList.

In an example, the wireless device may perform the transmission of the uplink signal (e.g., PRACH transmission) on a serving cell (e.g., PCell, SCell). In an example, the wireless device may use a spatial filter for the transmission of the uplink signal (e.g., preamble transmission for the PRACH transmission). In an example, the wireless device may detect a DCI format, with CRC scrambled by the RNTI, in at least one PDCCH in the search space set (e.g., provided by the higher layer parameter recoverySearchSpaceId). In an example, after a first number of symbols (e.g., 28 symbols) from a last symbol of a reception of the at least one PDCCH, the wireless device may transmit a second uplink signal via PUCCH on the serving cell using the spatial filter used for the transmission of the uplink signal (e.g., the PRACH transmission) until the wireless device receives an activation command (e.g., MAC CE) for PUCCH-Spatialrelationinfo or is provided PUCCH-Spatialrelationinfo for PUCCH resource(s) for the serving cell.

In an example, after a first number of symbols (e.g., 28 symbols) from a last symbol of a reception of the at least one PDCCH, the wireless device may assume that antenna port quasi-collocation parameters for a CORESET with index zero (e.g., Coreset 0) are same as the candidate RS for PDCCH monitoring in the CORESET with index zero.

In an example, the base station may not provide the wireless device is with a higher layer parameter recoverySearchSpaceId. Based on not being provided with the higher layer parameter recoverySearchSpaceId, the wireless device may not initiate a contention-free random access procedure for a beam failure recovery. In an example, the wireless device may initiate a contention-based random-access procedure for a beam failure recovery based on not being provided with the higher layer parameter recoverySearchSpaceId.

In an example, a wireless device may assess a downlink link quality of a serving cell based on one or more first RSs (e.g., periodic CSI-RS, SSB, etc.) in the first set of resource configuration indexes to detect a beam failure instance (BFI).

In an example, a wireless device may estimate a first radio link quality for an RS of the one or more first RSs and compare the first radio link quality to a first threshold (Qout_LR) to access downlink radio link quality of the serving cell. The first threshold may be defined as a level at which a downlink radio level link may not be reliably received. In an example, the first threshold may correspond to a first percent (e.g., 10%) block error rate (BLER) of a hypothetical PDCCH transmission.

In an example, a wireless device may perform L1-RSRP measurements based on one or more second RSs (e.g., periodic CSI-RS, SSB, etc.) in the second set of resource configuration indexes in order to detect candidate beam (or candidate RS). An L1-RSRP measurement of the candidate beam (or candidate RS) may be better than a second threshold (e.g., indicated by higher layer parameter rsrp-ThresholdSSB, rsrp-ThresholdCSI-rs (rsrp-ThresholdSSB+powerControlOffsetSS). UE is not required to perform candidate beam detection outside the active DL BWP.

In an example, a wireless device may perform a L1-RSRP measurement for an RS of the one or more second RSs and compare the L1-RSRP measurement to the second threshold (rsrp-ThresholdSSB, rsrp-ThresholdCSI-rs) to select at least one candidate beam (or candidate RS) for a beam failure recovery.

In an example, a wireless device may be active on a first DL BWP of a serving cell. The first DL BWP may be an active DL BWP of the serving cell based on being active on the first DL BWP. In an example, the wireless device may not perform a beam failure detection outside the active DL BWP. In an example, the wireless device may not perform a candidate beam detection outside the active DL BWP. In an example, a second DL BWP of the serving cell may be deactivated. The wireless device may not perform a beam failure detection for the second DL BWP based on the second DL BWP being deactivated. The wireless device may not perform a candidate beam detection for the second DL BWP based on the second DL BWP being deactivated.

In an example, a wireless device may estimate a first radio link quality of a CSI-RS with a first subcarrier spacing (SCS) for a beam failure detection. In an example, a wireless device may estimate a second radio link quality of a SSB with a second subcarrier spacing (SCS) for a beam failure detection. In an example, the wireless device may not perform beam failure detection measurements based on the first SCS and the second SCS being different. In an example, the wireless device may not perform beam failure detection measurements based on the CSI-RS and the SSB being frequency division multiplexes (FDM-ed) in at least one symbol (e.g., OFDM).

In an example, a wireless device in RRC connected mode may be expected to receive the higher layer UE specific configuration of a NZP-CSI-RS-ResourceSet configured with higher layer parameter trs-Info.

In an example, for a NZP-CSI-RS-ResourceSet configured with the higher layer parameter trs-Info, the wireless device may assume the antenna port with the same port index of the configured NZP CSI-RS resources in the NZP-CSI-RS-ResourceSet is the same. For frequency range 1, the wireless device may be configured with one or more NZP CSI-RS set(s), where a NZP-CSI-RS-ResourceSet consists of four periodic NZP CSI-RS resources in two consecutive slots with two periodic NZP CSI-RS resources in each slot. For frequency range 2 the UE may be configured with one or more NZP CSI-RS set(s), where a NZP-CSI-RS-ResourceSet consists of two periodic CSI-RS resources in one slot or with a NZP-CSI-RS-ResourceSet of four periodic NZP CSI-RS resources in two consecutive slots with two periodic NZP CSI-RS resources in each slot.

In an example, a wireless device configured with NZP-CSI-RS-ResourceSet(s) configured with higher layer parameter trs-Info may have the CSI-RS resources configured as: Periodic, with the CSI-RS resources in the NZP-CSI-RS-ResourceSet configured with same periodicity, bandwidth and subcarrier location. Periodic CSI-RS resource in one set and aperiodic CSI-RS resources in a second set, with the aperiodic CSI-RS and periodic CSI-RS resource having the same bandwidth (with same RB location) and the aperiodic CSI-RS being 'QCL-Type-A' and 'QCL-TypeD', where applicable, with the periodic CSI-RS resources. For frequency range 2, the wireless device may not expect that the scheduling offset between the last symbol of the PDCCH carrying the triggering DCI and the first symbol of the aperiodic CSI-RS resources may be smaller than the wireless device reported ThresholdSched-Offset. The wireless device shall expect that the periodic CSI-RS resource set and aperiodic CSI-RS resource set are configured with the same number of CSI-RS resources and with the same number of CSI-RS resources in a slot. For the aperiodic CSI-RS resource set if triggered, and if the associated periodic CSI-RS resource set is configured with four periodic CSI-RS resources with two consecutive slots with two periodic CSI-RS resources in each slot, the higher layer parameter aperiodicTriggeringOffset indicates the triggering offset for the first slot for the first two CSI-RS resources in the set.

In an example, a wireless device may not expect to be configured with a CSI-ReportConfig that is linked to a CSI-ResourceConfig containing an NZP-CSI-RS-ResourceSet configured with trs-Info and with the CSI-ReportConfig configured with the higher layer parameter timeRestrictionForChannelMeasurements set to 'configured'.

In an example, a wireless device may not expect to be configured with a CSI-ReportConfig with the higher layer parameter reportQuantity set to other than 'none' for aperiodic NZP CSI-RS resource set configured with trs-Info.

In an example, a wireless device may not expect to be configured with a CSI-ReportConfig for periodic NZP CSI-RS resource set configured with trs-Info.

In an example, a wireless device may not expect to be configured with a NZP-CSI-RS-ResourceSet configured both with trs-Info and repetition. Each CSI-RS resource may be configured by the higher layer parameter NZP-CSI-RS-Resource with the following restrictions: the time-domain locations of the two CSI-RS resources in a slot, or of the four CSI-RS resources in two consecutive slots (which are the same across two consecutive slots), as defined by higher layer parameter CSI-RS-resourceMapping, may be given by one of $l \in \{4,8\}$, $l \in \{5,9\}$, or $l \in \{6,10\}$ for frequency range 1 and frequency range 2, $l \in \{0,4\}$, $l \in \{1,5\}$, $l \in \{2,6\}$, $l \in \{3,7\}$, $l \in \{7,11\}$, $l \in \{8,12\}$ or $l \in \{9,13\}$ for frequency range 2. A single port CSI-RS resource with density $\rho=3$ and higher layer parameter density configured by CSI-RS-ResourceMapping. The bandwidth of the CSI-RS resource, as given by the higher layer parameter freqBand configured by CSI-RS-ResourceMapping, may be the minimum of 52 and $$N_{RB}^{BWP,i}$$

resource blocks, or is equal to $$N_{RB}^{BWP,i}$$

resource blocks. The wireless device may be not expected to be configured with the periodicity of $2^{\mu}\times10$ slots if the bandwidth of CSI-RS resource is larger than 52 resource blocks. The periodicity and slot offset for periodic NZP CSI-RS resources, as given by the higher layer parameter periodicityAndOffset configured by NZP-CSI-RS-Resource, is one of $2^{\mu}X_p$ slots where $X_p$=10, 20, 40, or 80 and where μ is defined based on the subcarrier spacing. Same powerControlOffset and powerControlOffsetSS given by NZP-CSI-RS-Resource value across all resources.

Figure 17:
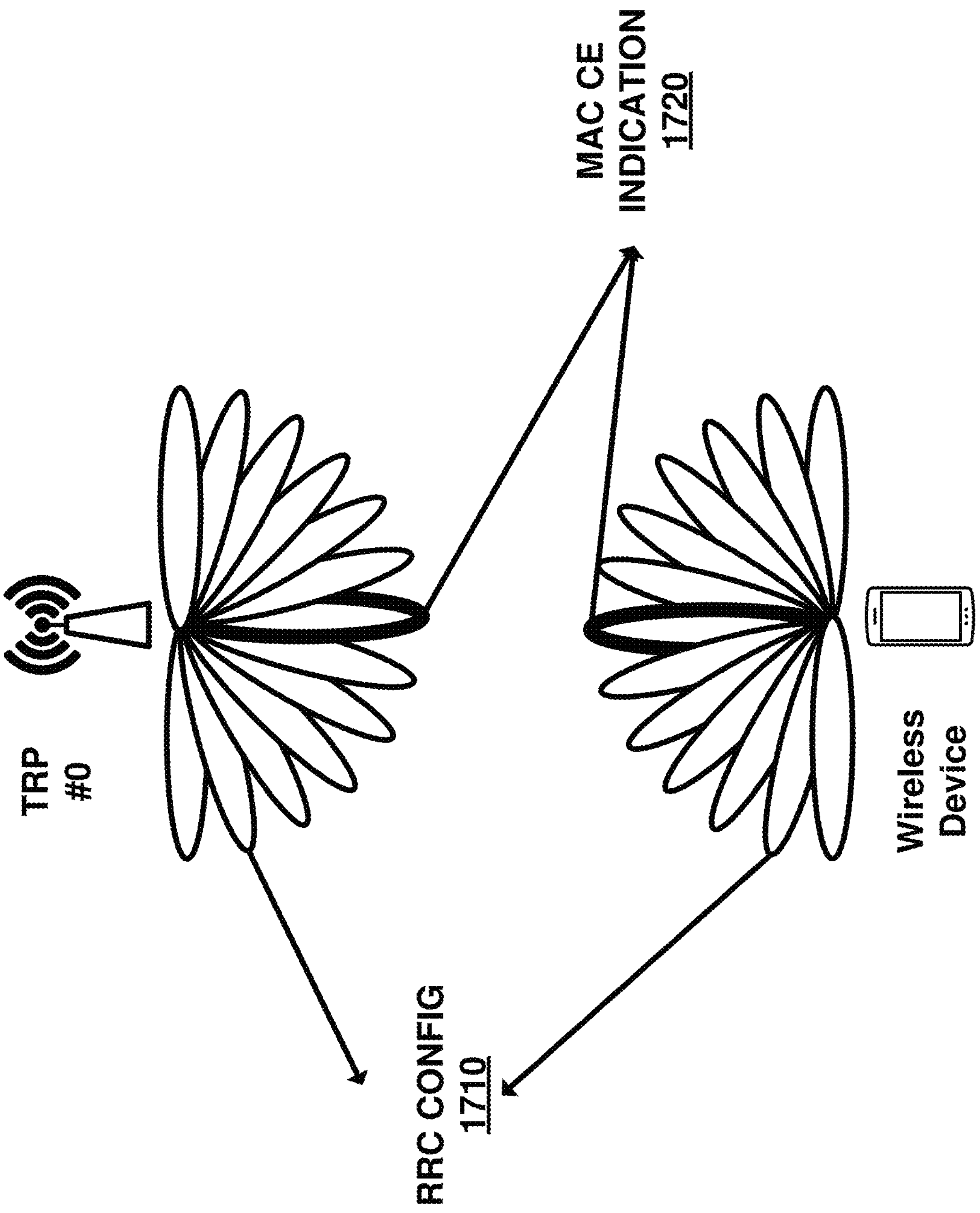
FIG. 17 is an example diagram to show beam operation procedures as per an aspect of an embodiment of the present disclosure.

FIG. 17 is an example diagram illustrating procedures for beam configuration activation, and indication procedures from a base station with a single Transmission and Reception Point (TRP) in accordance with embodiments of the present disclosure. In an example, the base station may configure one or more Transmission Configuration Indication (TCI) states in RRC configurations (e.g., 1710) to support configurations of one or more reference signals to acquire channel characteristics (e.g., Doppler spread, Doppler shift, average delay, delay spread, and spatial Rx parameter) of the wireless channel between the base station and the wireless device. Based on the configured TCI states in RRC configurations (e.g., 1710) and MAC CE signaling (e.g., 1720) from the base station may indicate one TCI state which may be used for the reception of downlink channels (e.g., PDCCH) among the configured TCI states in RRC configurations (e.g., 1710) of the wireless device.

For each DL BWP configured to a UE in a serving cell, a wireless device may be provided by higher layer signaling with up to 3 CORESETs. For each CORESET, the wireless device may be provided a CORESET index (e.g., 0≤p<12, by controlResourceSetId), a DMRS scrambling sequence initialization value (e.g., pdcch-DMRS-ScramblingID), a precoder granularity for a number of REGs in the frequency domain where the UE may assume use of a same DMRS precoder (e.g., precoderGranularity), a number of consecutive symbols (e.g., duration), a set of resource blocks provided by frequencyDomainResources, CCE-to-REG mapping parameters (e.g., ccc-REG-MappingType), an antenna port quasi co-location, from a set of antenna port quasi co-locations provided by TCI-State, indicating quasi co-location information of the DMRS antenna port for PDCCH reception in a respective CORESET, and an indication for a presence or absence of a TCI field for DCI format 1_1 transmitted by a PDCCH in CORESET (e.g., TCI-PresentInDCI).

Figure 18:
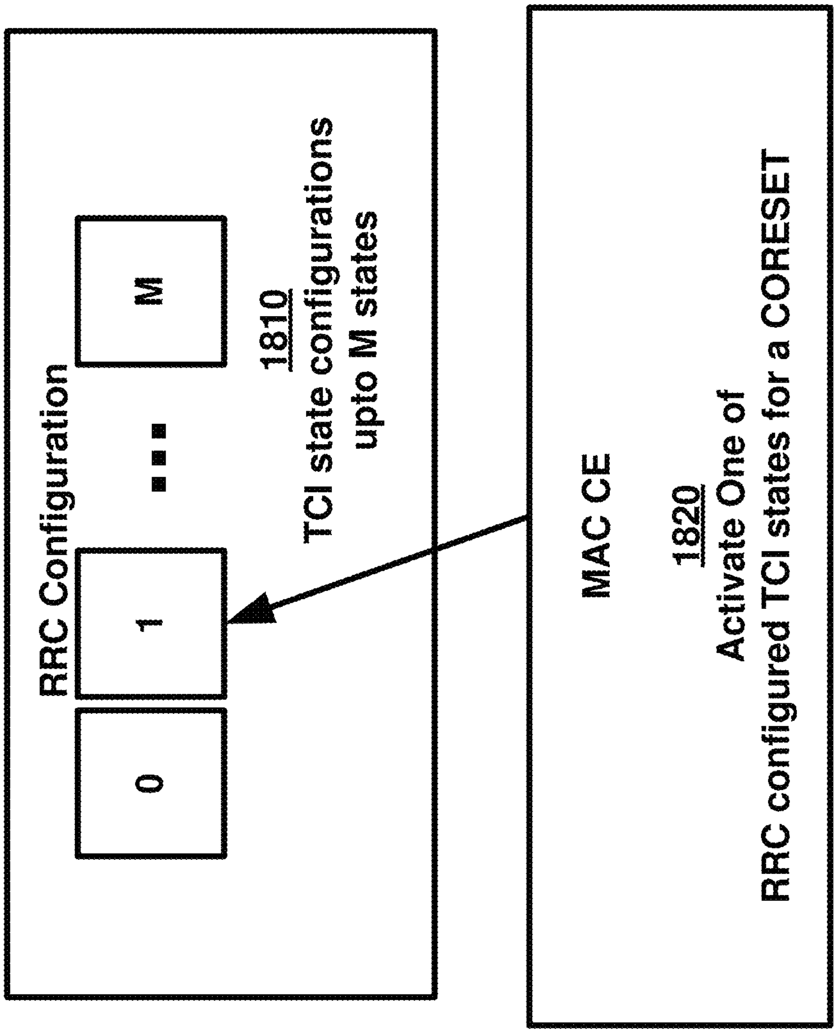
FIG. 18 is an example diagram to show applications of TCI state as per an aspect of an embodiment of the present disclosure.

FIG. 18 is an example diagram illustrating applications of a configured or activated TCI state (e.g., 1810) in accordance with embodiments of the present disclosure. If a wireless device has not receive a MAC CE activation command (e.g., 1820) for a TCI state (e.g., 1810) for CORESETs other than a CORESET with index 0, a wireless device may assume that the DMRS port associated with PDCCH receptions may be quasi co-located with the SS/PBCH block the wireless device identified during the initial access procedure.

If a wireless device has not receive a MAC CE activation command (e.g., 1820) for a TCI state for CORESET with index 0, the wireless device may assume that DMRS antenna port for PDCCH receptions in the CORESET may be quasi co-located with a SS/PBCH block the wireless identified either during initial access or, if any, a most recent random access procedure not initiated by a PDCCH order that triggers a non-contention based random access procedure.

If a wireless is provided a TCI state (e.g., 1810) for a CORESET, or if the wireless device receives a MAC CE activation command via a MAC CE activation command (e.g., 1820), the wireless device may assume that the DMRS antenna port associated with PDCCH receptions in the CORESET may be quasi co-located with the one or more DL RS configured by the TCI state (e.g., 1810). For a CORESET with index 0, the wireless device may expect that QCL-TypeD of a CSI-RS in a TCI state indicated by a MAC CE activation command for the CORESET may be provided by a SS/PBCH block.

If the wireless device receives a MAC CE activation command (e.g., 1820) for one of the TCI states (e.g., 1810), the wireless device may apply the activation command (e.g., 1820) 3 msec after a slot where the wireless device transmits HARQ-ACK information for the PDSCH providing the activation command (e.g., 1820). The active BWP may be defined as the active BWP in the slot when the activation command is applied.

Figure 19:
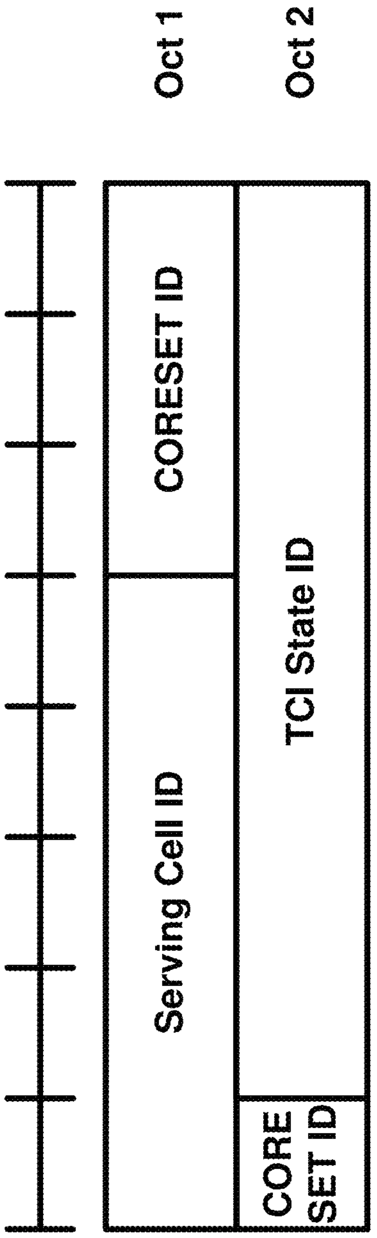
FIG. 19 is an example diagram to show an indication in MAC CE as per an aspect of an embodiment of the present disclosure.

FIG. 19 is an example diagram illustrating applications of a MAC CE activation command by a wireless device in accordance with embodiments of the present disclosure. The activation command may be identified by a MAC PDU subheader with LCID. It may have a fixed size of 16 bits. In the activation command, Serving Cell ID may indicate the identity of the Serving Cell for which the MAC CE applies. The length of the field may be 5 bits. In the activation command, CORESET ID may indicate a Control Resource Set identified with ControlResourceSetID for which the TCI state may be being indicated. In case the value of the field is 0, the field may refer to the Control Resource Set configured by controlResourceSetZero. The length of the field may be 4 bits. In the activation command, TCI State ID may indicate the TCI state identified by TCI-StateId applicable to the Control Resource Set identified by CORESET ID field. If the field of CORESET ID is set to 0, this field may indicate a TCI-StateId for a TCI state of the first 64 TCI states configured by tci-States-ToAddModList and tci-States-ToReleaseList in the PDSCH-Config in the active BWP. If the field of CORESET ID is set to the other value than 0, this field may indicate a TCI-StateId configured by tci-statesPDCCH-ToAddList and tci-StatesPDCCH-ToReleaseList in the controlResourceSet identified by the indicated CORESET ID. The length of the field may be 7 bits.

Figure 20:
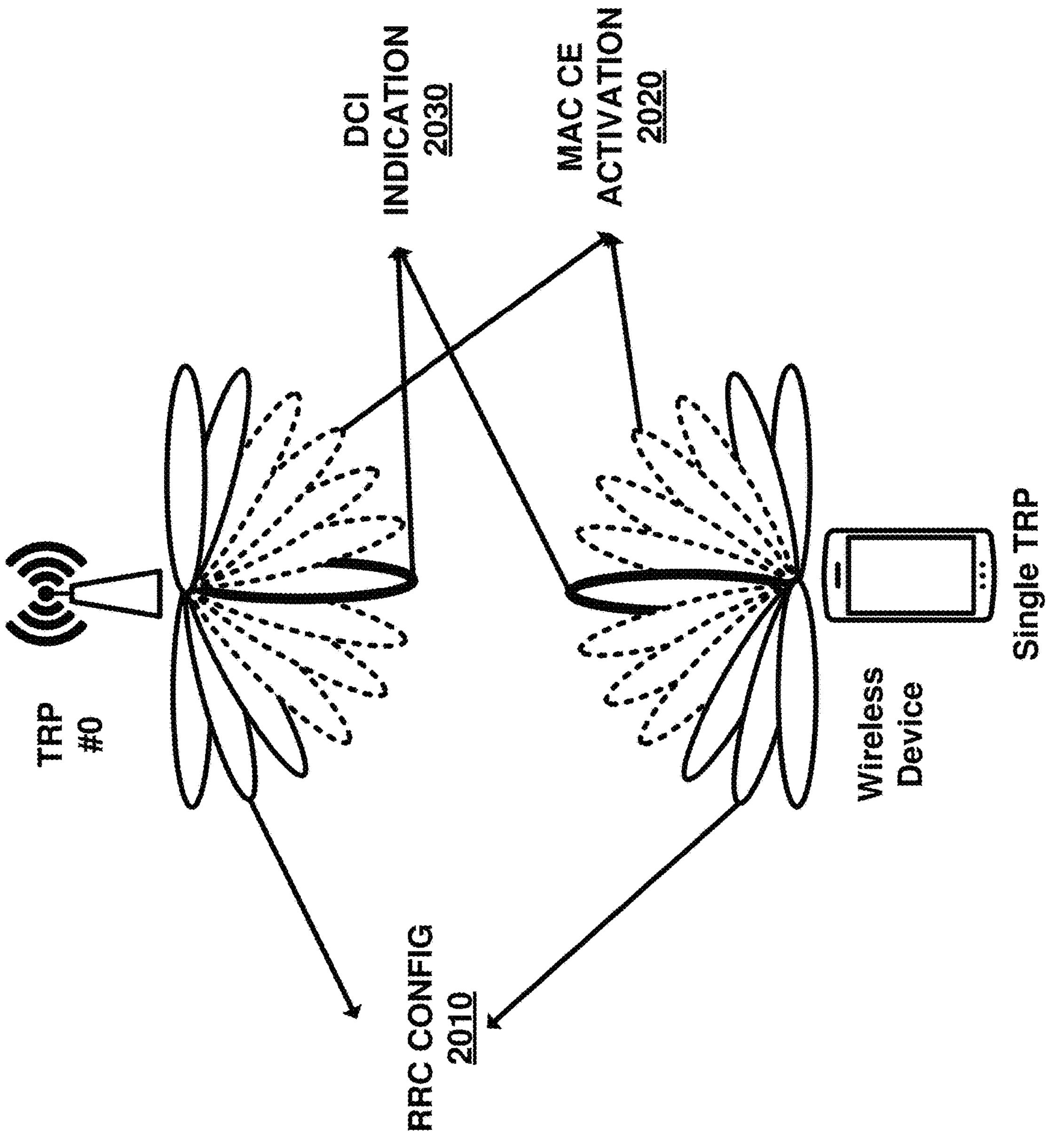
FIG. 20 is an example diagram to show beam operation procedures as per an aspect of an embodiment of the present disclosure.

FIG. 20 is an example diagram illustrating procedures for beam configuration activation, and indication procedures from a base station with a single TRP in accordance with embodiments of the present disclosure. In an example, the base station may configure one or more TCI states in RRC configurations (e.g., 2010) to support configurations of one or more reference signals to acquire channel characteristics (e.g., Doppler spread, Doppler shift, average delay, delay spread, and spatial Rx parameter) of the wireless channel between the base station and the wireless device. Based on the configured TCI states in RRC configurations (e.g., 2010), MAC CE signaling (e.g., 2020) from the base station may activate or deactivate at least one TCI state among the configured TCI states in RRC configurations (e.g., 2010) of the wireless device. Among the activated TCI states, one of TCI states may be indicated via DCI (e.g., 2030) to indicate one of the activated TCI states that may be used for the reception of downlink channels (e.g., PDSCH) for the wireless device.

Figure 21:
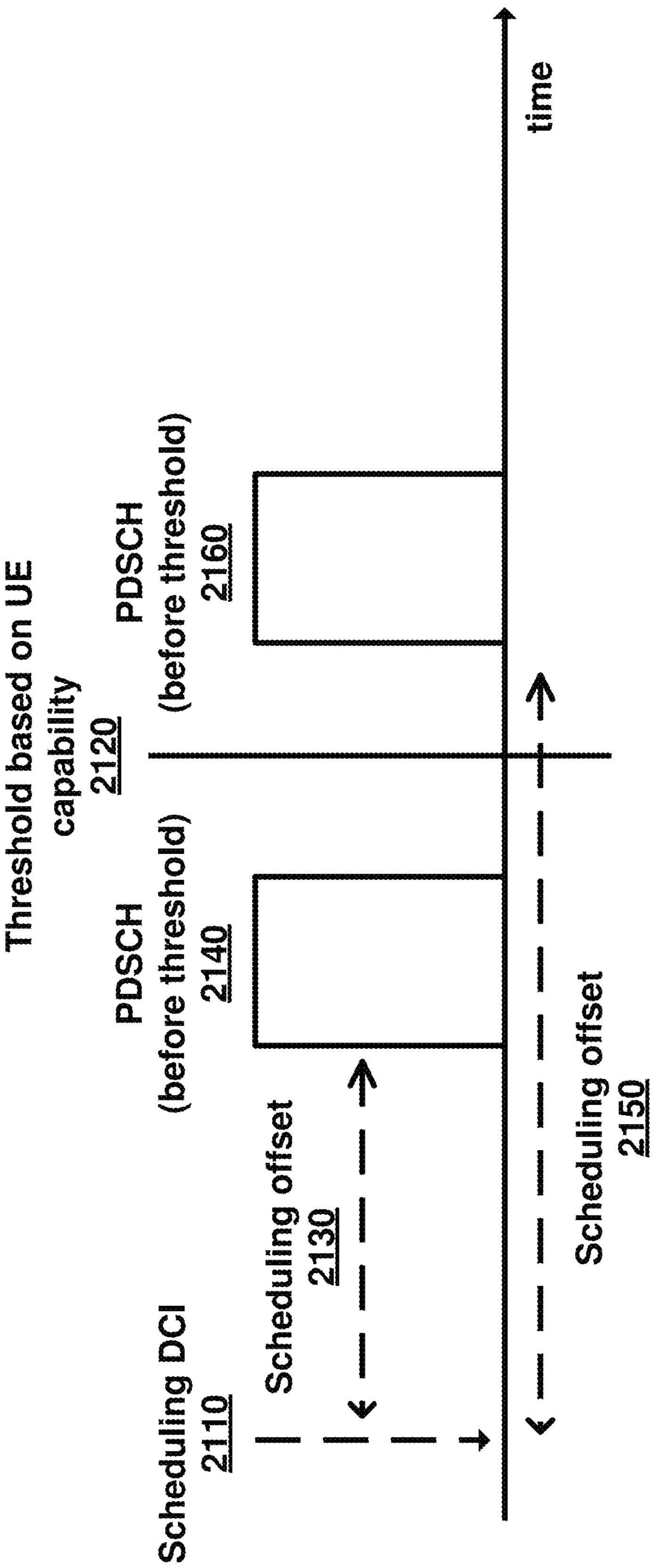
FIG. 21 is an example diagram to show applications of TCI state as per an aspect of an embodiment of the present disclosure.

FIG. 21 is an example diagram illustrating applications of a configured or indicated TCI state by a wireless device in accordance with embodiments of the present disclosure. A base station may configure whether to use DCI based TCI state indication or not (e.g., TCI-PresentInDCI). When DCI based TCI state indication is not configured (e.g., TCI-PresentInDCI is not configured), one RRC configured TCI state may be used. Otherwise, DCI based TCI state indication may be used (e.g., TCI-PresentInDCI is configured). For TCI state configuration, activation, and indication, a threshold (e.g., 2120) to apply to the configured or indicated TCI state may be indicated by the wireless device. For example, the threshold (e.g., 2120) may be indicated via UE capability signaling. Based on the threshold (e.g., 2120), when a scheduling offset (e.g., the offset 2130 between scheduling DCI (e.g., 2110) and the downlink channel (e.g., 2140)) is smaller than the threshold (e.g., 2120), the indicated TCI state for one CORESET may be used. In an example, the CORESET may be the CORESET that has the lowest CORESET ID in the latest slot. Otherwise, when the scheduling offset (e.g., the offset 2150 between scheduling DCI 2110 and the downlink channel (e.g., 2160) is larger than threshold 2120)), the configured or indicated TCI state for the downlink channel may be used.

Figure 22:
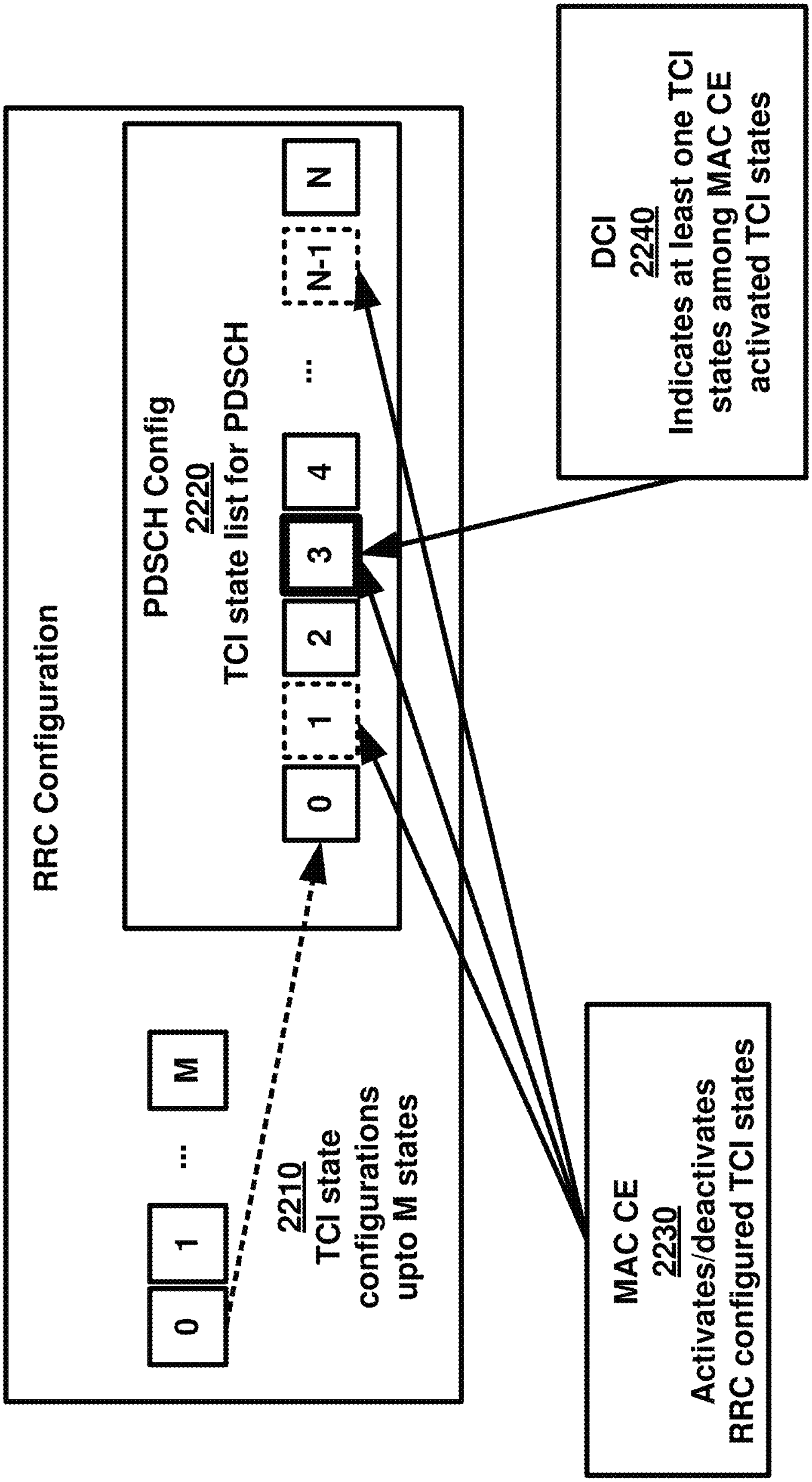
FIG. 22 is an example diagram to show applications of TCI state as per an aspect of an embodiment of the present disclosure.

FIG. 22 is an example diagram illustrating detailed configurations in RRC configuration with a single TRP in accordance with embodiments of the present disclosure. A base station may configure multiple TCI state configurations (e.g., 2210) in RRC configuration. Based on the TCI state configurations (e.g., 2210), the base station may configure a list of TCI states (e.g., 2220) for the indication of TCI state for a transmission of downlink channels. In an example, the list of TCI states (e.g., 2220) may exist in a configuration for downlink transmissions, such as PDSCH config as shown in FIG. 19. The configuration for downlink transmissions may comprise other configurations such as DMRS, rate matching, RBG size, MCS table, PRB Bundling and ZP CSI-RS. Based on the list of TCI states (e.g., 2220), the base station may activate and deactivate one or more TCI states (e.g., 2230) to the wireless device among the configured TCI states (e.g., 2210) in the list of TCI states (e.g., 2220) via MAC CE signaling. Based on the activated TCI states in the activated and deactivated one or more TCI states (e.g., 2230), a scheduling DCI (e.g., 2240) may schedule a downlink channel with one TCI state among the activated TCI states.

Figure 23:
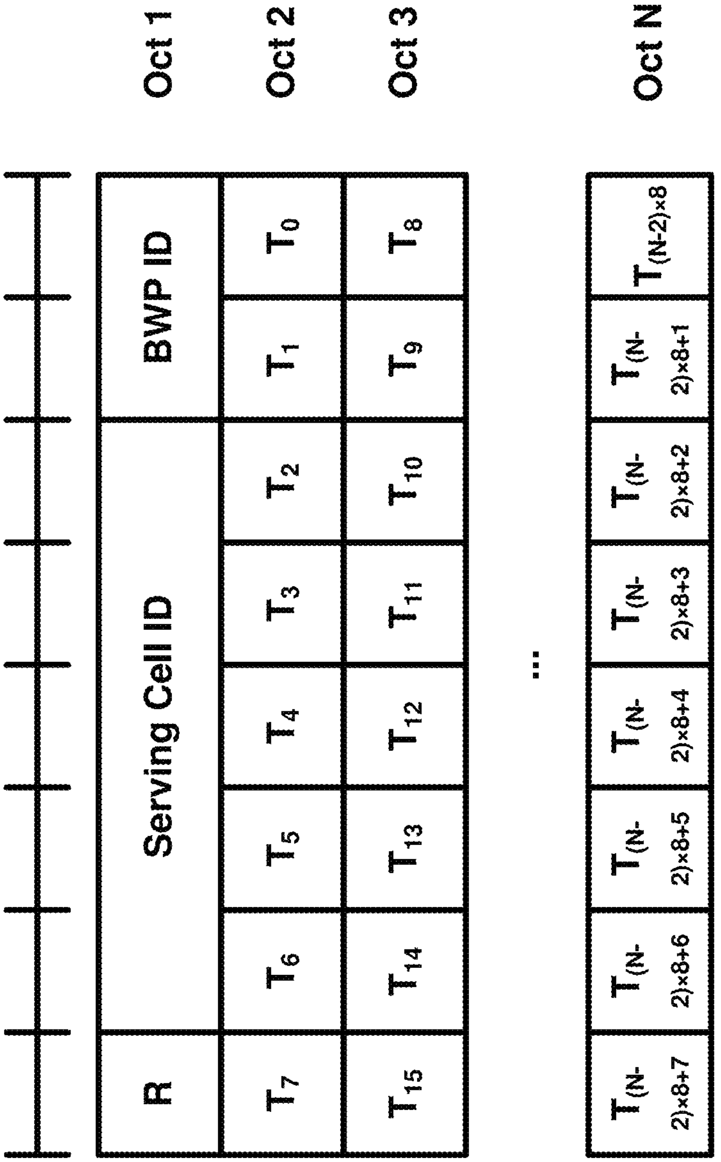
FIG. 23 is an example diagram to show an indication in MAC CE as per an aspect of an embodiment of the present disclosure.

FIG. 23 is an example diagram illustrating applications of a MAC CE activation command by a wireless device in accordance with embodiments of the present disclosure. The activation command may be identified by a MAC PDU subheader with LCID. In the activation command, Serving Cell ID may indicate the identity of the Serving Cell for which the MAC CE applies. In the activation command, BWP ID may indicate a DL BWP for which the MAC CE may apply as the codepoint of the DCI (e.g., bandwidth part indicator field). The length of the BWP ID field may be 2 bits. If there is a TCI state with TCI-StateId i, the Ti field may indicate the activation/deactivation status of the TCI state with TCI-StateId i, otherwise MAC entity shall ignore the Ti field. The Ti field may be set to "1" to indicate that the TCI state with TCI-StateId i shall be activated and mapped to the codepoint of the DCI field (e.g., Transmission Configuration Indication). The Ti field may be set to "0" to indicate that the TCI state with TCI-StateId i shall be deactivated is not mapped to the codepoint of the DCI field (e.g., Transmission Configuration Indication). The codepoint to which the TCI state is mapped may be determined by its ordinal position among all the TCI states with Ti field set to "1", i.e. the first TCI state with Ti field set to "1" shall be mapped to the codepoint value 0, second TCI state with Ti field set to "1" shall be mapped to the codepoint value 1 and so on. The maximum number of activated TCI states may be 8. In the activation command, R may indicate Reserved bit which may be set to "0".

Figure 24:
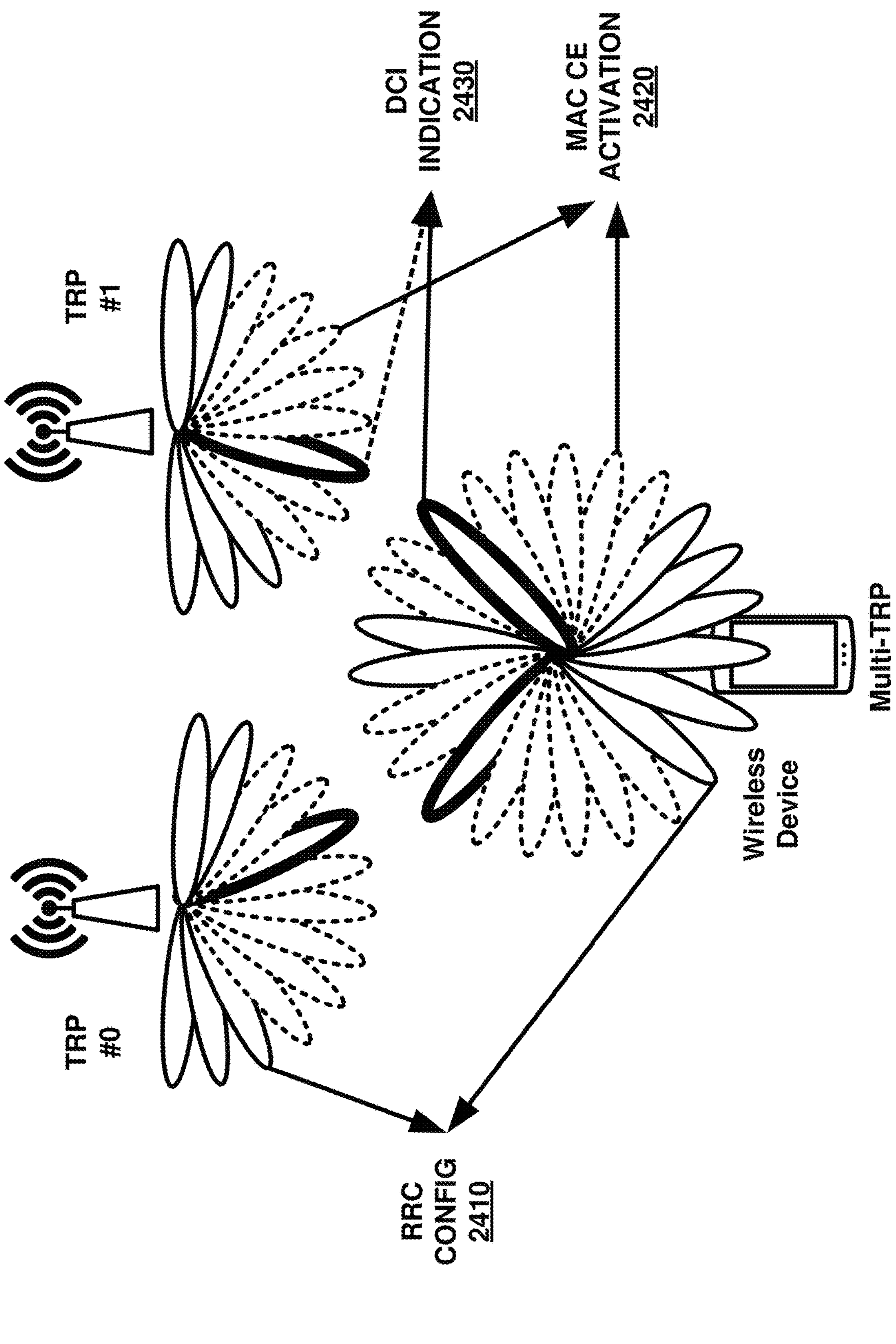
FIG. 24 is an example diagram to show beam operation procedures as per an aspect of an embodiment of the present disclosure.

FIG. 24 is an example diagram illustrating detailed configurations in RRC configuration with multiple TRPs in accordance with embodiments of the present disclosure. A base station may configure multiple TCI state configurations (e.g., 2410) in RRC configuration. Based on the TCI state configurations (e.g., 2410), the base station may configure multiple groups of TCI states. The base station may then indicate one of the multiple groups of TCI states from which a TCI state may be activated for transmission of downlink channels. Without TCI state groups, a base station may need to indicate one of all configured TCI states. This may lead to a higher DCI payload size and/or decrease coverage of a TRP. In addition, a wireless device may need to activate all configured TCI states for multiple panels of the wireless device. Supporting TCI state groups may reduce implementation complexity by reducing a number of activated TCI states for the wireless device. In an example, one or more groups may exist in one or more configurations for downlink transmissions. Among the configured TCI state groups (e.g., 2410), the base station may indicate one or more TCI state groups for the activation and deactivation of configured TCI states (e.g., 2410) via indications in MAC CE signaling (e.g., 2420). Based on the indicated one or more TCI state groups, the base station may activate and deactivate one or more TCI states (e.g., 2410) in the indicated one or more TCI state groups to the wireless device. Among the activated TCI state groups via MAC CE signaling, one or more scheduling DCIs may indicate via indications (e.g., 2430) one or more TCI state groups for downlink transmissions. Based on the indication of TCI state groups, one or more scheduling DCIs may schedule downlink channels (e.g., 2430) with one or more activated TCI states in the indicated TCI state groups. The indication of multiple TCI state groups for activation/deactivation and downlink transmissions may be delivered via a single MAC CE and DCI signaling as well as multiple MAC CE and DCI signaling. It should be noted that a group of TCI states may also be referred to as a list of TCI states.

Figure 25:
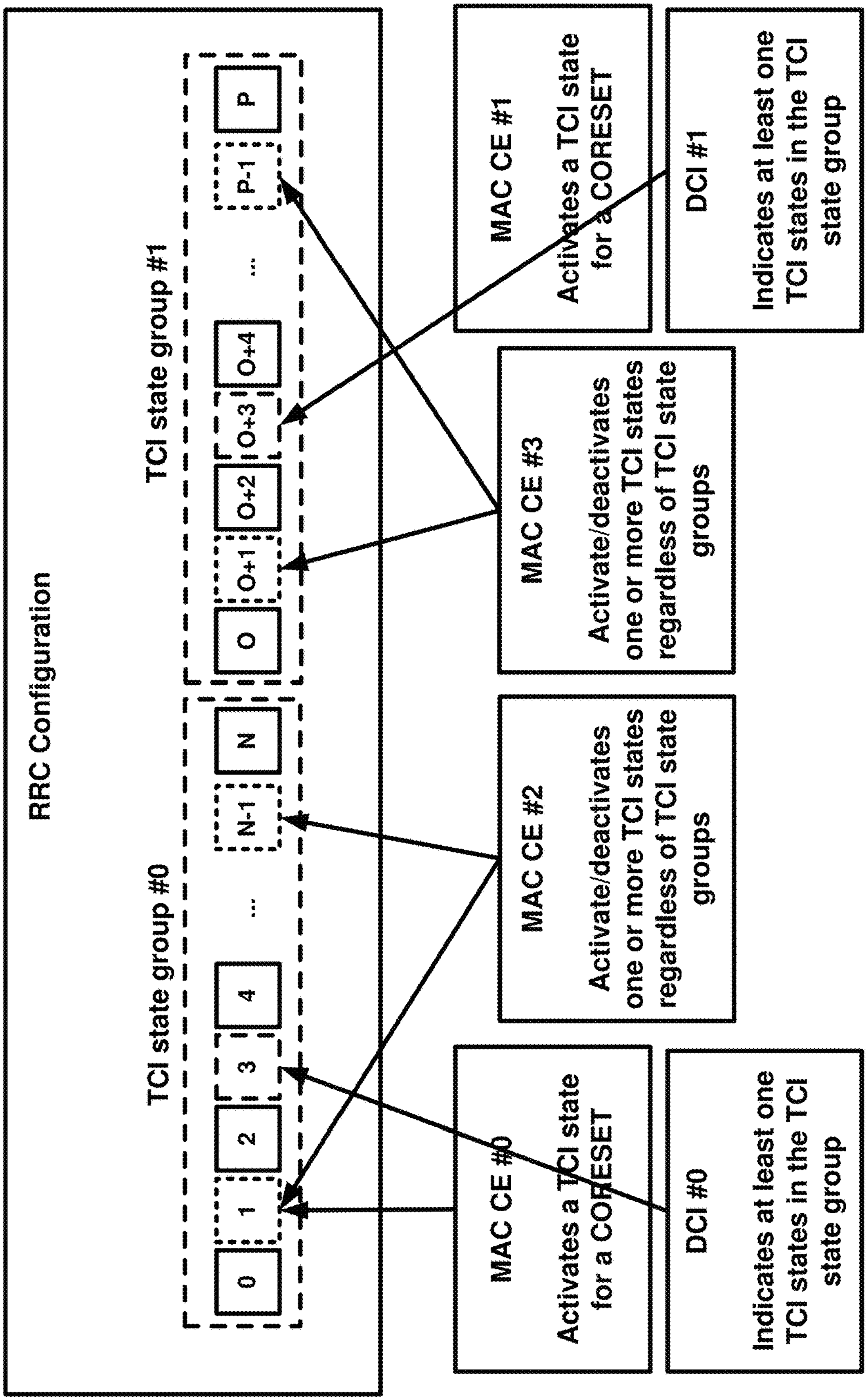
FIG. 25 is an example diagram to show applications of TCI state as per an aspect of an embodiment of the present disclosure.

FIG. 25 is an example diagram illustrating detailed configurations in RRC configuration with multiple TRPs in accordance with embodiments of the present disclosure.

Figure 26:
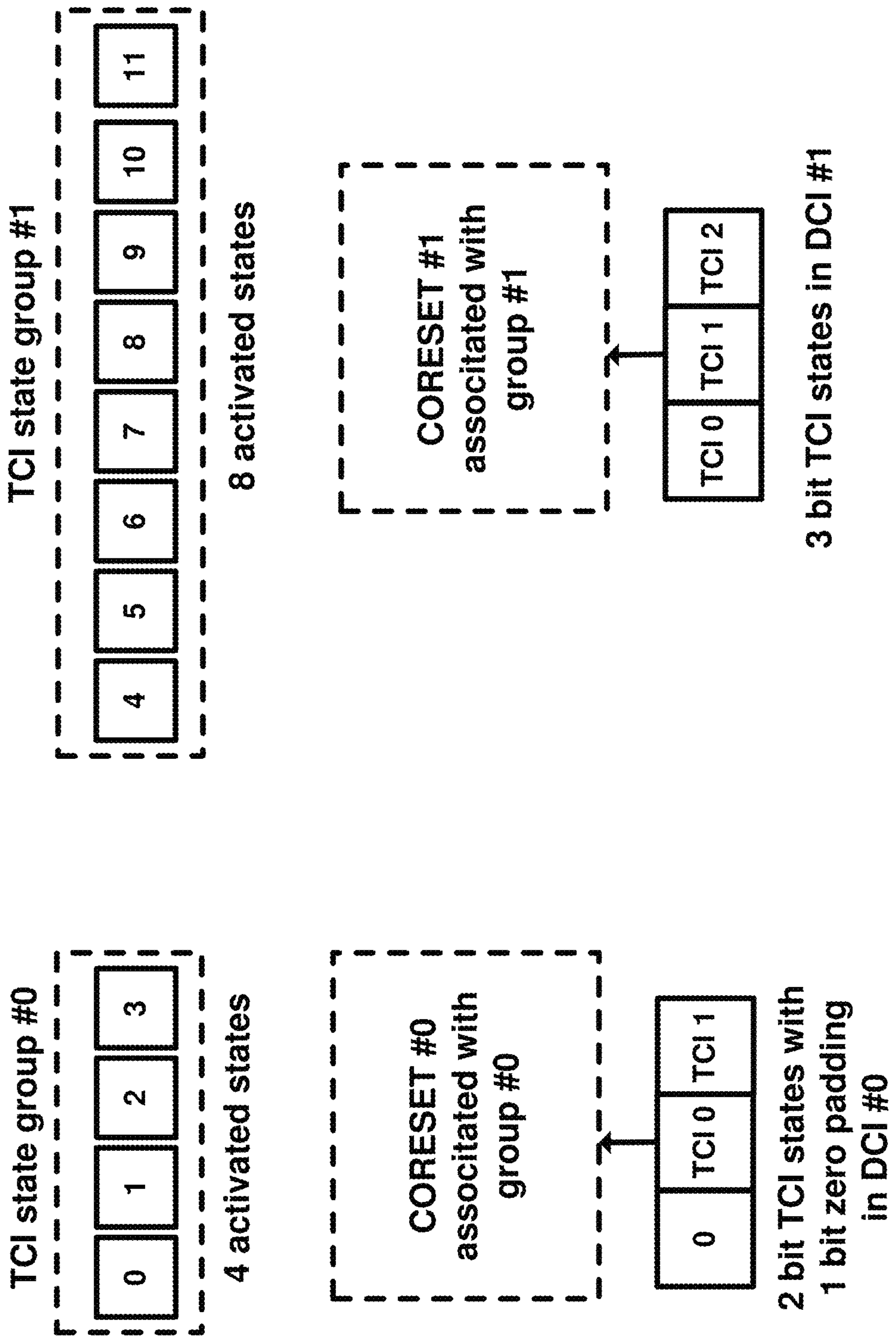
FIG. 26 is an example diagram to show indications of TCI state as per an aspect of an embodiment of the present disclosure.

Based on the activation/deactivation, a DCI may indicate one or more TCI states for the downlink channel (e.g., PDSCH). The indication of activated TCI state may be based on the TCI state group. FIG. 26 is an example diagram illustrating detailed TCI state indication with multiple TRPs in accordance with embodiments of the present disclosure. For example, DCI (e.g., DCI #0 or #1) in a CORESET (e.g., CORESET #0 or #1) may indicate the activated TCI states in the TCI state group (e.g., TCI state group #0 or #1) which is associated with the CORESET (e.g., CORESET #0 or #1). By indicating the activated TCI states in the TCI state group (e.g., TCI state group #0 or #1), a wireless device may not consider other TCI state groups and reduce its hardware complexity for the activation of TCI states for a radio frequency circuit of the wireless device. In addition, DCI bit payload may be reduced by not including TCI states of other TCI state groups (e.g., TCI state group #0 or #1). By reducing DCI bit payload, DCI coverage may be enhanced. In another example, the DCI bit payload may depend on the maximum number of activated TCI states among the TCI state groups (e.g., TCI state group #0 or #1). When the DCI bit payload size is different for multiple CORESETs, the blind detections of a wireless device may increase considering different sizes. Such increment of the blind detections may be burdensome for a UE implementation. In order to reduce the increment of the blind detections, the DCI bit payload size may be decided based on the maximum number of activated TCI states among the TCI state groups (e.g., TCI state group #0 or #1). When the activated TCI states in the indicated TCI state group (e.g., TCI state group #0 or #1) is smaller than the maximum number, redundant bits in the DCI may be padded with a certain number (e.g., zero padding in DCI #0). In FIG. 26, certain numbers of activated TCI states and TCI state groups are assumed for the case of explanation, however, the embodiments of the present disclosure is not restricted to the certain numbers.

Figure 27:
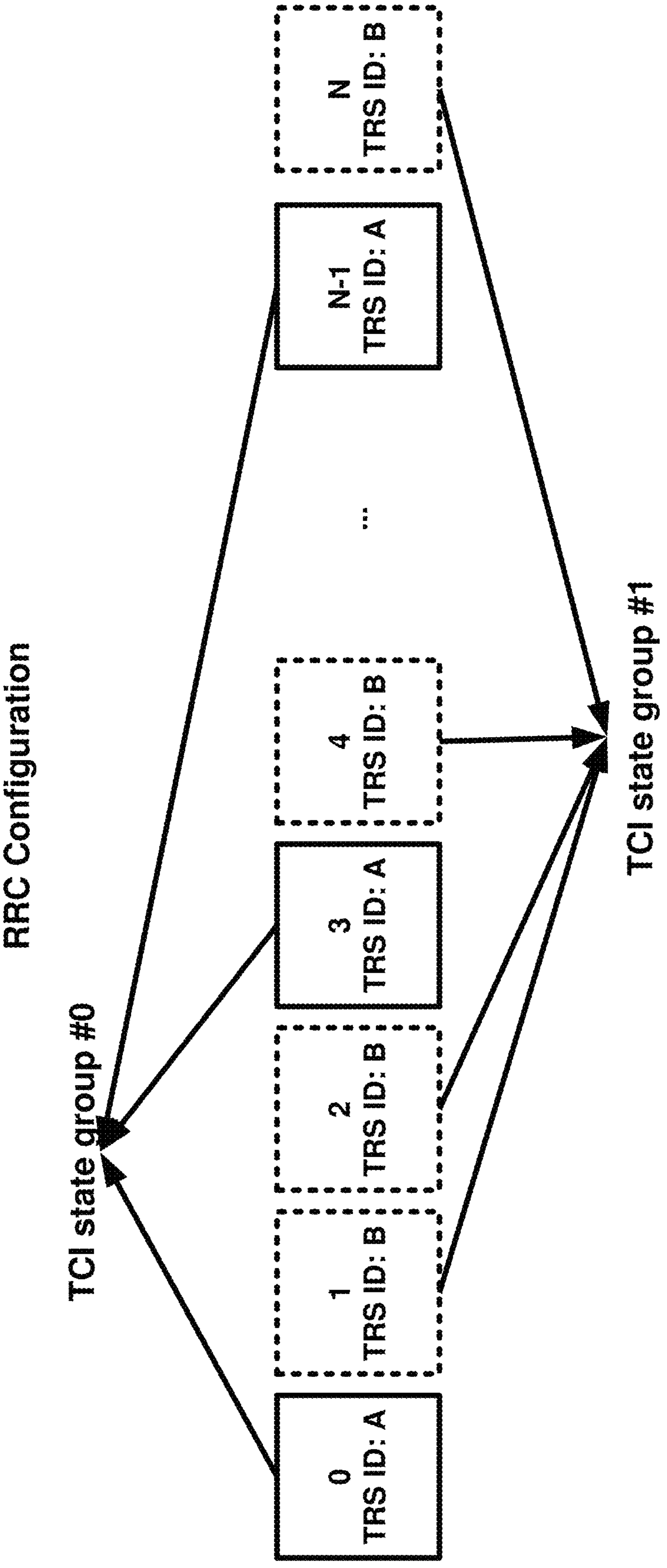
FIG. 27 is an example diagram to show applications of TRS ID as per an aspect of an embodiment of the present disclosure.

Instead of supporting explicit configuration of TCI state group list, TCI state group ID and implicit configuration based on a TCI state ID, other identities may be used to categorize the group of TCI states. FIG. 27 is an example diagram illustrating implicit TCI state grouping based on the configuration identity of CSI-RS for time/frequency tracking (i.e. Tracking Reference Signal (TRS)) in a TCI state in accordance with embodiments of the present disclosure. In an example, one or more TRS ID may be configured in a TCI state with QCL-TypeA, QCL-TypeB, QCL-TypeC and/or QCL-TypeD. The TRS may provide better estimate of the time and frequency tracking for a wireless device and enhance decoding performance of downlink channels. Since TRS transmissions may be based on TRP, utilizing TRS ID as a group ID may be a possible way to introduce group without introducing additional configuration overhead. In another example, the TRS ID used for grouping TCI state group may be TRS ID with QCL-TypeA, QCL-TypeB and QCL-Type C since QCL-TypeD may be used for acquiring spatial Rx filter, but others may be used for acquiring wireless channel characteristics such as Doppler spread, Doppler shift, delay spread, average delay and average gain.

In order to indicate one or more TCI state group for a CORESET as shown in FIG. 25, a MAC CE signaling for the CORESET may be used in TRS ID based implicit grouping. The MAC CE may indicate TCI state group ID for the CORESET implicitly by delivering TCI state ID. For example, when a wireless device receives a TCI state ID for a CORESET, the wireless device may identify the TCI state group which may share identical TRS ID in the TCI states. Based on the TCI state group one or more MAC CE signaling can be used for the activation/deactivation of the TCI states. Based on the activation/deactivation, a DCI may indicate one or more TCI states for the downlink channel (e.g., PDSCH). The indication of activated TCI state may be based on the TCI state group. In addition to TRS ID, SSB ID, CSI-RS ID, DMRS ID, scrambling ID, and SRS ID may be used.

Figure 28:
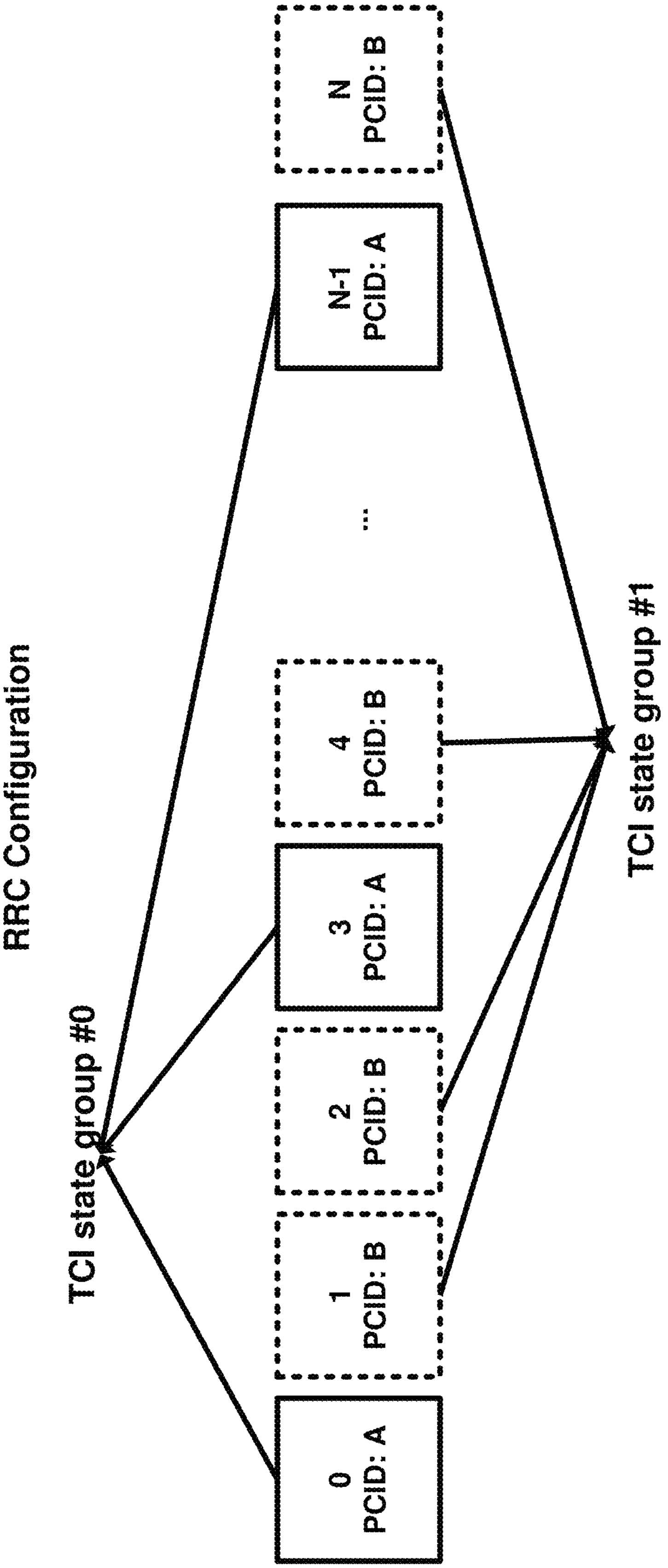
FIG. 28 is an example diagram to show applications of PCID as per an aspect of an embodiment of the present disclosure.

FIG. 28 is an example diagram illustrating implicit TCI state grouping based on the configuration Physical Cell ID (PCID) in a TCI state in accordance with embodiments of the present disclosure. In an example, a PCID may be configured in a TCI state of a wireless device to differentiate Synchronization Signal Block (SSB) and Physical Broadcasting CHannel (PBCH) from each TRP. Utilizing dedicated SSB/PBCH with different physical cell ID may randomize the interference of SSB/PBCH between adjacent TRPs and allow standalone operation as well as multi-TRP operation, however, TCI state may be needed to support additional configuration of PCID in addition to serving cell ID. As shown in FIG. 28, TCI states which have an identical PCID may be categorized into one TCI state group. In another example, TCI states which does not have a PCID configuration may be categorized into one TCI state group.

In order to indicate TCI state group for a CORESET as shown in FIG. 25, a MAC CE signaling for the CORESET may be used in PCID based implicit grouping. The MAC CE may indicate TCI state group ID for the CORESET implicitly by delivering TCI state ID. For example, when a wireless device receives a TCI state ID for a CORESET, the wireless device may identify the TCI state group which may share identical PCID in the TCI states. Based on the TCI state group one or more MAC CE signaling can be used for the activation/deactivation of the TCI states. Based on the activation/deactivation, a DCI may indicate one or more TCI states for the downlink channel (e.g., PDSCH). The indication of activated TCI state may be based on the TCI state group.

In addition to TRS ID and PCID, supporting combined method may be also possible. In an example, TCI states which indicate TRS resources or resource sets with same PCID may be one method to support implicit TCI state group. For example, TRS resource or resource set configuration may have PCID configuration to enable standalone operation and randomization of SSB/PBCH transmission for multi-TRP scenario. In this case, TCI states which indicate TRS resources or resource sets with same PCID may be categorized into a group and may be used as TCI state group for corresponding MAC CE signaling and DCI signaling for the downlink control signaling (e.g., PDCCH) and channel (e.g., PDSCH).

In an example, a base station may provide a wireless device, for a serving cell (e.g., primary cell, secondary cell), with multiples set of resource configuration indexes (e.g., periodic CSI-RS resource configuration indexes) for multi-TRP operation. The set of resource configuration indexes may indicate one or more RSs (e.g., CSI-RS, SS/PBCH block, etc.). The base station may configure dedicated failure detection resources for each TRP of the serving cell. In addition to failure detection resources, the base station may provide the wireless device, for the TRP, with a set of resource configuration indexes for a candidate beam RS list (e.g., periodic CSI-RS resource configuration indexes, SS/PBCH block indexes) by a higher layer configuration. The second set of resources in the candidate beam RS list may indicate one or more RSs (e.g., CSI-RS, SS/PBCH block, etc.) for identifying new candidate beam for the TRP. As well as downlink, the base station may configure the candidate beam RS list for an uplink operation of the serving cell via higher layer configuration. In an example, the wireless device may use the one or more monitoring RSs and/or the one or more candidate RSs for radio link quality measurements on the serving cell.

Figure 29:
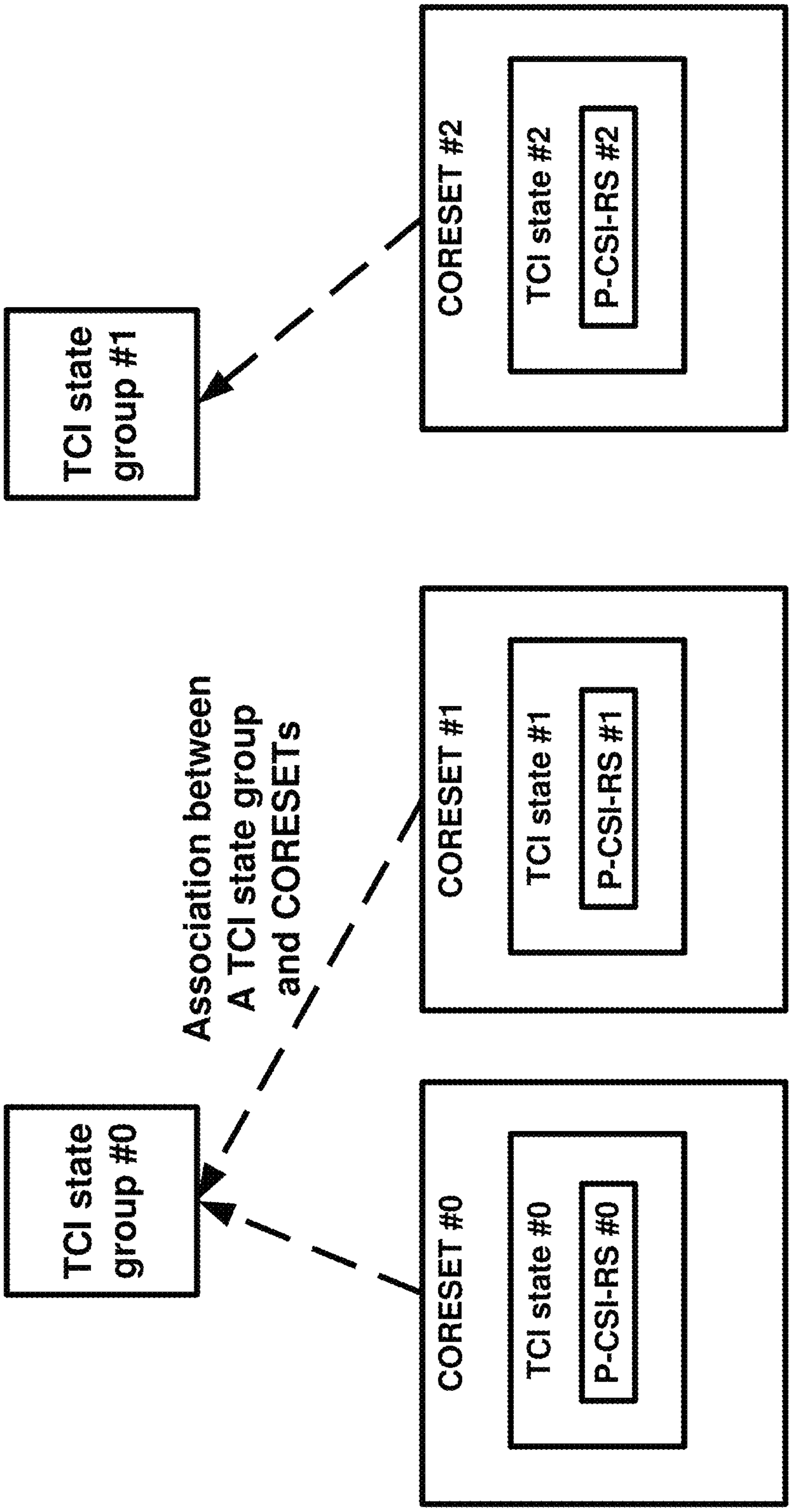
FIG. 29 is an example diagram to show beam failure reporting procedures as per an aspect of an embodiment of the present disclosure.

In an example, a base station may not provide a wireless device with monitoring RSs for the TRP via a higher layer signaling (e.g., failure detection resources for the TRP). Based on not being provided with the failure detection resources, the wireless device may determine a monitoring RS resource configuration indexes to include a resource configuration index (e.g., periodic CSI-RS resource configuration indexes) and associated TCI state group. FIG. 29 is an example diagram illustrating procedures for beam failure recovery with multi-TRP in accordance with embodiments of the present disclosure. In an example, as shown in FIG. 29, multiple CORESETs (e.g., CORESET #0, #1, and #2) may be configured to monitor at least on control channel quality (e.g., PDCCH). When the base station does not configure the failure detection resources, the wireless device may determine the CORESETs (e.g., CORESET #0, #1, and #2) which are associated with the TCI state group (e.g., TCI state group #0 and #1). For example, for the TCI state group #0 in FIG. 29, periodic CSI-RS (P-CSI-RS) #0 and #1 in the indicated TCI states (i.e. TCI state #0 and #1) for the CORESET #0 and #1 may be used for the failure detection resources. For TCI state group #1, P-CSI-RS #2 in TCI state #2 of CORESET #2 may be used.

Beam failure reporting method may be different based on the type or ID of TRP or TCI state configuration. For the main TRP (e.g. RRC configured, MAC CE indicated, TRP which has a lowest ID, lowest TCI state group ID, TCI state without PCID configuration or TCI state group which has a TCI state with the lowest TCI state ID), only PRACH based beam failure reporting may be used. On the other hand, other reporting methods (e.g., PUCCH based or MAC CE based) may be supported in addition to PRACH based reporting may be supported for other TRPs or TCI state groups. Such reporting methods may be configured with higher layer signaling.

In an example, dedicated thresholds for beam failure reporting of each TRP or TCI state group may be provided to a wireless device. In the configuration, a first threshold (e.g. Qout,LR) may correspond to a default value of higher layer parameter rlmInSyncOutOfSyncThreshold. In an example, a second threshold (e.g. Qin,LR) may correspond to a value provided by higher layer parameter rsrp-ThresholdSSB in the IE BeamFailureRecoveryConfig.

In an example, a physical layer in a wireless device may assess a first radio link quality of the one or more first RSs (or the first set of resource configuration indexes) against the first threshold. In an example, a first RS of the one or more first RSs may be associated (e.g. quasi co-located) with at least one DM-RS of a PDCCH monitored by the wireless device.

In an example, the wireless device may apply the second threshold to a first L1-RSRP measurement obtained from a SS/PBCH block of the one or more second RSs (or the second set of resource configuration indexes). In an example, the wireless device may apply the second threshold to a second L1-RSRP measurement obtained from a CSI-RS of the one or more second RSs (or the second set of resource configuration indexes) after scaling a reception power of the CSI-RS with a value provided by a higher layer parameter powerControlOffsetSS.

In an example, a wireless device may assess the first radio link quality of the one or more first RSs (indicated by the first set of resource configuration indexes). A physical layer in the wireless device may provide a BFI indication to a higher layer (e.g. MAC) of the wireless device when the first radio link quality is worse than the first threshold.

In an example, based on a request from a higher layer (e.g. MAC) of the wireless device, the wireless device may provide to the higher layer one or more candidate RSs (e.g., the periodic CSI-RS configuration indexes, the SS/PBCH blocks indexes) from the one or more candidate beam RS and one or more L1-RSRP measurements. In an example, each candidate RS of the one or more candidate RSs may be associated with a L1-RSRP measurement of the one or more L1-RSRP measurements. In an example, the association may be one-to-one. In an example, the one or more L1-RSRP measurements associated with the one or more candidate RSs may be larger than or equal to the second threshold. In an example, the higher layer may select a candidate RS (e.g., periodic CSI-RS resource configuration, SS/PBCH block) among the one or more candidate RSs. In an example, the candidate RS may be identified by a first RS index of the second set of resource configuration indexes. In an example, the first RS index may indicate the candidate RS.

In an example, a wireless device may be provided/configured with a control resource set (CORESET) through a link to a search space set for each TRP or TCI state group. The CORESET may be UE specific or dedicated to the wireless device or wireless device specific. In an example, the wireless device may monitor the CORESET of the TRP or TCI state group for a beam failure recovery. In an example, the base station may provide the wireless device with the search space set by a higher layer parameter recoverySearchSpaceId in the IE BeamFailureRecoveryConfig for the TRP or TCI state group. The wireless device may monitor at least one PDCCH in the control resource set for the TRP or TCI state group.

In an example, the base station may provide the wireless device with the higher layer parameter recoverySearchSpaceId for each TRP or TCI state group. In an example, the CORESET may be associated with the search space set provided by the higher layer parameter recoverySearchSpaceId.

In an example, the base station may provide the wireless device with a configuration for a transmission of an uplink signal (e.g., a PRACH transmission, a MAC CE signaling or a PUCCH transmission) by a higher layer signaling in the beam failure configuration of the TRP or TCI state group. Based on the transmission of the uplink signal (e.g., the PRACH transmission, a MAC CE signaling or a PUCCH transmission) in a first slot (e.g., slot n) and, the wireless device, starting from a second slot (e.g., slot n+4), may monitor at least one PDCCH in a search space set (e.g., provided by the higher layer parameter recoverySearchSpaceId for the TRP or TCI state group) for detection of a DCI format within a response window (e.g., ra-response Window). In an example, the wireless device may monitor the at least one PDCCH in the search space set (or CORESET) according to antenna port quasi co-location parameters associated with the candidate RS (provided by the higher layer). In an example, the response window may be configured by the IE BeamFailureRecoveryConfig of the TRP or TCI state group. The DCI format may be configured with CRC scrambled by a RNTI (e.g., C-RNTI, MCS-C-RNTI).

The TCI state group configuration in the present disclosure may be expressed in other terms such as transmission configuration group, transmission group and/or CORESET group.

In an example, a wireless device may receive a radio resource configuration message comprising a plurality of transmission configuration groups comprising a plurality of transmission configurations. For example, the wireless device may receive, for a control resource set, a medium access control control element indicating a transmission configuration of the plurality of transmission configurations. For example, the wireless device may determine the transmission configuration being associated with a transmission configuration group of the plurality of transmission configuration groups, wherein the transmission configuration group comprises at least one transmission configuration of the plurality of transmission configurations. For example, the wireless device may receive, via the control resource set, a downlink control information scheduling a downlink channel. For example, the wireless device may receive the downlink channel based on the transmission configuration group based on the receiving the downlink control information via the control resource set associated with the transmission configuration group.

In an example, the one of the transmission configurations indicates one or more reference signals associated with the one of the transmission configurations.

In an example, one or more antenna ports of the downlink channel may be quasi co-located with at least one of the one or more reference signals.

In an example, the wireless device may receive one or more transport blocks based on the one or more antenna ports.

In an example, the medium access control control element may further comprise a cell identifier and a bandwidth part identifier.

In an example, the downlink channel may be configured in a cell indicated by the cell identifier.

In an example, the downlink channel may be configured in a bandwidth part indicated by the bandwidth part identifier of the cell.

In an example, a wireless device may receive a radio resource configuration message comprising at least one physical cell identifier for a plurality of transmission configurations. For example, the wireless device may determine a plurality of transmission configuration groups, comprising the plurality of transmission configurations, based on the at least one physical cell identifier. For example, the wireless device may receive, for a control resource set, a medium access control control element indicating a transmission configuration of the plurality of transmission configurations. For example, the wireless device may determine the transmission configuration being associated with a transmission configuration group of the plurality of transmission configuration groups, wherein the transmission configuration group comprises at least one transmission configuration of the plurality of transmission configurations. For example, the wireless device may receive, via the control resource set, a downlink control information scheduling a downlink channel. For example, the wireless device may receive the downlink channel based on transmission configuration group based on the receiving the downlink control information via the control resource set associated with the transmission configuration group.

In an example, the one of the transmission configurations may indicate one or more reference signals associated with the one of the at least one of the transmission configurations.

In an example, one or more antenna ports of the downlink channel may be quasi co-located with at least one of the one or more reference signals.

In an example, the wireless device may receive one or more transport blocks based on the one or more antenna ports.

In an example, the medium access control control element may further comprise a cell identifier and a bandwidth part identifier.

In an example, the downlink channel may be configured in a cell indicated by the cell identifier.

In an example, the downlink channel may be configured in a bandwidth part indicated by the bandwidth part identifier of the cell.

In an example, a wireless device may receive a radio resource configuration message comprising at least one reference signal identifier for a plurality of transmission configurations. For example, the wireless device may determine a plurality of transmission configuration groups, comprising the plurality of transmission configurations, based on the at least one reference signal identifier. For example, the wireless device may receive, for a control resource set, a medium access control control element indicating a transmission configuration of the plurality of transmission configurations. For example, the wireless device may determine the transmission configuration being associated with a transmission configuration group of the plurality of transmission configuration groups, wherein the transmission configuration group comprises at least one transmission configuration of the plurality of transmission configurations. For example, the wireless device may receive, via the control resource set, a downlink control information scheduling a downlink channel. For example, the wireless device may receive the downlink channel based on transmission configuration group based on the receiving the downlink control information via the control resource set associated with the transmission configuration group.

In an example, the one of the at least one of the transmission configurations may indicate one or more reference signals associated with the one of the at least one of the transmission configurations.

In an example, one or more antenna ports of the downlink channel may be quasi co-located with at least one of the one or more reference signals. In an example, the wireless device receives one or more transport blocks based on the one or more antenna ports. In an example, the medium access control control element may further comprise a cell identifier and a bandwidth part identifier. In an example, the downlink channel may be configured in a cell indicated by the cell identifier. In an example, the downlink channel may be configured in a bandwidth part indicated by the bandwidth part identifier of the cell. In an example, the reference signal may be a channel state information reference signal for tracking.

In an example, a wireless device may receive, for a plurality of control resource sets, a signaling indicating a transmission group and a threshold of the transmission group. For example, the wireless device may determine one or more reference signals based on the transmission group. For example, the wireless device may initiate a beam failure recovery procedure of the transmission group in response to measurement result of at least one of the one or more reference signals reaching the threshold.

In an example, the transmission group may comprise one or more transmission configurations. In an example, a transmission configuration of one or more transmission configurations may indicate one or more reference signals associated with the transmission configuration. In an example, one or more antenna ports of the downlink channel may be quasi co-located with at least one of the one or more reference signals.

In an example, the transmission group may comprise one or more control resource sets. In an example, one of one or more transmission control resource sets may indicate a transmission configuration. In an example, the transmission configuration may indicate one or more reference signals associated with the transmission configuration. In an example, the threshold may be a hypothetical block error rate of downlink channel. In an example, the threshold may be a layer 1 reference signal received power. In an example, the threshold may be a signal to interference and noise ratio. In an example, the one or more reference signal may be a periodic channel state information reference signal. In an example, the one or more reference signal may be a synchronization signal block.

In an example, the one or more reference signal may be a channel state information reference signal for time/frequency tracking. In an example, the signaling may further comprise a cell identifier and a bandwidth part identifier. In an example, the beam failure report may be configured in a cell indicated by the cell identifier. In an example, the beam failure report may be configured in a bandwidth part indicated by the bandwidth part identifier of the cell.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 30:
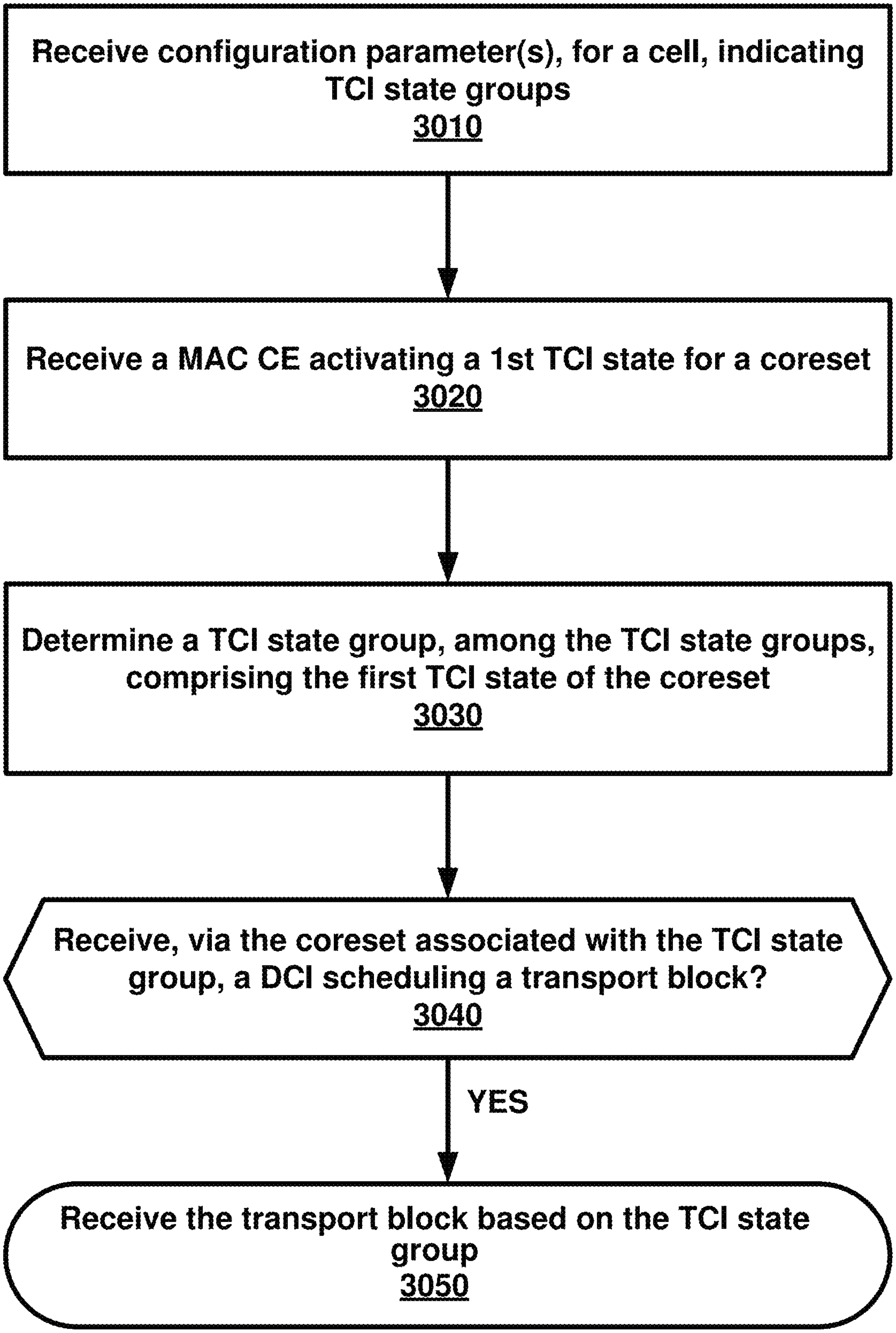
FIG. 30 is a flow diagram as per an aspect of an example embodiment of the present disclosure.

FIG. 30 is a flow diagram as per an aspect of an example embodiment of the present disclosure. At 3010, a wireless device may receive one or more messages. The one or more messages may comprise one or more configuration parameters for a cell. The one or more configuration parameters may indicate a plurality of transmission configuration indicator (TCI) state groups. At 3020, the wireless device may receive a medium access control control element (MAC CE) activating a first TCI state for a control resource set (coreset). At 3030, the wireless device may determine a TCI state group, among the plurality of TCI state groups, comprising the first TCI state of the coreset. At 3040, the wireless device may receive, via the coreset associated with the TCI state group, a downlink control information (DCI) scheduling a transport block. At 3050, in response to the receiving the DCI via the coreset associated with the TCI state group, the wireless device may receive the transport block based on the TCI state group.

According to an example embodiment, a wireless device may receive one or more messages. The one or more messages may comprise one or more configuration parameters for a cell. The one or more configuration parameters may indicate a plurality of transmission configuration indicator (TCI) state groups. According to an example embodiment, the wireless device may receive a medium access control control element (MAC CE) activating a first TCI state for a control resource set (coreset). According to an example embodiment, the wireless device may determine a TCI state group, among the plurality of TCI state groups, comprising the first TCI state of the coreset. According to an example embodiment, the wireless device may receive, via the coreset associated with the TCI state group, a downlink control information (DCI) scheduling a transport block. According to an example embodiment, in response to the receiving the DCI via the coreset associated with the TCI state group, the wireless device may receive the transport block based on the TCI state group.

According to an example embodiment, the plurality of TCI state groups may comprise a plurality of TCI states. According to an example embodiment, the plurality of TCI states may comprise the first TCI state. According to an example embodiment, the TCI state group may comprise at least one TCI state of the plurality of TCI states. According to an example embodiment, the at least one TCI state may comprise the first TCI state. According to an example embodiment, the DCI may indicate a second TCI state. According to an example embodiment, the TCI state group may comprise the second TCI state. According to an example embodiment, the at least one TCI state may comprise the second TCI state. According to an example embodiment, the second TCI state may indicate a second reference signal. According to an example embodiment, the receiving the transport block based on the second TCI state may comprise at least one DM-RS of the transport block being quasi co-located with the second reference signal. According to an example embodiment, the DCI indicating the second TCI state may comprise the DCI comprising a TCI field with a value that is same as a codepoint of the second TCI state.

According to an example embodiment, the one or more configuration parameters may indicate at least one physical cell identifier for the plurality of TCI states. According to an example embodiment, the one or more configuration parameters indicating the plurality of TCI state groups may comprise determining the plurality of TCI state groups based on the at least one physical cell identifier indicated by the one or more configuration parameters.

According to an example embodiment, the one or more configuration parameters may indicate at least one reference signal identifier for the plurality of TCI states. According to an example embodiment, the one or more configuration parameters indicating the plurality of TCI state groups may comprise determining the plurality of TCI state groups based on the at least one reference signal identifier indicated by the one or more configuration parameters.

According to an example embodiment, the transport block may be a physical downlink shared channel (PDSCH).

According to an example embodiment, the coreset being associated with the TCI state group may comprise the TCI state group comprising the first TCI state of the coreset.

According to an example embodiment, the receiving the DCI comprises receiving a physical downlink control channel (PDCCH) with the DCI based on the first TCI state. According to an example embodiment, the first TCI state may indicate a first reference signal. According to an example embodiment, at least one demodulation reference signal (DM-RS) of the PDCCH may be quasi co-located with the first reference signal.

According to an example embodiment, the one or more configuration parameters may be for a downlink bandwidth part (BWP) of the cell. According to an example embodiment, the MAC CE may indicate the downlink BWP. According to an example embodiment, the DCI may schedule the transport block for the downlink BWP of the cell.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A wireless device comprising:
one or more processors; and
memory storing instructions that, when executed by the one or more processors, cause the wireless device to:
receive one or more radio resource control (RRC) messages indicating:
a plurality of control resource set (coreset) groups; and
transmission configuration indicator (TCI) states, wherein each TCI state of the TCI states comprises an indication of a respective physical cell index (PCI);
receive an activation command indicating, for a control resource set (coreset), a first TCI state of the TCI states, wherein:
the first TCI state comprises a first indication of a first PCI; and
the coreset is associated with a coreset group among the plurality of coreset groups;
receive, via the coreset associated with the coreset group, downlink control information (DCI) scheduling a physical downlink shared channel (PDSCH) reception, wherein the DCI indicates a second TCI state among one or more activated TCI states associated with the coreset group; and
receive the PDSCH reception based on the second TCI state.

2. The wireless device of claim 1, wherein the second TCI state is associated with the first PCI.

3. The wireless device of claim 2, wherein the coreset is associated with the first PCI.

4. The wireless device of claim 3, wherein the DCI comprises a TCI field indicating the second TCI state.

5. The wireless device of claim 4, wherein the DCI indicates the second TCI state among the one or more activated TCI states associated with the coreset group based on receiving the DCI in the coreset associated with the coreset group.

6. The wireless device of claim 5, wherein the instructions further cause the wireless device to receive a second medium access control (MAC) control element (CE) indicating activation of the one or more activated TCI states, wherein the second MAC CE indicates the coreset group.

7. The wireless device of claim 6, wherein the activation command is a first MAC CE.

8. The wireless device of claim 4, wherein the instructions further cause the wireless device to receive a second medium access control (MAC) control element (CE) indicating activation of the one or more activated TCI states, wherein the second MAC CE indicates the coreset group.

9. The wireless device of claim 8, wherein the activation command is a first MAC CE.

10. The wireless device of claim 9, wherein the instructions further cause the wireless device to receive a second medium access control (MAC) control element (CE) indicating activation of the one or more activated TCI states, wherein the second MAC CE indicates the coreset group.

11. The wireless device of claim 1, wherein the instructions further cause the wireless device to receive a second medium access control (MAC) control element (CE) indicating activation of the one or more activated TCI states, wherein the second MAC CE indicates the coreset group.

12. The wireless device of claim 11, wherein the activation command is a first MAC CE.

13. The wireless device of claim 1, wherein the coreset is associated with the first PCI.

14. The wireless device of claim 1, wherein the activation command is a MAC CE.

15. The wireless device of claim 1, wherein the TCI states comprise the first TCI state and the second TCI state.

16. The wireless device of claim 1, wherein the DCI comprises a TCI field indicating the second TCI state.

17. The wireless device of claim 16, wherein one or more demodulation reference signal (DMRS) ports of the PDSCH reception are quasi co-located with a reference signal indicated by the second TCI state.

18. The wireless device of claim 1, wherein one or more demodulation reference signal (DMRS) ports of the PDSCH reception are quasi co-located with a reference signal indicated by the second TCI state.

19. The wireless device of claim 1, wherein the DCI indicates the second TCI state among the one or more activated TCI states associated with the coreset group based on receiving the DCI in the coreset associated with the coreset group.

20. The wireless device of claim 19, wherein one or more demodulation reference signal (DMRS) ports of the PDSCH reception are quasi co-located with a reference signal indicated by the second TCI state.

* * * * *